US012465846B2

(12) United States Patent
O'Leary et al.

(10) Patent No.: US 12,465,846 B2
(45) Date of Patent: Nov. 11, 2025

(54) MAGNETICALLY ATTACHABLE GAMING ACCESSORY

(71) Applicant: Apple Inc., Cupertino, CA (US)

(72) Inventors: Fiona P. O'Leary, Mountain View, CA (US); Mylene E. Dreyer, San Francisco, CA (US); Jonathan A. Topf, San Francisco, CA (US); Julian K. Missig, Burlingame, CA (US); Ian P. Colahan, Menlo Park, CA (US); Marisa R. Lu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/459,701

(22) Filed: Aug. 27, 2021

(65) Prior Publication Data

US 2022/0096923 A1 Mar. 31, 2022

Related U.S. Application Data

(60) Provisional application No. 63/083,425, filed on Sep. 25, 2020.

(51) Int. Cl.

| | |
|---|---|
| ***A63F 13/24*** | (2014.01) |
| ***A63F 13/22*** | (2014.01) |
| ***A63F 13/23*** | (2014.01) |
| ***A63F 13/26*** | (2014.01) |
| ***A63F 13/92*** | (2014.01) |
| ***A63F 13/98*** | (2014.01) |

(52) U.S. Cl.

CPC .............. *A63F 13/24* (2014.09); *A63F 13/22* (2014.09); *A63F 13/23* (2014.09); *A63F 13/26* (2014.09); *A63F 13/92* (2014.09); *A63F 13/98* (2014.09)

(58) Field of Classification Search

None

See application file for complete search history.

(56) References Cited

U.S. PATENT DOCUMENTS

| | | | |
|---|---|---|---|
| 6,888,940 | B1 | 5/2005 | Deppen |
| 8,073,324 | B2 | 12/2011 | Tsai |
| 8,558,411 | B2 | 10/2013 | Baarman |
| 8,688,037 | B2 | 4/2014 | Chatterjee et al. |
| 8,907,752 | B2 | 12/2014 | Wodrich et al. |

(Continued)

FOREIGN PATENT DOCUMENTS

| | | | | |
|---|---|---|---|---|
| CN | 203673438 | U | * | 6/2014 |
| CN | 104467129 | A | | 3/2015 |

(Continued)

OTHER PUBLICATIONS

"Machine Translation of TW M414057 U", Oct. 11, 2011, 6 pages.

*Primary Examiner* — Tramar Harper

(74) *Attorney, Agent, or Firm* — Kilpatrick Townsend & Stockton LLP

(57) ABSTRACT

Accessories that can improve a specific functionality of an electronic device, can readily attach to an electronic device, can be easy to use, and can have a small and efficient form factor. One example can provide a gaming accessory that can improve the game playing functionality of an electronic device, such as a phone, tablet, or other computing device. This gaming accessory can provide a physical interface for controlling game activities on the electronic device such that a screen of the electronic device remains at least largely unobstructed during game play.

18 Claims, 53 Drawing Sheets

(56) References Cited

U.S. PATENT DOCUMENTS

| | | | | |
|---|---|---|---|---|
| 8,912,686 | B2 | 12/2014 | Stoner et al. | |
| 8,939,838 | B2 | 1/2015 | Alten | |
| 8,988,355 | B2 * | 3/2015 | Solomon | G06F 3/0219 345/173 |
| 9,038,971 | B1 | 5/2015 | Guthrie | |
| 9,049,911 | B1 * | 6/2015 | Wood | A45C 11/00 |
| 9,106,083 | B2 | 8/2015 | Partovi | |
| 9,112,364 | B2 | 8/2015 | Partovi | |
| 9,138,640 | B2 * | 9/2015 | Baum | A63F 13/235 |
| 9,281,859 | B1 * | 3/2016 | Lee | A63F 13/98 |
| 9,397,719 | B1 * | 7/2016 | Schmidt | A45F 5/10 |
| 9,413,191 | B2 | 8/2016 | Kim et al. | |
| 9,627,130 | B2 | 4/2017 | Golko et al. | |
| 9,763,504 | B2 * | 9/2017 | Kim | A45C 11/00 |
| 10,153,666 | B2 | 12/2018 | Lee et al. | |
| 10,243,402 | B2 | 3/2019 | Park et al. | |
| 10,249,152 | B2 * | 4/2019 | Sartee | A45C 11/00 |
| 10,273,942 | B2 | 4/2019 | Nakamura | |
| 10,404,089 | B2 | 9/2019 | Kasar et al. | |
| 10,418,839 | B2 | 9/2019 | Miller | |
| 10,491,041 | B2 | 11/2019 | Wittenberg et al. | |
| 10,622,842 | B2 | 4/2020 | Lee et al. | |
| 10,703,297 | B1 * | 7/2020 | Cohen | B60N 3/103 |
| 10,868,436 | B1 | 12/2020 | Chen | |
| 11,342,800 | B2 | 5/2022 | Oro et al. | |
| 2002/0071550 | A1 * | 6/2002 | Pletikosa | H04M 1/0235 379/433.01 |
| 2009/0212637 | A1 | 8/2009 | Baarman et al. | |
| 2009/0278642 | A1 | 11/2009 | Fullerton et al. | |
| 2010/0039764 | A1 * | 2/2010 | Locker | G06F 1/1615 361/679.29 |
| 2010/0081377 | A1 | 4/2010 | Chatterjee et al. | |
| 2010/0238119 | A1 * | 9/2010 | Dubrovsky | G06F 1/1626 345/169 |
| 2011/0039608 | A1 * | 2/2011 | Hsiao | H04M 1/72409 455/575.3 |
| 2011/0147398 | A1 * | 6/2011 | Ahee | G06F 1/1616 29/428 |
| 2012/0068942 | A1 | 3/2012 | Lauder | |
| 2012/0112553 | A1 | 5/2012 | Stoner, Jr. et al. | |
| 2012/0146576 | A1 | 6/2012 | Partovi | |
| 2012/0194448 | A1 * | 8/2012 | Rothkopf | G06F 1/1643 361/679.01 |
| 2012/0252543 | A1 * | 10/2012 | Cho | F16M 13/022 455/575.8 |
| 2012/0306440 | A1 | 12/2012 | Yeh | |
| 2013/0069499 | A1 * | 3/2013 | Modrell | G06F 1/1656 312/223.1 |
| 2013/0088431 | A1 * | 4/2013 | Ballagas | G09G 5/00 345/168 |
| 2013/0099730 | A1 | 4/2013 | Yoon | |
| 2013/0113423 | A1 | 5/2013 | Baarman | |
| 2013/0183899 | A1 * | 7/2013 | Gorsev | H04B 5/0031 455/41.1 |
| 2013/0187596 | A1 | 7/2013 | Eastlack | |
| 2013/0214661 | A1 * | 8/2013 | McBroom | G06F 1/166 312/325 |
| 2013/0260677 | A1 | 10/2013 | Partovi | |
| 2013/0309966 | A1 * | 11/2013 | Aldana | G06F 1/1613 455/90.3 |
| 2014/0071654 | A1 * | 3/2014 | Chien | H01H 13/704 362/23.03 |
| 2014/0139989 | A1 * | 5/2014 | Mori | G06F 1/1632 361/679.09 |
| 2014/0183065 | A1 * | 7/2014 | Toulotte | A45C 11/00 206/37 |
| 2014/0242429 | A1 | 8/2014 | Lee | |
| 2015/0174482 | A1 * | 6/2015 | Hirshberg | A63F 13/92 463/37 |
| 2015/0311940 | A1 * | 10/2015 | Lee | H04B 1/3888 455/575.8 |
| 2015/0346779 | A1 * | 12/2015 | Chae | G06F 3/04886 345/173 |
| 2016/0040825 | A1 * | 2/2016 | Franklin | F16M 13/02 439/39 |
| 2016/0094076 | A1 | 3/2016 | Kasar | |
| 2016/0105047 | A1 | 4/2016 | Cui | |
| 2016/0107082 | A1 * | 4/2016 | Song | A63F 13/98 463/37 |
| 2016/0128210 | A1 | 5/2016 | Lee | |
| 2016/0150861 | A1 * | 6/2016 | Yao | F16M 11/105 224/245 |
| 2016/0187937 | A1 * | 6/2016 | Ahee | G06F 1/1681 361/679.09 |
| 2016/0206065 | A1 | 7/2016 | Ehrlich | |
| 2016/0277053 | A1 * | 9/2016 | Wong Chee | G06F 1/1669 |
| 2016/0373152 | A1 * | 12/2016 | Schmidt | H04B 1/3888 |
| 2017/0005399 | A1 | 1/2017 | Ito et al. | |
| 2017/0070076 | A1 | 3/2017 | Karanikos | |
| 2017/0245040 | A1 | 8/2017 | Hankey | |
| 2018/0028909 | A1 * | 2/2018 | Kim | H04M 1/72427 |
| 2018/0107253 | A1 * | 4/2018 | Landwehr | G06F 1/1681 |
| 2018/0169532 | A1 * | 6/2018 | Yan | A63F 13/92 |
| 2018/0248406 | A1 | 8/2018 | Bae et al. | |
| 2018/0275769 | A1 * | 9/2018 | Ikeda | G06F 3/039 |
| 2018/0301936 | A1 | 10/2018 | Lee et al. | |
| 2019/0089188 | A1 | 3/2019 | Chien et al. | |
| 2019/0198212 | A1 | 6/2019 | Levy | |
| 2019/0215444 | A1 * | 7/2019 | Deng | H04B 1/3888 |
| 2019/0363565 | A1 | 11/2019 | Graham et al. | |
| 2019/0379231 | A1 * | 12/2019 | Gonzalez | H02J 50/005 |
| 2020/0078670 | A1 * | 3/2020 | Oh | A63F 13/92 |
| 2020/0346006 | A1 | 11/2020 | Eigentler et al. | |
| 2020/0353369 | A1 * | 11/2020 | Esselstrom | F16B 2/22 |
| 2021/0099026 | A1 | 4/2021 | Larsson | |
| 2021/0099027 | A1 | 4/2021 | Larsson | |
| 2021/0205699 | A1 * | 7/2021 | Chung | G06F 3/02 |
| 2021/0291038 | A1 * | 9/2021 | Guerrero, Jr. | A63F 13/24 |
| 2021/0346794 | A1 * | 11/2021 | Gao | A63F 13/98 |
| 2021/0360101 | A1 * | 11/2021 | Choi | G06F 3/0202 |
| 2022/0014655 | A1 | 1/2022 | Hu | |
| 2022/0331688 | A1 * | 10/2022 | Khaira | A63F 13/235 |

FOREIGN PATENT DOCUMENTS

| | | | | |
|---|---|---|---|---|
| CN | 205670700 | U | 11/2016 | |
| CN | 106877429 | A | 6/2017 | |
| CN | 207442540 | U | 6/2018 | |
| CN | 208581077 | U | 3/2019 | |
| EP | 0823717 | A2 | 2/1998 | |
| JP | 2013120837 | A | 6/2013 | |
| JP | 3197750 | U | 5/2015 | |
| JP | 2015171166 | A | 9/2015 | |
| JP | 6233504 | B2 | 11/2017 | |
| KR | 1332329 | B1 * | 11/2013 | |
| KR | 200476393 | Y1 * | 2/2015 | H04B 1/3888 |
| TW | M414057 | U | 10/2011 | |
| TW | 201347349 | A | 11/2013 | |
| TW | 201711335 | A | 3/2017 | |
| WO | 2010129369 | A2 | 11/2010 | |
| WO | 2011156768 | A2 | 12/2011 | |
| WO | WO-2016022030 | A1 * | 2/2016 | G06F 1/1626 |
| WO | 2016053633 | A1 | 4/2016 | |

* cited by examiner

MAGNETICALLY ATTACHABLE GAMING ACCESSORY

CROSS REFERENCES TO RELATED APPLICATIONS

This application claims the benefit of U.S. Provisional Patent Application No. 63/083,425, filed Sep. 25, 2020, which is incorporated by reference.

BACKGROUND

The number of types of electronic devices that are commercially available has increased tremendously the past few years and the rate of introduction of new devices shows no signs of abating. Devices such as tablet computers, laptop computers, desktop computers, all-in-one computers, cell phones, storage devices, wearable-computing devices, portable media players, navigation systems, monitors, adapters, and others, have become ubiquitous.

As a result of the ubiquity and increasing functionality of these electronic devices, they now travel with us wherever we go. They are often used during or in conjunction with many daily activities, either while performing an activity or in a manner that supplements an activity.

As a result of this constant companionship, it can be desirable for these electronic devices to be particularly adept at performing specific functions. Accordingly, it can be desirable to provide accessories that can improve one or more functionalities of an electronic device.

But it can be difficult to attach an accessory to an electronic device. Any significant effort in making such a connection can quickly reduce the desirability and usefulness of the accessory. Accordingly, it can be desirable that such an accessory be readily connected to an electronic device.

Some accessories can be difficult to use. They can have complicated interfaces and arcane instructions. This too can rapidly reduce the desirability and usefulness of the accessory. Accordingly, it can be desirable that such an accessory be easy and intuitive to use.

Also, some accessories can be rather bulky and difficult to carry along with an electronic device. Accordingly, it can be desirable that these accessories have a small and efficient form factor that makes them easy to transport.

Thus, what is needed are accessories that can improve a specific functionality of an electronic device, can readily attach to an electronic device, can be easy to use, and can have a small and efficient form factor.

SUMMARY

Accordingly, embodiments of the present invention can provide accessories that can improve one or more functionalities of an electronic device, can readily attach to an electronic device, can be easy to use, and can have a small and efficient form factor.

An illustrative embodiment of the present invention can provide a gaming accessory that can improve the game playing functionality of an electronic device, such as a phone, tablet, wearable computing device, or other computing device. This gaming accessory can provide a physical interface for controlling game activities on the electronic device such that a screen of the electronic device remains at least largely unobstructed during game play. The gaming accessory can include a tray, panel, or base and one or more game controllers that can attach to the tray, panel, base (generally referred to herein as a tray or base), or electronic device such that the game controllers are positioned on one or more sides of the electronic device. Each game controller can include one or more user-interface controls. The game controllers can be readily grasped during game play thereby improving the game playing functionality.

These and other embodiments of the present invention can provide gaming accessories that readily attach to an electronic device. A gaming accessory can include an attachment feature that can attach the gaming accessory to a surface of an electronic device. The attachment feature can include a magnet. The attachment feature can also or instead include multiple magnets. The attachment feature can also or instead include a magnet array. The magnet array can be arranged in a circular pattern. The magnet array in the gaming accessory can be magnetically attracted to a corresponding magnetic array in the electronic device.

These and other embodiments of the present invention can provide a gaming accessory having a fixed magnet array. In this arrangement it can be desirable to limit a strength of a magnetic field generated by the fixed magnetic array at a contacting surface of the gaming accessory in order to protect information that might be magnetically stored, for example on credit cards, transit passes, or elsewhere. But it can also be desirable to increase the magnetic field to improve the attachment of the gaming accessory to the electronic device. Accordingly, the magnetic field can be increased when the gaming accessory is or is about to be attached to the electronic device. For example, an electromagnet can be used. Current through the electromagnetic can be increased in order to increase magnetic attraction. Also or instead, the magnet array of a gaming accessory can be a moving magnet array. This moving magnet array can move from a first position away from a contacting surface to a second position near the contacting surface when the gaming accessory is or is about to be attached to the electronic device. When the gaming accessory is removed from the electronic device, the moving magnet array can return to the first position away from the contacting surface.

These and other embodiments of the present invention can further include an alignment feature for a gaming accessory, where the alignment feature can align the gaming accessory in a particular orientation relative to the electronic device. The alignment feature can include magnets in the magnet array. The alignment feature can also or instead be additional magnets that are separate and spaced apart from the magnet array.

These and other embodiments of the present invention can provide gaming accessories that are easy to use. For example, these gaming accessories can include one or more game controllers that support user-interface controls such as a directional joystick, D-pad, button array, shoulder button, or other user-interface controls.

The use of these gaming accessories can further be simplified by providing circuitry and components that allow an electronic device to determine that a gaming accessory is attached. Once this determination is made, the electronic device can enter a gaming mode without further intervention. Accordingly, these and other embodiments of the present invention can provide a gaming accessory that can be identified by an electronic device. Once an electronic device identifies that it is attached to a gaming accessory, the electronic device can commence various operations. More specifically, the electronic device can comprise a magnetometer. The magnetometer can detect the magnet array in the attached game controller. In response to this detection, the electronic device can generate a field using near-field communication circuitry. The near-field communication circuitry in the electronic device can use changes in this field to detect near-field communication circuitry in the attached gaming accessory and to read data from the gaming accessory. The near-field communication circuitry in the attached gaming accessory can include a tag, capacitors, and other components. The tag can include identifying information. In response to detecting a connection, the electronic device can enter a game-playing mode or take other appropriate actions.

These and other embodiments of the present invention can provide gaming accessories that provide a small and efficient form factor. For example, an electronic device can be supported by a tray of a gaming accessory. The tray can be a case or cover that can be removably attached to the electronic device. A first game controller of the gaming accessory can be removably attached to a first side of the tray and a second game controller of the gaming accessory can be removably attached to a second side of the tray, where the first and second sides are opposing sides. The first game controller can alternatively be removably attached to a third side of the tray, where the third side is between the first side and the second side. The second game controller can alternately be removably attached to a fourth side of the tray, the fourth side opposite the third side. The first game controller and the second game controller can include tabs that can attach to grooves in sides of the tray. The first game controller and second game controller can include spring-biased or other contacts that can physically and electrically connect to corresponding contacts in the grooves in sides of the tray. These contacts can extend some of the length of a side of the tray such that the first game controller and second game controller can be removably attached at different positions along sides of the tray.

These and other embodiments of the present invention can provide gaming accessories arranged as a folio for an electronic device. This folio configuration can provide a small and efficient form factor for a gaming accessory. The folio can include a back panel or tray to support the electronic device. The back panel or tray can substantially cover a back side of the electronic device. The folio can include a cover connected to the back panel or tray by a hinge. The cover can be in a first position over a screen on a front side of the electronic device and a second position where the electronic device is at an oblique angle to the cover. The cover can include one or more openings. The electronic device can detect when the cover is in the first position, and in response, the electronic device can generate one or more icons or other images on the screen, where the one or more icons or other images on the screen align with the one or more openings on the cover. The remaining portions of the screen that are not aligned with the one or more openings can be turned off to save power. One or more user-interface controls can be located on either or both sides of the cover and can be used when the cover is in the second position or first position.

These and other embodiments of the present invention can provide gaming accessories that can be attached to a back side of an electronic device in either a first orientation or a second orientation. When a gaming accessory is attached in a first orientation (for example, a landscape orientation), the gaming accessory can have an outline that is at least approximately coincident with the electronic device, thereby providing a gaming accessory with a highly efficient form factor. More specifically, the gaming accessory can include a base, a first game controller, and a second game controller. The first game controller and the second game controller can be in a first position where the first game controller and the second game controller are adjacent to the base. In this first position, the gaming accessory can be at least approximately coincident with the electronic device. The first game controller and the second game controller can move to a second position where the first game controller and the second game controller are away from the base. In this position, user-interface controls on the first game controller and the second game controller can be available for use at sides of the electronic device. When the gaming accessory is attached in the second orientation (for example a portrait orientation), user-interface controls on the first game controller and the second game controller can be available for use at sides of the electronic device when the first game controller and the second game controller are in the first position and adjacent to the base.

These and other embodiments of the present invention can provide other gaming accessories having a folio form factor. Such a gaming accessory can include a back panel or tray to support an electronic device. The back panel or tray can be connected to a cover via a hinge. The cover can include a cover screen that can act as a second screen to a screen on the electronic device. The cover screen can include one or more openings, where user-input controls can be located in each of the one or more openings. The cover screen can display images that are supplemental to images on the screen of the electronic device. The screen of the electronic device can display images that are supplemental to images on the cover screen. The screen on the electronic device and the cover screen can also display continuous images that are split between the two screens.

These and other embodiments of the present invention can provide gaming accessories that can synchronize game play information between users. A gaming accessory can include a back panel or tray to support an electronic device. A first game controller can attach to the back panel or tray, or can fit over or otherwise attach to a first end of the electronic device, and a second game controller can attach to the back panel or tray, or can fit over or otherwise attach to a second end of the electronic device. The first game controller can be swappable between a first player and a second player. That is, the first player and the second player can swap first game controllers and attach the first game controllers to their gaming accessory. This can allow information from the first player's gaming accessory to synchronize with the second player's gaming accessory and information from the second player's gaming accessory to synchronize with the first player's gaming accessory.

These and other embodiments of the present invention can provide gaming accessories that can include a projector. A projector can project an image of game play onto a surface. The projected image can be the same or different as an image viewable on an electronic device attached to the gaming accessory.

Various types of data can be transferred between a gaming accessory and an electronic device. For example, button press information, pressure information, directional information, and other types of information can be sent from a game controller of a gaming accessory to an electronic device. Battery charge status and other status information can also be sent from a gaming accessory to an electronic device. The electronic device can provide information to the gaming accessory for the illumination of light-emitting diodes on the gaming accessory, as well as other types of information.

Data can be transferred between a gaming accessory and an electronic device in various ways. For example, data can be transferred between a gaming accessory and an electronic device using near-field communication circuitry. Data can be transferred between a gaming accessory and an electronic device using charging circuitry. Data can be transferred between a gaming accessory and an electronic device using Bluetooth or other wireless protocol. Data can be transferred between a gaming accessory and an electronic device using electrical contacts. Data can be transferred between a gaming accessory and an electronic device using any one or a combination of these.

Again, data can be transferred from an accessory to an electronic device using near-field communication circuitry. Current can be provided to a near-field communication coil in an electronic device. This current can generate a magnetic field. A tag coupled to a near-field communication coil in the accessory can provide a time-varying impedance to the magnet field in order to transmit data. The variation in the magnetic field can be detected by the near-field communication circuitry in the electronic device. From this, the data transmitted by the accessory can be read. Data can similarly be transmitted from the electronic device to the accessory.

Data can also or instead be transferred from a gaming accessory to an electronic device using charging circuitry. For example, control circuitry in the gaming accessory can generate currents in a coil of the gaming accessory. These currents can generate a time-varying magnetic field that can be modulated. The modulation can be in amplitude, phase, frequency, or other parameter. The modulated time-varying magnetic field can induce currents in a corresponding coil in the electronic device. Control circuitry in the electronic device can receive the induced currents and recover data transmitted by the gaming accessory. Data can similarly be transferred from the electronic device to the gaming accessory.

Data can also or instead be transferred from a gaming accessory to an electronic device using Bluetooth or other wireless protocol. Data can similarly be transferred from the electronic device to the gaming accessory.

In these and other embodiments of the present invention, power can be provided to a gaming accessory in various ways. For example gaming accessory can receive wired power. The gaming accessory can also or instead receive wireless power.

A gaming accessory can receive wired power through a connector receptacle in the gaming accessory that can accept a corresponding connector insert attached to a first end of a cable. A second end of the cable can be attached to a power source, such as a host device, charging or other power source.

A gaming accessory for an electronic device can receive wireless power from the electronic device or other wireless charger. For example, the gaming accessory can include a charging coil and control circuitry that allow the gaming accessory to be inductively charged by either the electronic device, a wireless charger, or other charging device.

A gaming accessory for an electronic device can also act as a pass-through that allows an electronic device to be charged. For example, an electronic device in gaming accessory can be placed on a wireless charger. The wireless charger can charge the electronic device through the gaming accessory.

Various embodiments of the present invention can incorporate one or more of these and the other features described herein. A better understanding of the nature and advantages of the present invention can be gained by reference to the following detailed description and the accompanying drawings.

BRIEF DESCRIPTION OF THE DRAWINGS

FIG. 21B shows an axial cross-section view through a portion of the system of FIG. 21A, while

DESCRIPTION OF ILLUSTRATIVE EMBODIMENTS

Figure 1:
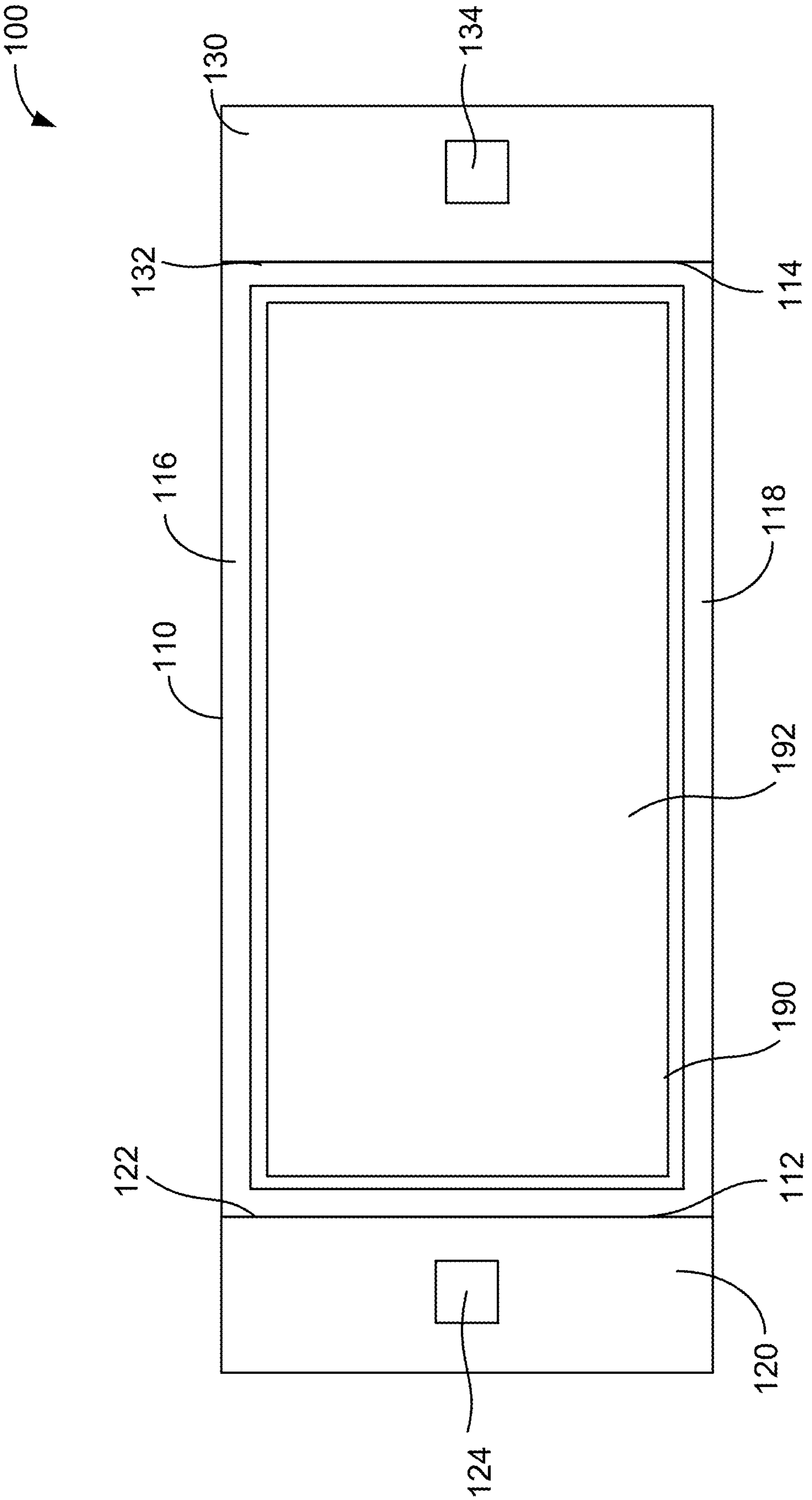
FIG. 1 illustrates a gaming accessory according to an embodiment of the present invention.

FIG. 1 illustrates a gaming accessory according to an embodiment of the present invention. This figure, as with the other figures, is shown for illustrative purposes and does not limit either the possible embodiments of the present invention or the claims.

Gaming accessory 100 can include back panel or tray 110 supporting electronic device 190. Back panel or tray 110 (referred to herein as tray 110) can cover some or all of a back side (not shown) of electronic device 190. Tray 110 can further cover some or all of sides of electronic device 190, leaving a screen 192 on a front side of electronic device 190 at least largely unobstructed. Gaming accessory 100 can further include first game controller 120. First game controller 120 can include a tab (not shown) on side 122 that can fit in a slot (not shown) on side 112 of tray 110. First game controller 120 can include user-interface control 124, which can be a directional joystick, a button array, a shoulder button, or other user-interface control. Gaming accessory 100 can further include second game controller 130. Second game controller 130 can include a tab (not shown) on side 132 that can fit in a slot (not shown) on side 114 of tray 110. Second game controller 130 can include user-interface control 134, which can be a directional joystick, a button array, a shoulder button, or other user-interface control.

Gaming accessory 100 can provide an improved gaming functionality for electronic device 190. Specifically, in this configuration, first game controller 120 and second game controller 130 can be on sides of tray 110, thereby allowing screen 192 of electronic device 190 to remain at least largely unobstructed. First game controller 120 and second game controller 130 can easily be removed. Tray 110 can be used as a case or protective cover for electronic device 190 when first game controller 120 and second game controller 130 are removed. This configuration can provide a small and efficient form factor for gaming accessory 100.

Again, first game controller 120 can include a tab on side 122 that fits in a slot on side 112 of tray 110. Similarly, second game controller 130 can include a tab on side 114 that fits in a slot on side one 14 of tray 110. Contacts on each tab can mate with corresponding contacts in slots on sides of tray 110. One or more of these contacts can be spring biased or other types of contacts. Alternatively, first game controller 120 can magnetically attach to tray 110 at side 112. Similarly, second game controller 130 can magnetically attach to tray 110 at side 114.

Gaming accessory 100 can readily attach to electronic device 190. For example, tray 110 can fit around electronic device 190. Alternatively, tray 110 can magnetically attach to electronic device 190. This can be particularly true when tray 110 has a cover or back panel configuration. Tray 110 can include a magnet that can be attracted to a corresponding magnet in electronic device 190. Tray 110 can also or instead include a number of magnets that can be attracted to a corresponding number of magnets an electronic device 190. Tray 110 can also or instead include a magnet array that can be attracted to a corresponding magnet array in electronic device 190. For example, tray 110 can include a magnet array such as primary magnetic alignment component 1716 (shown in FIG. 17) while electronic device 190 can include a magnet array such as secondary magnetic alignment component 1718 (shown in FIG. 17) or any of the other alignment components shown herein. Alternatively, tray 110 can include a pass-through magnet array. The use of a pass-through magnet array can allow electronic device 190 or gaming accessory 100 to be charged while gaming accessory 100 is attached to electronic device 190. For example, tray 110 can include an auxiliary magnet array such as auxiliary alignment component 3770 (shown in FIG. 37A.) These magnets in the magnet array in tray 110 can be fixed in position or they can move to increase a magnetic attraction to electronic device 190. For example, they can move closer to a top surface of tray 110 and nearer electronic device 190 when tray 110 is or is about to be attached to electronic device 190. Examples of moving magnet arrays are shown below in FIG. 38 through FIG. 45 below. Gaming accessory 100 can further include an additional alignment feature, where the alignment feature can align gaming accessory 100 in a particular orientation relative to electronic device 190. The alignment feature can include magnets in the magnet array. The alignment feature can also or instead be additional magnets that are separate and spaced apart from the magnet array. For example, gaming accessory 100 can include secondary rotational alignment component 2724 (shown in FIG. 27) or other alignment component such as those shown in FIGS. 28-32, while electronic device 190 can include primary rotational alignment component 2722 (shown in FIG. 27) or other alignment component such as those shown in FIGS. 28-32.

Further circuits and components can be included to improve the usefulness of gaming accessory 100. For example, tray 110 can include near field communications circuitry. Near field communications circuitry in electronic device 190 can detect the presence of the near field communications circuitry in tray 110. From this, electronic device 190 can determine that it is attached to tray 110 and can enter a gaming mode of operation.

These near-field communication circuits can also provide data from gaming accessory 100 to electronic device 190, and from electronic device 190 to gaming accessory 100. Current can be provided to a near-field communication coil in electronic device 190. This current can generate a magnetic field. A tag coupled to a near-field communication coil in gaming accessory 100 can provide a time-varying impedance to the magnet field in order to transmit data. The variation in the magnetic field can be detected by the near-field communication circuitry in the electronic device 190. From this, the data transmitted by gaming accessory 100 can be read by electronic device 190. Data can similarly be transmitted from electronic device 190 to gaming accessory 100 Gaming accessory 100 can include a near-field communication coil such as NFC coil 4664 (shown in FIG. 46.)

Data can also or instead be transferred from gaming accessory 100 to electronic device 190 using charging circuitry. For example, control circuitry in gaming accessory 100 can generate currents in a coil of gaming accessory 100. These currents can generate a time-varying magnetic field that can be modulated. The modulation can be in amplitude, phase, frequency, or other parameter. The modulated time-varying magnetic field can induce currents in a corresponding coil in electronic device 190. Control circuitry in electronic device 190 can receive the induced currents and recover data transmitted by gaming accessory 100. Gaming accessory 100 can include a charging coil such as wireless transmitter coil 4612 (shown in FIG. 46) and control circuitry such as control circuitry 4614 (shown in FIG. 46) that can be used in transmitting data. Data can similarly be transferred from electronic device 190 to gaming accessory 100.

Data can also or instead be transferred from gaming accessory 100 to electronic device 190 using Bluetooth or other wireless protocol. Data can similarly be transferred from electronic device 190 to gaming accessory 100.

Various types of data can be transferred between gaming accessory 100 and electronic device 190. For example, button press information, pressure information, directional information, and other types of information can be sent from first game controller 120, second game controller 130, or tray 110 of gaming accessory 100 to electronic device 190. Battery charge status and other status information can also be sent from gaming accessory 100 to electronic device 190. Electronic device 190 can provide information to gaming accessory 100 for the illumination of light-emitting diodes on gaming accessory 100, as well as other types of information.

In these and other embodiments of the present invention, power can be provided to gaming accessory 100 in various ways. For example, gaming accessory 100 can receive wired power. Gaming accessory 100 can also or instead receive wireless power. Gaming accessory 100 can receive wired power through a connector receptacle in first game controller 120, second game controller 130, or tray 110 that can accept a corresponding connector insert attached to a first end of a cable. A second end of the cable can be attached to a power source, such as a host device, electronic device 190, or other charging or other power source. Gaming accessory 100 can receive wireless power from the electronic device 190 or other wireless charger. For example, gaming accessory 100 can include a charging coil such as wireless transmitter coil 4612 (shown in FIG. 46) and control circuitry such as control circuitry 4614 (shown in FIG. 46) that allow gaming accessory 100 to be inductively charged by either electronic device 190, a wireless charger, or other charging device. Power can be stored in one or more batteries that can be housed in one or more of the tray 110, first game controller 120, and second game controller 130.

In this example, first game controller 120 can be attached to side 112 of tray 110, while second game controller 130 can be attached to an opposing side 114 of tray 110. In this configuration, games can be played in a landscape orientation. Other configurations are possible. For example, first game controller 120 can be attached to side 116 of tray 110. Side 116 of tray 110 can be adjacent to side 112 and side 114 of tray 110. Second game controller 130 can be attached to side 118 of tray 110, where side 116 of tray 110 and side 118 of tray 110 are opposing sides. An example is shown in the following figure.

Figure 2:
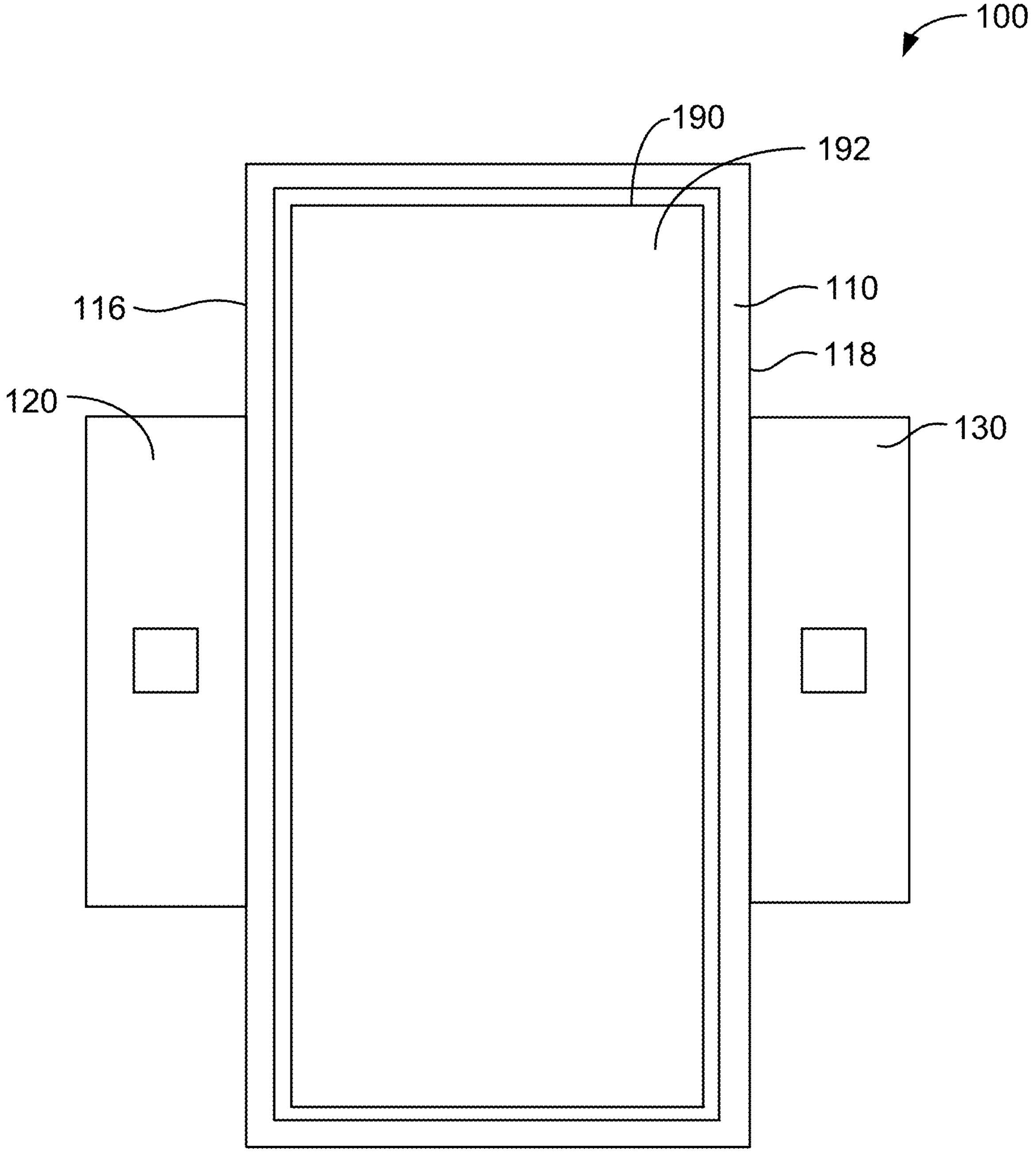
FIG. 2 illustrates the gaming accessory of FIG. 1.

FIG. 2 illustrates the gaming accessory of FIG. 1. In this configuration, first game controller 120 can be attached to side 116 of tray 110. Second game controller 130 can be attached to side 118 of tray 110. In this configuration, first game controller 120 and second game controller 130 can be on sides of electronic device 190, thereby leaving screen 192 at least largely unobstructed. In this configuration, games can be played in a portrait mode using gaming accessory 300.

In these examples, electronic device 190 can be a smart phone, tablet, wearable computing device, or other electronic device. In these and other embodiments of the present invention, a larger screen of a tablet can encourage additional functionality, though this additional functionality can be provided when using a smart phone, wearable computing device, or other electronic device as well. Examples are shown in the following figure.

Figure 3:
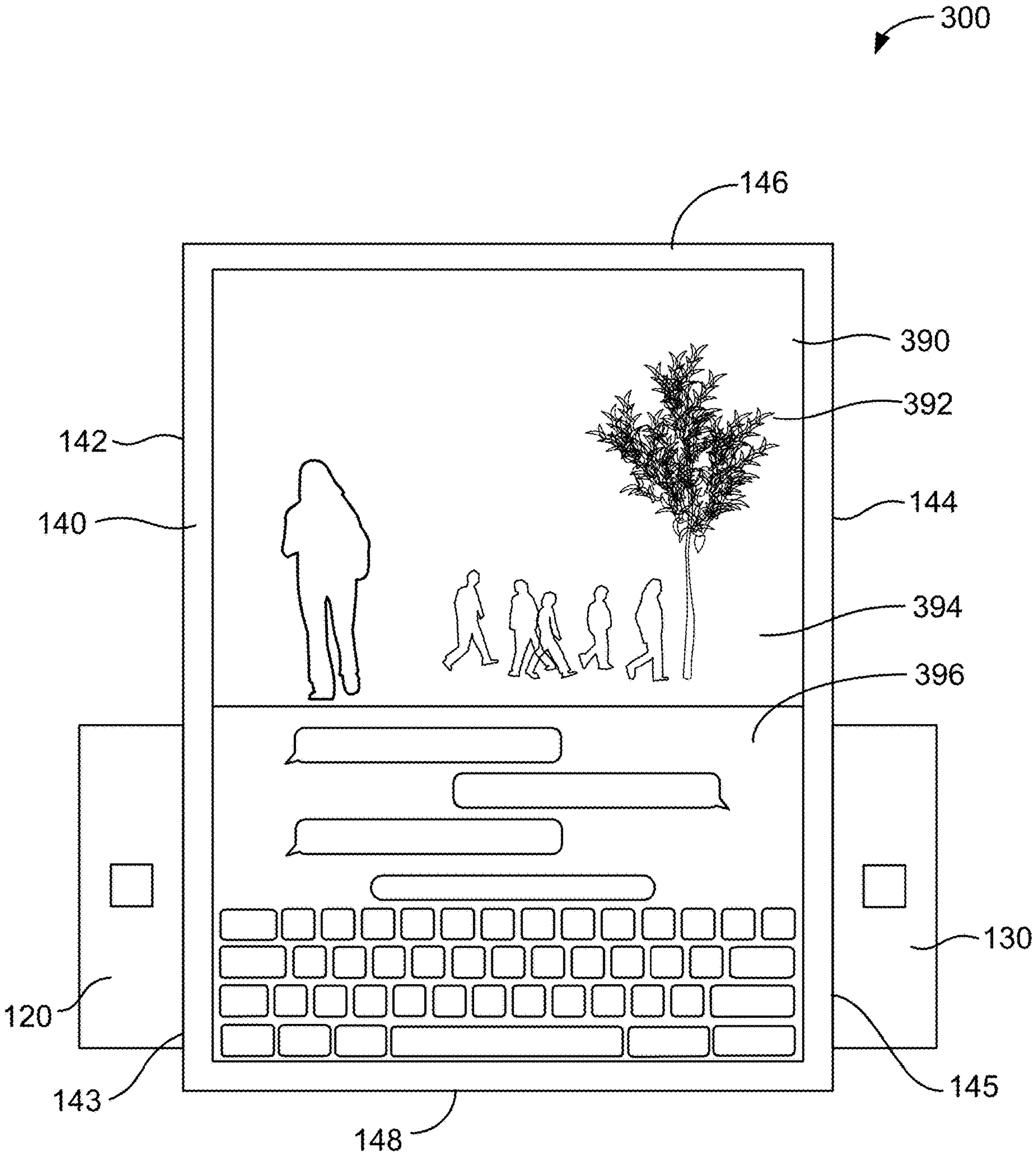
FIG. 3 illustrates another gaming accessory according to an embodiment of the present invention.

FIG. 3 illustrates another gaming accessory according to an embodiment of the present invention. Gaming accessory 300 can include tray 140 supporting electronic device 390. Tray 140 can be similar to tray 110 (shown in FIG. 1.) Tray 140 can be a back panel, cover, or tray that can at least partially cover a backside of electronic device 390. Tray 140 can further cover sides of electronic device 390. First game controller 120 can be attached to side 142 of tray 140, while second game controller 130 can be attached to side 144 of tray 140.

In this example, electronic device 390 can be a tablet computing device having a relatively larger screen 392. The relatively larger screen 392 can be subdivided to show two or more types of information. These two or more types of information can be provided by one, two, or more than two different applications. The division on the screen can be determined by the positions of first game controller 120 and second game controller along their corresponding sides of tray 140. In this example, first game controller 120 can be attached to side 142 of tray 140 at location 143, while second game controller 130 can be attached to side 144 of tray 140 at location 145. This can cause screen 392 to be subdivided into screen portion 394 and screen portion 396. Screen portion 394 and screen portion 396 can convey different types of information, where the different types of information are provided by the same or different sources or applications. In these and other embodiments of the present invention, first game controller 120 can connect to tray 110 at side 146, while second game controller 130 can connect to tray 110 at side 148. While in this example, tray 140 is shown as substantially covering a backside of electronic device 390, in these and other embodiments of the present invention, tray 140 can extend from first game controller 120 to second game controller 130 thereby covering only a portion of a backside of electronic device 390. For example, tray 140 can cover a portion of a backside of electronic device 390 that at least approximately aligns with screen portion 396.

Figure 4A:
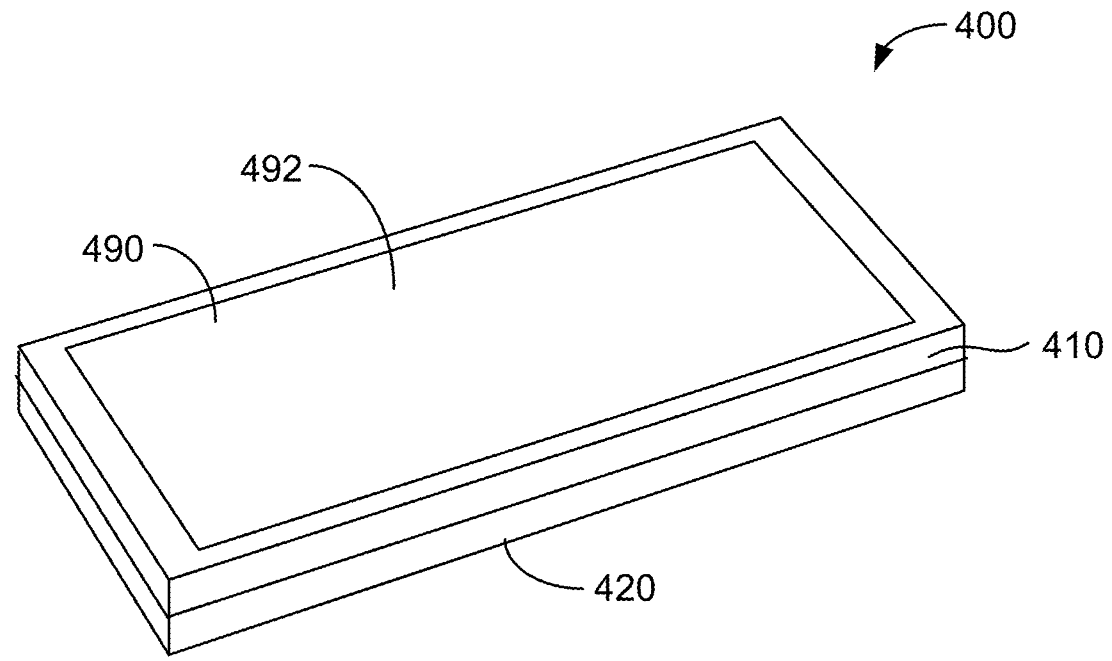
FIG. 4A and FIG. 4B illustrate another gaming accessory according to an embodiment of the present invention.
Figure 4B:
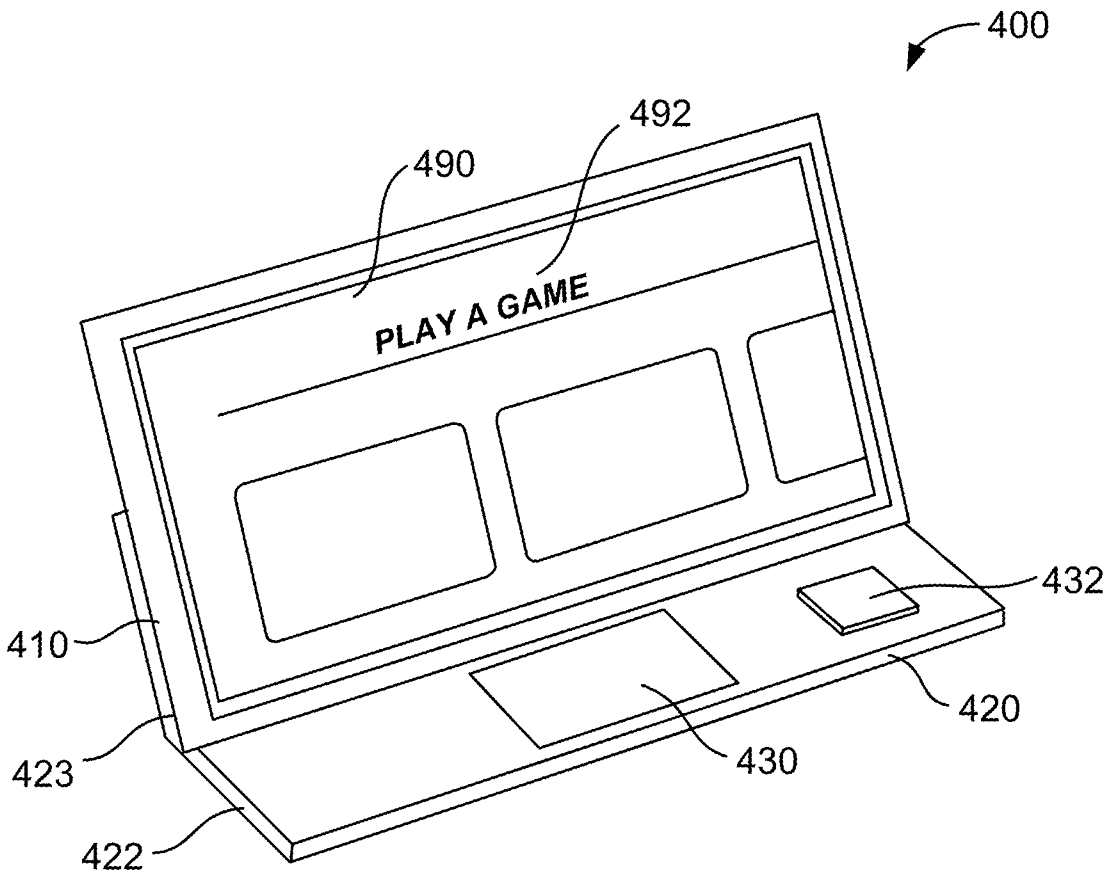

FIG. 4A and FIG. 4B illustrate another gaming accessory according to an embodiment of the present invention. Gaming accessory 400 can include tray 410 to support electronic device 490 having screen 492. Tray 410 can form back panel, cover, or tray for electronic device 490. For example, tray 410 can cover some or all of a back side of electronic device 490. Tray 410 can further cover some or all of sides of electronic device 490. Tray 410 can further be attached to sliding game controller 420. Sliding game controller 420 can slide between two positions. Game controller 420 can be in a first position under tray 410 as shown in FIG. 4A. In this configuration, tray 410 and game controller 420 can be aligned. This aligned arrangement can provide an efficient form factor for transport of electronic device 490 and gaming accessory 400. Game controller 420 can also be in a second position partially out from under tray 410 such that user-input controls 430 and 432 on portion 422 are exposed. Game controller 420 can include hinge 423 to allow portion 422 of game controller 420 to be angled at a desirable position.

Gaming accessory 400 can readily attach to electronic device 490. For example, tray 410 can fit around electronic device 490 leaving screen 492 at least largely unobstructed. Alternatively, tray 410 can magnetically attach to electronic device 490. This can be particularly true when tray 410 has a cover or back panel configuration. Tray 410 can include a magnet that can be attracted to a corresponding magnet in electronic device 490. Tray 410 can also or instead include a number of magnets that can be attracted to a corresponding number of magnets an electronic device 490. Tray 410 can also or instead include a magnet array that can be attracted to a corresponding magnet array in electronic device 490. For example, tray 410 can include a magnet array such as primary magnetic alignment component 1716 (shown in FIG. 17) while electronic device 490 can include a magnet array such as secondary magnetic alignment component 1718 (shown in FIG. 17) or any of the other alignment components shown herein. Alternatively, tray 410 can include a pass-through magnet array. The use of a pass-through magnet array can allow electronic device 490 or gaming accessory 400 to be charged while gaming accessory 400 is attached to electronic device 490. For example, tray 410 can include an auxiliary magnet array such as auxiliary alignment component 3770 (shown in FIG. 37A.) These magnets in the magnet array in tray 410 can be fixed in position or they can move to increase a magnetic attraction to electronic device 490. For example, they can move closer to a top surface of tray 410 and nearer electronic device 490 when tray 410 is or is about to be attached to electronic device 490. Examples of moving magnet arrays are shown below in FIG. 38 through FIG. 45 below. Gaming accessory 400 can further include an additional alignment feature, where the alignment feature can align gaming accessory 400 in a particular orientation relative to electronic device 490. The alignment feature can include magnets in the magnet array. The alignment feature can also or instead be additional magnets that are separate and spaced apart from the magnet array. For example, gaming accessory 400 can include secondary rotational alignment component 2724 (shown in FIG. 27) or other alignment component such as those shown in FIGS. 28-32, while electronic device 490 can include primary rotational alignment component 2722 (shown in FIG. 27) or other alignment component such as those shown in FIGS. 28-32.

Further circuits and components can be included to improve the usefulness of gaming accessory 400. For example, tray 410 can include near field communications circuitry. Near field communications circuitry in electronic device 490 can detect the presence of the near field communications circuitry in tray 410. From this, electronic device 490 can determine that it is attached to tray 410 and can enter a gaming mode of operation.

These near-field communication circuits can also provide data from gaming accessory 400 to electronic device 490, and from electronic device 490 to gaming accessory 400. Current can be provided to a near-field communication coil in electronic device 490. This current can generate a magnetic field. A tag coupled to a near-field communication coil in gaming accessory 400 can provide a time-varying impedance to the magnet field in order to transmit data. The variation in the magnetic field can be detected by the near-field communication circuitry in the electronic device 490. From this, the data transmitted by gaming accessory 400 can be read by electronic device 490. Data can similarly be transmitted from electronic device 490 to gaming accessory 400 Gaming accessory 400 can include a near-field communication coil such as NFC coil 4664 (shown in FIG. 46.)

Data can also or instead be transferred from gaming accessory 400 to electronic device 490 using charging circuitry. For example, control circuitry in gaming accessory 400 can generate currents in a coil of gaming accessory 400. These currents can generate a time-varying magnetic field that can be modulated. The modulation can be in amplitude, phase, frequency, or other parameter. The modulated time-varying magnetic field can induce currents in a corresponding coil in electronic device 490. Control circuitry in electronic device 490 can receive the induced currents and recover data transmitted by gaming accessory 400. Gaming accessory 400 can include a charging coil such as wireless transmitter coil 4612 (shown in FIG. 46) and control circuitry such as control circuitry 4614 (shown in FIG. 46) that can be used in transmitting data. Data can similarly be transferred from electronic device 490 to gaming accessory 400.

Data can also or instead be transferred from gaming accessory 400 to electronic device 490 using Bluetooth or other wireless protocol. Data can similarly be transferred from electronic device 490 to gaming accessory 400.

Various types of data can be transferred between gaming accessory 400 and electronic device 490. For example, button press information, pressure information, directional information, and other types of information can be sent from game controller 420 or other portion of gaming accessory 400 to electronic device 490. Battery charge status and other status information can also be sent from gaming accessory 400 to electronic device 490. Electronic device 490 can provide information to gaming accessory 400 for the illumination of light-emitting diodes on gaming accessory 400, as well as other types of information.

In these and other embodiments of the present invention, power can be provided to gaming accessory 400 in various ways. For example, gaming accessory 400 can receive wired power. Gaming accessory 400 can also or instead receive wireless power. Gaming accessory 400 can receive wired power through a connector receptacle in game controller 420 or tray 410 that can accept a corresponding connector insert attached to a first end of a cable. A second end of the cable can be attached to a power source, such as a host device, electronic device 490, or other charging or other power source. Gaming accessory 400 can receive wireless power from the electronic device 490 or other wireless charger. For example, gaming accessory 400 can include a charging coil such as wireless transmitter coil 4612 (shown in FIG. 46) and control circuitry such as control circuitry 4614 (shown in FIG. 46) that allow gaming accessory 400 to be inductively charged by either electronic device 490, a wireless charger, or other charging device. Power can be stored in one or more batteries that can be housed in one or more of tray 410 and game controller 420.

Figure 5A:
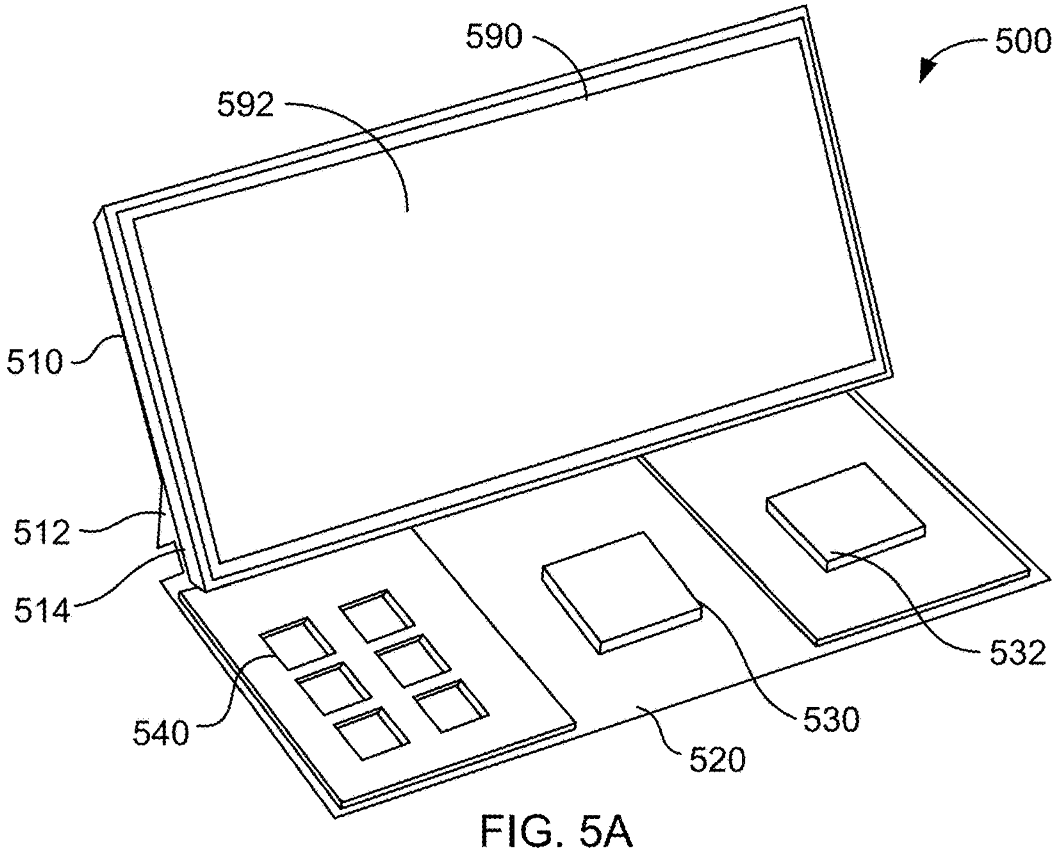
FIG. 5A and FIG. 5B illustrate another game controller according to an embodiment of the present invention.
Figure 5B:
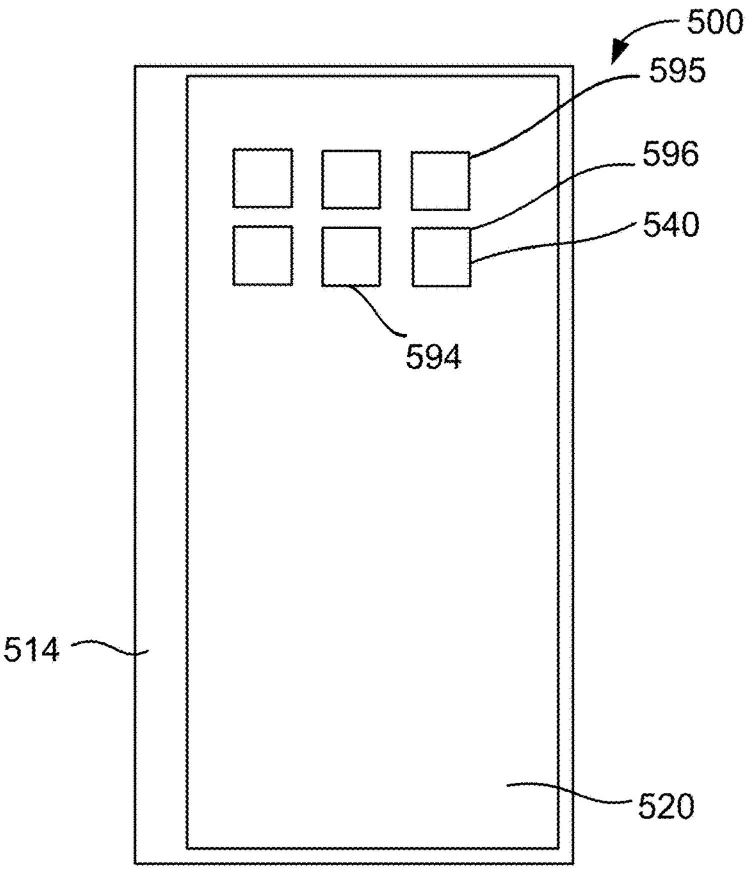

FIG. 5A and FIG. 5B illustrate another game controller according to an embodiment of the present invention. Gaming accessory 500 can have an efficient form factor as a folio including tray 510 and game controller 520. Tray 510 can support electronic device 590. Tray 510 can be a back panel or tray that can cover at least a portion of a back side of electronic device 590. Tray 510 can also cover sides of electronic device 590, thereby leaving screen 592 at least largely unobstructed. Tray 510 can be attached to game controller 520 through hinge 514. Hinge 514 can include portion 512, the can be used to prop up electronic device 590 when game controller 520 is resting on a flat surface.

Game controller 520 can include one or more user-input controls, shown here as user-input controls 530 and 532. User-input controls 530 and 532, as with the other user-input controls shown herein, can include directional or D pads, joysticks, button pads, or other user-input controls. Game controller 520 can provide a cover for screen 592 of electronic device 590 when gaming accessory 500 is in a closed position, as shown in FIG. 5B. Game controller 520 can further include openings 540. Openings 540 can be aligned with images or icons 594 on screen 592 of electronic device 590. Obscured portions of screen 592 not aligned with openings 540 can be off to reduce power dissipation in electronic device 590.

In this way, functionality of electronic device 590 can be accessed even when the folio forming gaming accessory 500 is closed. For example, icon 594 can be touched in order to make a phone call, while calendar information can be accessed by touching icon 595. These icons can be replaced by images for a game by pressing gaming icon 596. Game play can then proceed with the touching of icons 595 in openings 540 controlling the gaming action.

Gaming accessory 500 can readily attach to electronic device 590. For example, tray 510 can fit around electronic device 590. Alternatively, tray 510 can magnetically attach to electronic device 590. This can be particularly true when tray 510 has a cover or back panel configuration. Tray 510 can include a magnet that can be attracted to a corresponding magnet in electronic device 590. Tray 510 can also or instead include a number of magnets that can be attracted to a corresponding number of magnets an electronic device 590. Tray 510 can also or instead include a magnet array that can be attracted to a corresponding magnet array in electronic device 590. For example, tray 510 can include a magnet array such as primary magnetic alignment component 1716 (shown in FIG. 17) while electronic device 590 can include a magnet array such as secondary magnetic alignment component 1718 (shown in FIG. 17) or any of the other alignment components shown herein. Alternatively, tray 510 can include a pass-through magnet array. The use of a pass-through magnet array can allow electronic device 590 or gaming accessory 500 to be charged while gaming accessory 500 is attached to electronic device 590. For example, tray 510 can include an auxiliary magnet array such as auxiliary alignment component 3770 (shown in FIG. 37A.) These magnets in the magnet array in tray 510 can be fixed in position or they can move to increase a magnetic attraction to electronic device 590. For example, they can move closer to a top surface of tray 510 and nearer electronic device 590 when tray 510 is or is about to be attached to electronic device 590. Examples of moving magnet arrays are shown below in FIG. 38 through FIG. 55 below. Gaming accessory 500 can further include an additional alignment feature, where the alignment feature can align gaming accessory 500 in a particular orientation relative to electronic device 590. The alignment feature can include magnets in the magnet array. The alignment feature can also or instead be additional magnets that are separate and spaced apart from the magnet array. For example, gaming accessory 500 can include secondary rotational alignment component 2724 (shown in FIG. 27) or other alignment component such as those shown in FIGS. 28-32, while electronic device 590 can include primary rotational alignment component 2722 (shown in FIG. 27) or other alignment component such as those shown in FIGS. 28-32.

Further circuits and components can be included to improve the usefulness of gaming accessory 500. For example, tray 510 can include near field communications circuitry. Near field communications circuitry in electronic device 590 can detect the presence of the near field communications circuitry in tray 510. From this, electronic device 590 can determine that it is attached to tray 510 and can enter a gaming mode of operation.

These near-field communication circuits can also provide data from gaming accessory 500 to electronic device 590, and from electronic device 590 to gaming accessory 500. Current can be provided to a near-field communication coil in electronic device 590. This current can generate a magnetic field. A tag coupled to a near-field communication coil in gaming accessory 500 can provide a time-varying impedance to the magnet field in order to transmit data. The variation in the magnetic field can be detected by the near-field communication circuitry in the electronic device 590. From this, the data transmitted by gaming accessory 500 can be read by electronic device 590. Data can similarly be transmitted from electronic device 590 to gaming accessory 500 Gaming accessory 500 can include a near-field communication coil such as NFC coil 4664 (shown in FIG. 46.)

Data can also or instead be transferred from gaming accessory 500 to electronic device 590 using charging circuitry. For example, control circuitry in gaming accessory 500 can generate currents in a coil of gaming accessory 500. These currents can generate a time-varying magnetic field that can be modulated. The modulation can be in amplitude, phase, frequency, or other parameter. The modulated time-varying magnetic field can induce currents in a corresponding coil in the electronic device. Control circuitry in electronic device 590 can receive the induced currents and recover data transmitted by gaming accessory 100. Gaming accessory 500 can include a charging coil such as wireless transmitter coil 4612 (shown in FIG. 46) and control circuitry such as control circuitry 4614 (shown in FIG. 46) that can be used in transmitting data. Data can similarly be transferred from electronic device 590 to gaming accessory 500.

Data can also or instead be transferred from gaming accessory 500 to electronic device 590 using Bluetooth or other wireless protocol. Data can similarly be transferred from electronic device 590 to gaming accessory 500.

Various types of data can be transferred between gaming accessory 500 and electronic device 590. For example, button press information, pressure information, directional information, and other types of information can be sent from game controller 520 of gaming accessory 500 to electronic device 590. Battery charge status and other status information can also be sent from gaming accessory 500 to electronic device 590. Electronic device 590 can provide information to gaming accessory 500 for the illumination of light-emitting diodes on gaming accessory 500, as well as other types of information.

In these and other embodiments of the present invention, power can be provided to gaming accessory 500 in various ways. For example, gaming accessory 500 can receive wired power. Gaming accessory 500 can also or instead receive wireless power. Gaming accessory 500 can receive wired power through a connector receptacle in game controller 520 or tray 510 that can accept a corresponding connector insert attached to a first end of a cable. A second end of the cable can be attached to a power source, such as a host device, charging or other power source. Gaming accessory 500 can receive wireless power from the electronic device 590 or other wireless charger. For example, gaming accessory 500 can include a charging coil such as wireless transmitter coil 4612 (shown in FIG. 46) and control circuitry such as control circuitry 4614 (shown in FIG. 46) that allow gaming accessory 500 to be inductively charged by either electronic device 590, a wireless charger, or other charging device. Power can be stored in one or more batteries that can be housed in one or more of tray 510 and game controller 520.

Figure 6A:
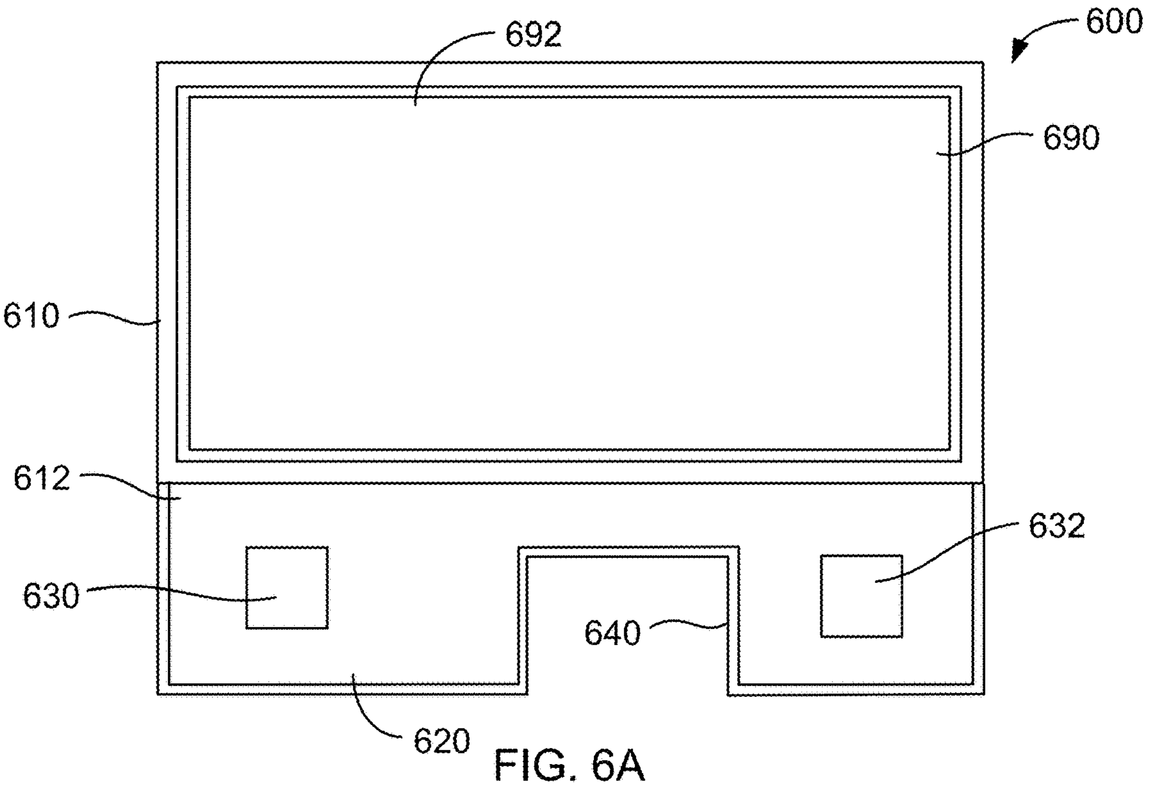
FIG. 6A and FIG. 6B illustrate another gaming accessory according to an embodiment of the present invention.
Figure 6B:
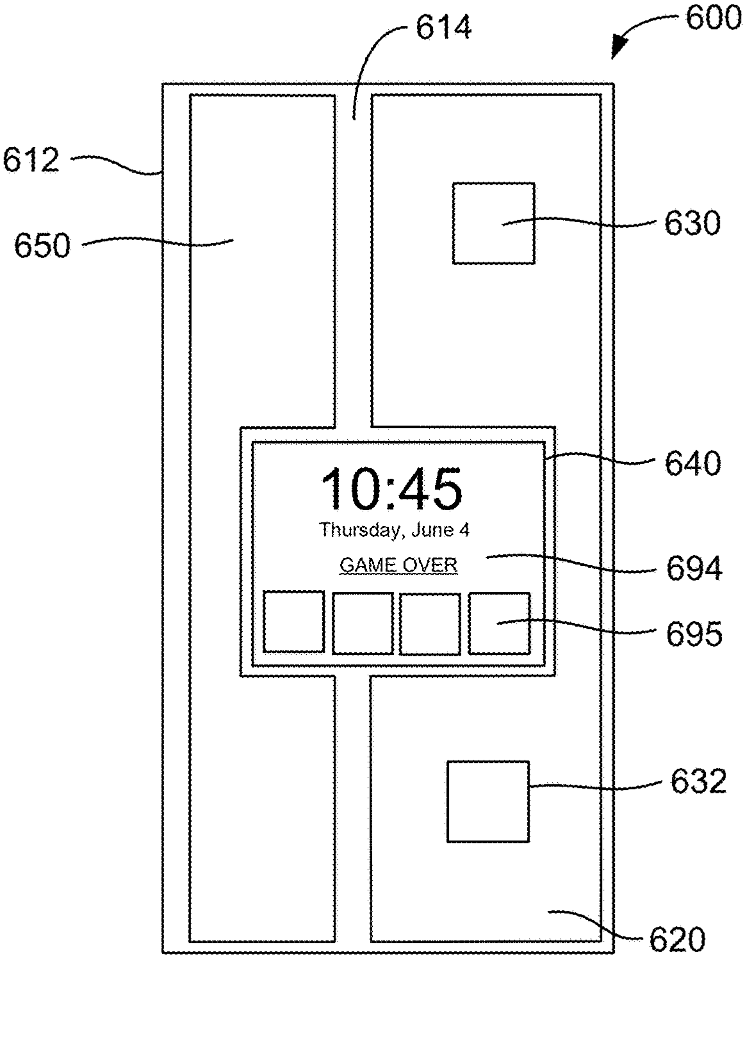

FIG. 6A and FIG. 6B illustrate another gaming accessory according to an embodiment of the present invention. Gaming accessory 600 can have an efficient form factor as a folio that includes tray 610 and game controller 620. Tray 610 can support electronic device 690. Tray 610 can be a back panel or tray that can cover at least a portion of a back side of electronic device 690. Tray 610 can also cover sides of electronic device 690, thereby leaving screen 692 at least largely unobstructed. Tray 610 can be attached to game controller 620 through hinge 612, cover portion 650, and hinge 614. Cover portion 650 and game controller 620 can include cutout 640. Cutout 640 can expose a section 694 of screen 692 of electronic device 690 when game controller 620 and cover portion 650 are closed over screen 692 of electronic device 690.

As shown in FIG. 6A, when the folio of gaming accessory 600 is open, game controller 620 can be folded over cover portion 650 along hinge 614. This can position user-interface controls 630 and 632 where they can be easily manipulated to control game action on the screen 692 of electronic device 690. Cutout 640 can be used to improve a game player's grip. As shown in FIG. 6B, when the folio of gaming accessory 600 is closed, game controller 620 can be located on a top surface of electronic device 690. Cutout 640 can expose section 694 of screen 692 of electronic device 690. The remaining sections of screen 692 that are not exposed by cutout 640 can be turned off to reduce power consumption of electronic device 690. User-interface controls 630 and 632 on game controller 620 can be manipulated to control gameplay and other information 695 displayed on section 694 of screen 692.

Figure 7A:
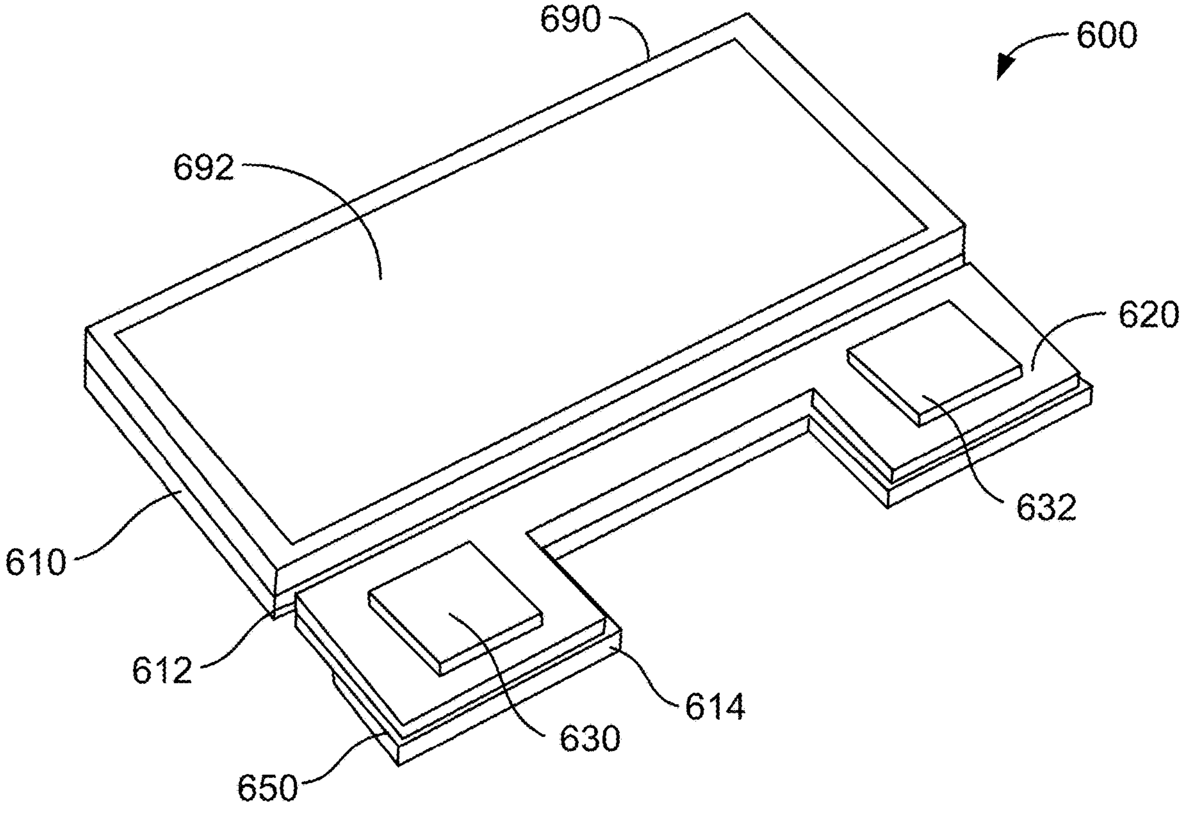
FIG. 7A and FIG. 7B illustrate the gaming accessory of FIG. 6A and FIG. 6B.
Figure 7B:
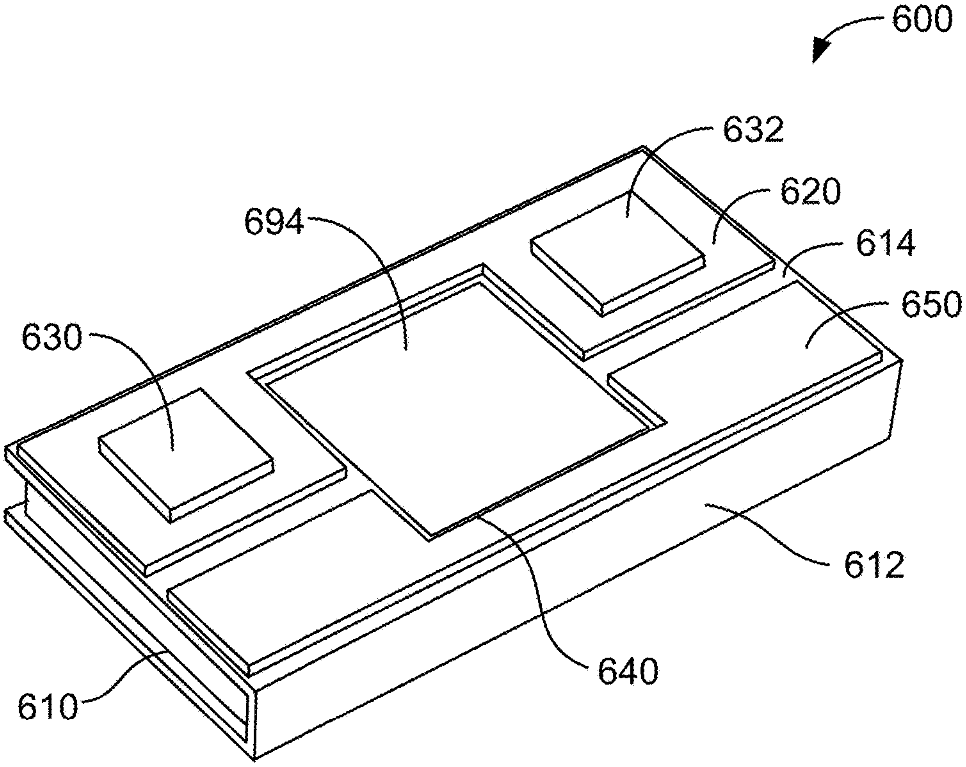

FIG. 7A and FIG. 7B illustrate the gaming accessory of FIG. 6A and FIG. 6B. As before, tray 610 can support electronic device 690, leaving screen 692 at least largely unobstructed. In FIG. 7A, game controller 620 and cover portion 650 can be opened along hinge 612. Game controller 620 can be folded over cover portion 650 along hinge 614 as shown, thereby positioning user-interface controls 630 and 632 where they may be manipulated to control gameplay on screen 692 of electronic device 690. In FIG. 7B, game controller 620 and cover portion 650 can be positioned on screen 692 of electronic device 690. Game controller 620 and cover portion 650 can include cut out 640. Cut out 640 can again expose section 694 of screen 692 of electronic device 690.

Gaming accessory 600 can readily attach to electronic device 690. For example, tray 610 can fit around electronic device 690. Alternatively, tray 610 can magnetically attach to electronic device 690. This can be particularly true when tray 610 has a cover or back panel configuration. Tray 610 can include a magnet that can be attracted to a corresponding magnet in electronic device 690. Tray 610 can also or instead include a number of magnets that can be attracted to a corresponding number of magnets an electronic device 690. Tray 610 can also or instead include a magnet array that can be attracted to a corresponding magnet array in electronic device 690. For example, tray 610 can include a magnet array such as primary magnetic alignment component 1716 (shown in FIG. 17) while electronic device 690 can include a magnet array such as secondary magnetic alignment component 1718 (shown in FIG. 17) or any of the other alignment components shown herein. Alternatively, tray 610 can include a pass-through magnet array. The use of a pass-through magnet array can allow electronic device 690 or gaming accessory 600 to be charged while gaming accessory 600 is attached to electronic device 690. For example, tray 610 can include an auxiliary magnet array such as auxiliary alignment component 3770 (shown in FIG. 37A.) These magnets in the magnet array in tray 610 can be fixed in position or they can move to increase a magnetic attraction to electronic device 690. For example, they can move closer to a top surface of tray 610 and nearer electronic device 690 when tray 610 is or is about to be attached to electronic device 690. Examples of moving magnet arrays are shown below in FIG. 38 through FIG. 55 below. Gaming accessory 600 can further include an additional alignment feature, where the alignment feature can align gaming accessory 600 in a particular orientation relative to electronic device 690. The alignment feature can include magnets in the magnet array. The alignment feature can also or instead be additional magnets that are separate and spaced apart from the magnet array. For example, gaming accessory 600 can include secondary rotational alignment component 2724 (shown in FIG. 27) or other alignment component such as those shown in FIGS. 28-32, while electronic device 690 can include primary rotational alignment component 2722 (shown in FIG. 27) or other alignment component such as those shown in FIGS. 28-32.

Further circuits and components can be included to improve the usefulness of gaming accessory 600. For example, tray 610 can include near field communications circuitry. Near field communications circuitry in electronic device 690 can detect the presence of the near field communications circuitry in tray 610. From this, electronic device 690 can determine that it is attached to tray 610 and can enter a gaming mode of operation.

These near-field communication circuits can also provide data from gaming accessory 600 to electronic device 690, and from electronic device 690 to gaming accessory 600. Current can be provided to a near-field communication coil in electronic device 690. This current can generate a magnetic field. A tag coupled to a near-field communication coil in gaming accessory 600 can provide a time-varying impedance to the magnet field in order to transmit data. The variation in the magnetic field can be detected by the near-field communication circuitry in the electronic device 690. From this, the data transmitted by gaming accessory 600 can be read by electronic device 690. Data can similarly be transmitted from electronic device 690 to gaming accessory 600 Gaming accessory 600 can include a near-field communication coil such as NFC coil 4664 (shown in FIG. 46.)

Data can also or instead be transferred from gaming accessory 600 to electronic device 690 using charging circuitry. For example, control circuitry in gaming accessory 600 can generate currents in a coil of gaming accessory 600. These currents can generate a time-varying magnetic field that can be modulated. The modulation can be in amplitude, phase, frequency, or other parameter. The modulated time-varying magnetic field can induce currents in a corresponding coil in electronic device 690. Control circuitry in electronic device 690 can receive the induced currents and recover data transmitted by gaming accessory 600. Gaming accessory 600 can include a charging coil such as wireless transmitter coil 4612 (shown in FIG. 46) and control circuitry such as control circuitry 4614 (shown in FIG. 46) that can be used in transmitting data. Data can similarly be transferred from electronic device 690 to gaming accessory 600.

Data can also or instead be transferred from gaming accessory 600 to electronic device 690 using Bluetooth or other wireless protocol. Data can similarly be transferred from electronic device 690 to gaming accessory 600.

Various types of data can be transferred between gaming accessory 600 and electronic device 690. For example, button press information, pressure information, directional information, and other types of information can be sent from game controller 620 of gaming accessory 600 to electronic device 690. Battery charge status and other status information can also be sent from gaming accessory 600 to electronic device 690. Electronic device 690 can provide information to gaming accessory 600 for the illumination of light-emitting diodes on gaming accessory 600, as well as other types of information.

In these and other embodiments of the present invention, power can be provided to gaming accessory 600 in various ways. For example, gaming accessory 600 can receive wired power. Gaming accessory 600 can also or instead receive wireless power. Gaming accessory 600 can receive wired power through a connector receptacle in game controller 620 or tray 610 that can accept a corresponding connector insert attached to a first end of a cable. A second end of the cable can be attached to a power source, such as a host device, charging or other power source. Gaming accessory 600 can receive wireless power from the electronic device 690 or other wireless charger. For example, gaming accessory 600 can include a charging coil such as wireless transmitter coil 4612 (shown in FIG. 46) and control circuitry such as control circuitry 4614 (shown in FIG. 46) that allow gaming accessory 600 to be inductively charged by either electronic device 690, a wireless charger, or other charging device. Power can be stored in one or more batteries that can be housed in one or more of tray 610 and game controller 620.

Figure 8A:
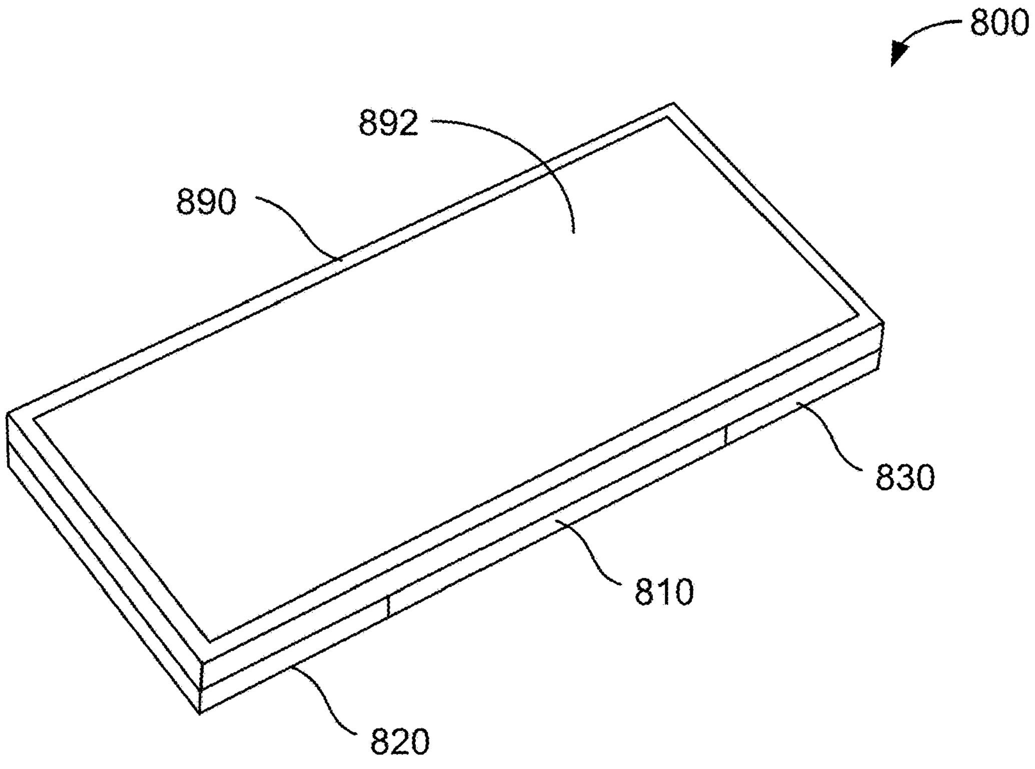
FIG. 8A and FIG. 8B illustrate another gaming accessory according to an embodiment of the present invention.
Figure 8B:
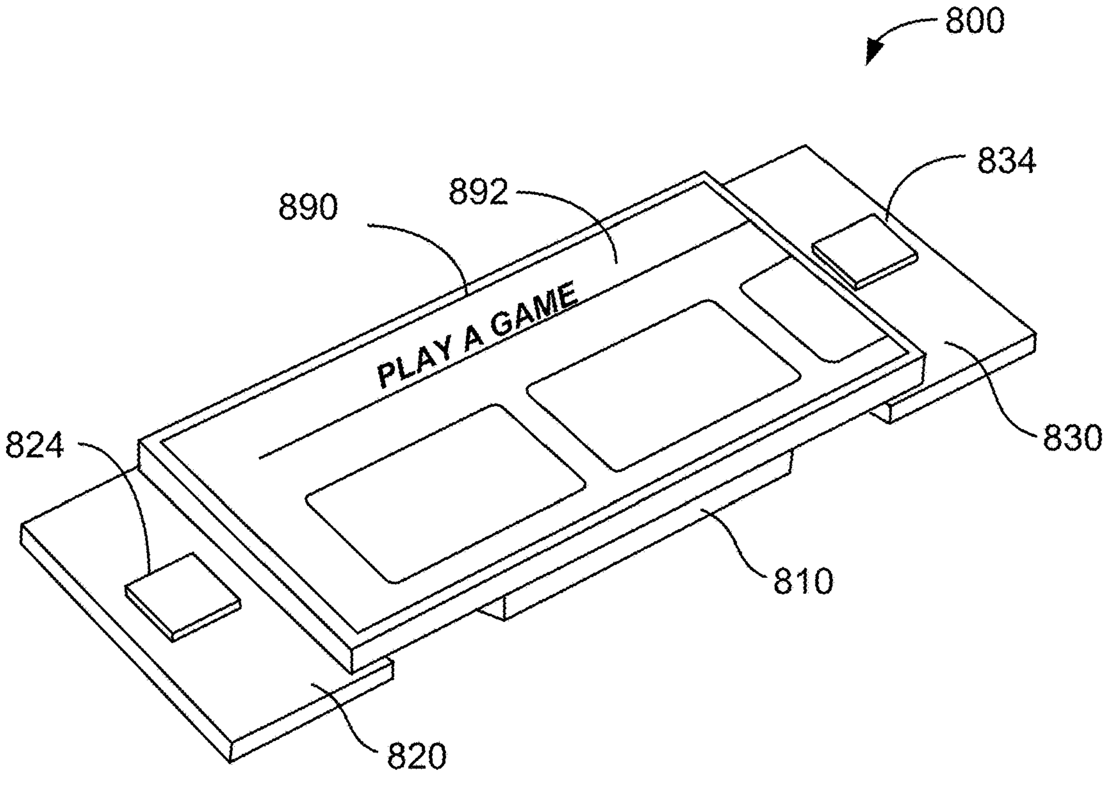

FIG. 8A and FIG. 8B illustrate another gaming accessory according to an embodiment of the present invention. Gaming accessory 800 can have an efficient form factor by having a profile that is at least similar to a profile of an electronic device. For example, gaming accessory 800 can include a base 810, first game controller 820, and second game controller 830. As shown in FIG. 8A, first game controller 820 can be in a first position adjacent to base 810 and adjacent to a back side of electronic device 890. Similarly, second game controller 830 can also be in a first position adjacent to base 810 and adjacent to a back side of electronic device 890. When first game controller 820 and second game controller 830 are in this first position, gaming accessory 800 can have a profile that is similar to a profile for electronic device 890. That is, and outer perimeter of gaming accessory 800 can be at least approximately coincident with an outer perimeter of electronic device 890. As shown in FIG. 8B, first game controller 820 can move to a second position away from base 810. This can expose user-interface control 824 where it can be manipulated to control gameplay on screen 892 of electronic device 890. Similarly, second game controller 830 can move to a second position away from base 810. This can expose user-interface control 834, where it can be manipulated to control gameplay on screen 892 of electronic device 890.

Figure 9A:
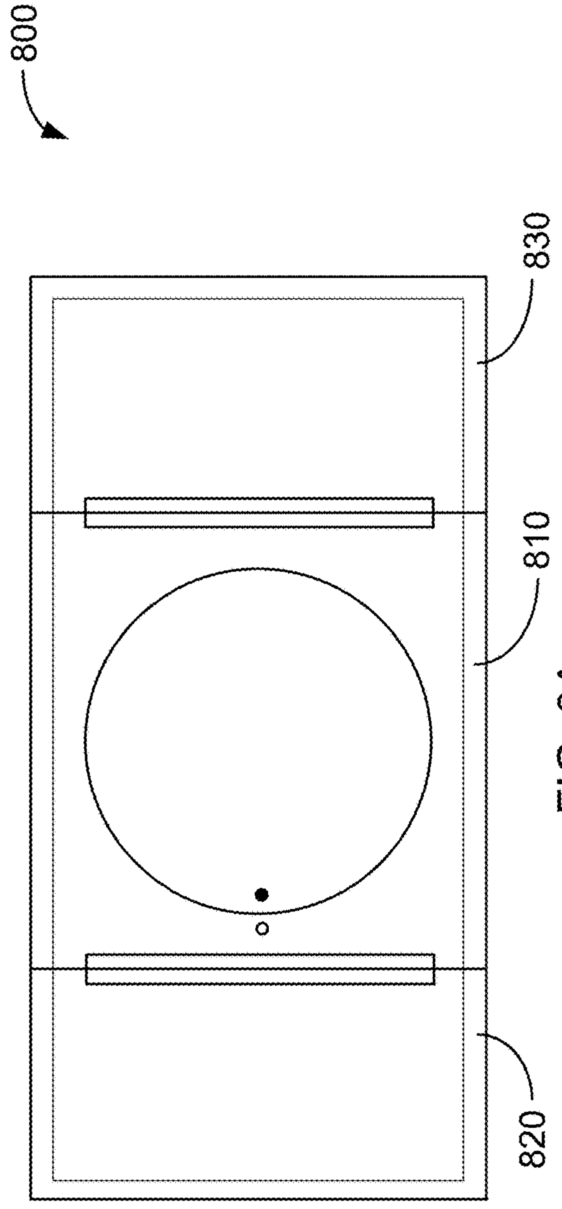
FIG. 9A and FIG. 9B illustrate a backside of the gaming accessory of FIG. 8A and FIG. 8B.
Figure 9B:
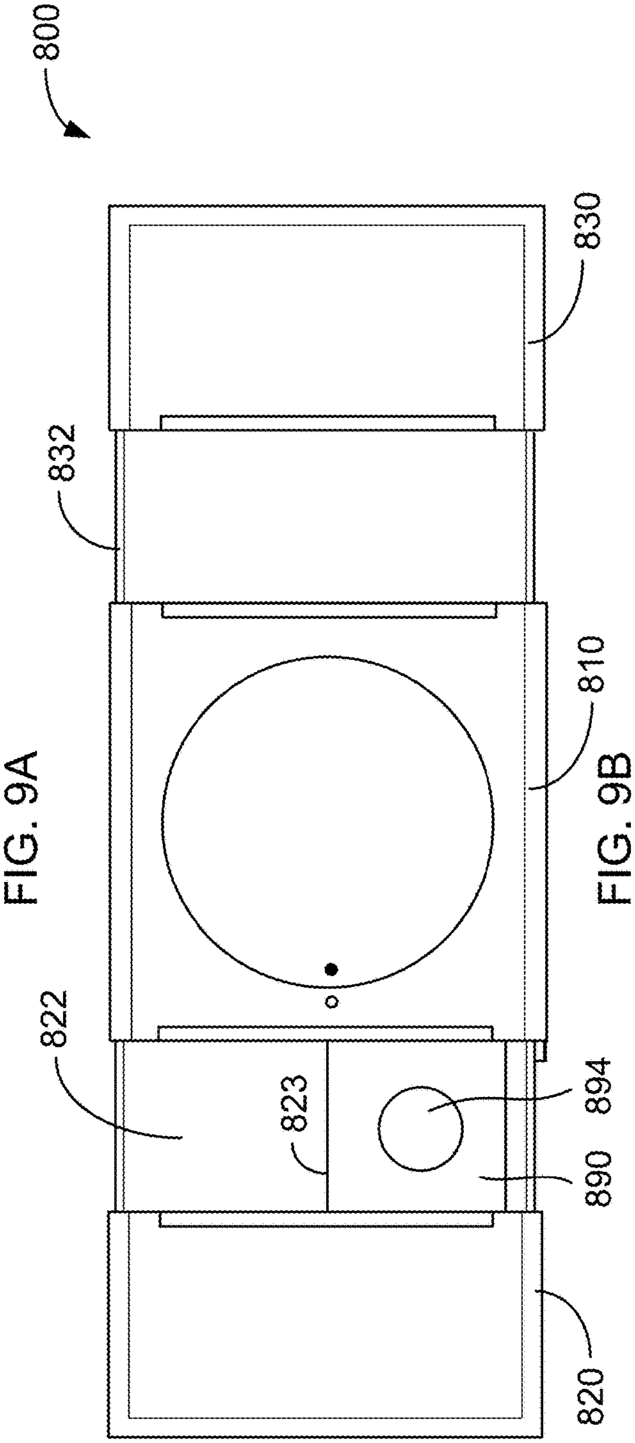

FIG. 9A and FIG. 9B illustrate a backside of the gaming accessory of FIG. 8A and FIG. 8B. In FIG. 9A, first game controller 820 can be in a first position adjacent to base 810. Second game controller 830 can be in a first position adjacent to base 810. In this configuration, the closed gaming accessory 800 can have a similar profile or perimeter as electronic device 890. In FIG. 9B, first game controller 820 can be moved to a second position away from base 810. First game controller 820 can slide along plate 822. Plate 822 can be attached to first game controller 820 and can slide in and out of base 810. Alternatively, plate 822 can be attached to base 810 and can slide in and out of first game controller 820. Alternatively, plate 822 can float and can slide in and out of first game controller 820 and base 810. Similarly, plate 832 can be attached second game controller 830 and can slide in and out of base 810. Alternatively, plate 832 can be attached to base 810 and can slide in and out of second game controller 830. Alternatively, plate 832 can float and can slide in and out of second game controller 830 and base 810. Plate 822 can include opening 823 for lenses or other components 894 on a backside of electronic device 890.

In this configuration, games can be played in a landscape orientation. In these and other embodiments of the present invention, gaming accessory 800 can be used to play games in a portrait orientation. An example is shown in the following figure.

Figure 10A:
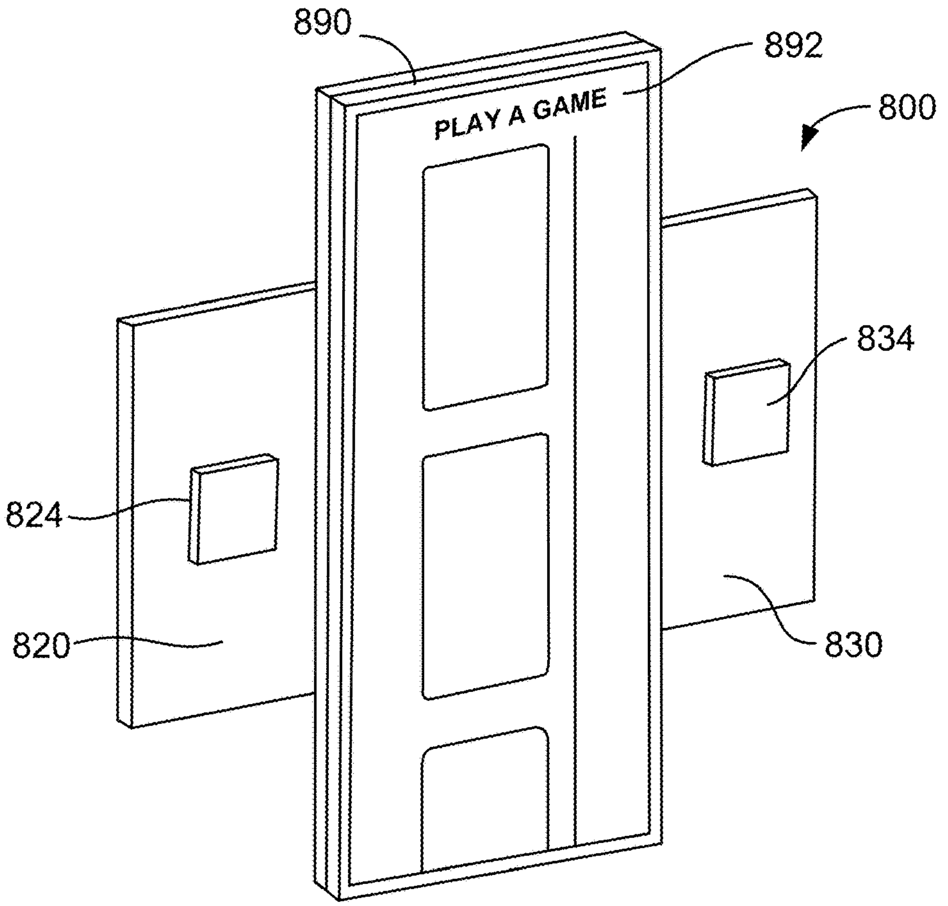
FIG. 10A and FIG. 10B illustrate the gaming accessory of FIG. 8A and FIG. 8B.
Figure 10B:
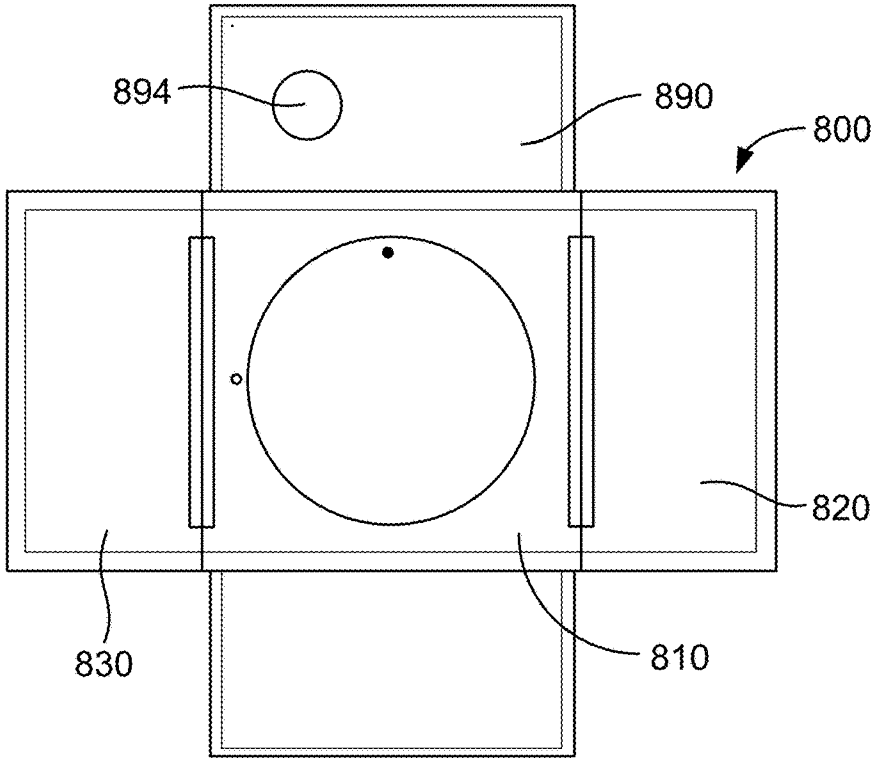

FIG. 10A and FIG. 10B illustrate the gaming accessory of FIG. 8A and FIG. 8B. In this example, gaming accessory 800 can be attached to a back side of electronic device 890. First game controller 820 can be in the first position adjacent to base 810. Similarly, second game controller 830 can be in the first position adjacent to base 810. The portrait orientation of electronic device 890 can expose user-interface controls 824 on first game controller 820 and user-interface control 834 on second game controller 830. Lenses or other components 894, as well as screen 892, can remain at least largely unobstructed by gaming accessory 800.

Gaming accessory 800 can readily attach to electronic device 890. For example, base 810 can fit around electronic device 890. Alternatively, base 810 can magnetically attach to electronic device 890. This can be particularly true when base 810 has a cover or back panel configuration. Base 810 can include a magnet that can be attracted to a corresponding magnet in electronic device 890. Base 810 can also or instead include a number of magnets that can be attracted to a corresponding number of magnets an electronic device 890. Base 810 can also or instead include a magnet array that can be attracted to a corresponding magnet array in electronic device 890. For example, base 810 can include a magnet array such as primary magnetic alignment component 1716 (shown in FIG. 17) while electronic device 890 can include a magnet array such as secondary magnetic alignment component 1718 (shown in FIG. 17) or any of the other alignment components shown herein. Alternatively, base 810 can include a pass-through magnet array. The use of a pass-through magnet array can allow electronic device 890 or gaming accessory 800 to be charged while gaming accessory 800 is attached to electronic device 890. For example, base 810 can include an auxiliary magnet array such as auxiliary alignment component 3770 (shown in FIG. 37A.) These magnets in the magnet array in base 810 can be fixed in position or they can move to increase a magnetic attraction to electronic device 890. For example, they can move closer to a top surface of base 810 and nearer electronic device 890 when base 810 is or is about to be attached to electronic device 890. Examples of moving magnet arrays are shown below in FIG. 38 through FIG. 55 below. Gaming accessory 800 can further include an additional alignment feature, where the alignment feature can align gaming accessory 800 in a particular orientation relative to electronic device 890. The alignment feature can include magnets in the magnet array. The alignment feature can also or instead be additional magnets that are separate and spaced apart from the magnet array. For example, gaming accessory 800 can include secondary rotational alignment component 2724 (shown in FIG. 27) or other alignment component such as those shown in FIGS. 28-32, while electronic device 890 can include primary rotational alignment component 2722 (shown in FIG. 27) or other alignment component such as those shown in FIGS. 28-32.

Further circuits and components can be included to improve the usefulness of gaming accessory 800. For example, base 810 can include near field communications circuitry. Near field communications circuitry in electronic device 890 can detect the presence of the near field communications circuitry in base 810. From this, electronic device 890 can determine that it is attached to base 810 and can enter a gaming mode of operation.

These near-field communication circuits can also provide data from gaming accessory 800 to electronic device 890, and from electronic device 890 to gaming accessory 800. Current can be provided to a near-field communication coil in electronic device 890. This current can generate a magnetic field. A tag coupled to a near-field communication coil in gaming accessory 800 can provide a time-varying impedance to the magnet field in order to transmit data. The variation in the magnetic field can be detected by the near-field communication circuitry in the electronic device 890. From this, the data transmitted by gaming accessory 800 can be read by electronic device 890. Data can similarly be transmitted from electronic device 890 to gaming accessory 800 Gaming accessory 800 can include a near-field communication coil such as NFC coil 4664 (shown in FIG. 46.)

Data can also or instead be transferred from gaming accessory 800 to electronic device using charging circuitry. For example, control circuitry in gaming accessory 800 can generate currents in a coil of gaming accessory 800. These currents can generate a time-varying magnetic field that can be modulated. The modulation can be in amplitude, phase, frequency, or other parameter. The modulated time-varying magnetic field can induce currents in a corresponding coil in electronic device 890. Control circuitry in electronic device 890 can receive the induced currents and recover data transmitted by gaming accessory 800. Gaming accessory 800 can include a charging coil such as wireless transmitter coil 4612 (shown in FIG. 46) and control circuitry such as control circuitry 4614 (shown in FIG. 46) that can be used in transmitting data. Data can similarly be transferred from electronic device 890 to gaming accessory 800.

Data can also or instead be transferred from gaming accessory 800 to electronic device 890 using Bluetooth or other wireless protocol. Data can similarly be transferred from electronic device 890 to gaming accessory 800.

Various types of data can be transferred between gaming accessory 800 and electronic device 890. For example, button press information, pressure information, directional information, and other types of information can be sent from first game controller 820 and second game controller of gaming accessory 800 to electronic device 890. Battery charge status and other status information can also be sent from gaming accessory 800 to electronic device 890. Electronic device 890 can provide information to gaming accessory 800 for the illumination of light-emitting diodes on gaming accessory 800, as well as other types of information.

In these and other embodiments of the present invention, power can be provided to gaming accessory 800 in various ways. For example, gaming accessory 800 can receive wired power. Gaming accessory 800 can also or instead receive wireless power. Gaming accessory 800 can receive wired power through a connector receptacle in first game controller 820 or base 810 that can accept a corresponding connector insert attached to a first end of a cable. A second end of the cable can be attached to a power source, such as a host device, charging or other power source. Gaming accessory 800 can receive wireless power from the electronic device 890 or other wireless charger. For example, gaming accessory 800 can include a charging coil such as wireless transmitter coil 4612 (shown in FIG. 46) and control circuitry such as control circuitry 4614 (shown in FIG. 46) that allow gaming accessory 800 to be inductively charged by either electronic device 890, a wireless charger, or other charging device. Power can be stored in one or more batteries that can be housed in one or more of base 810, first game controller 820, and second game controller 830.

Figure 11:
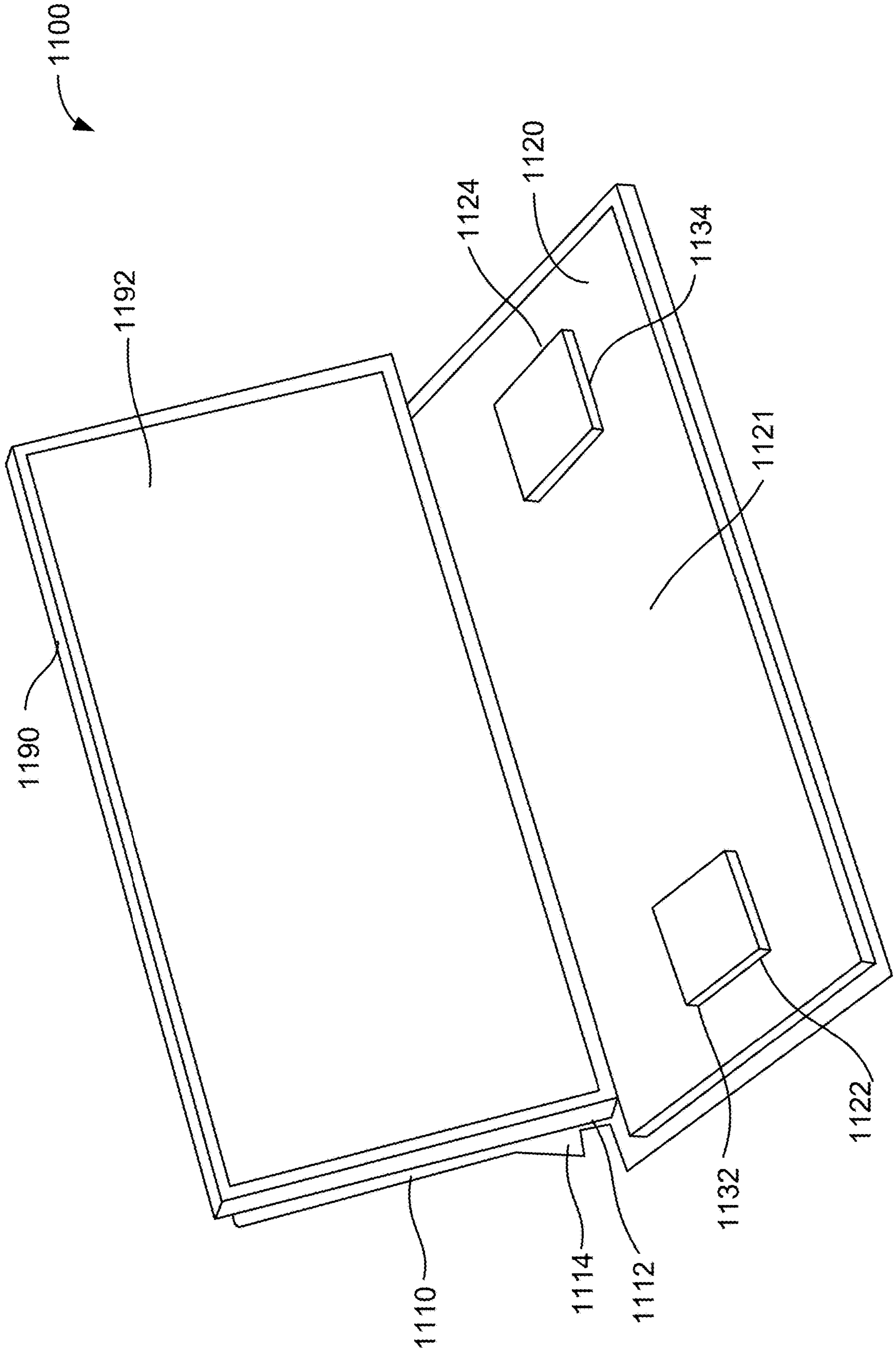
FIG. 11 illustrates another gaming accessory according to an embodiment of the present invention.

FIG. 11 illustrates another gaming accessory according to an embodiment of the present invention. Gaming accessory

1100 can have an efficient form factor as a folio that includes tray 1110 and game controller 1120. Tray 1110 can support electronic device 1190. Tray 1110 can be a back panel or tray that can cover at least a portion of a back side of electronic device 1190. Tray 1110 can also cover sides of electronic device 1190, thereby leaving screen 1192 at least largely unobstructed. Tray 1110 can be attached to game controller 1120 through hinge 1112.

Game controller 1120 can include cover screen 1121. Opening 1122 and opening 1124 can be formed in cover screen 1121. Opening 1122 and opening 1124 can provide passage for user-interface control 1132 and user-interface control 1134. User-interface control 1132 and user-interface control 1134 can themselves have a screen, display, or icon on a top surface. Cover screen 1121 can act as a second screen to gameplay action on screen 1192 of electronic device 1190. Information on cover screen 1121 can be provided by the same or a different application as information displayed on screen 1192.

In this configuration, tray 1110 can include portion 1114 attached to hinge 1112. Portion 1114 can fold out away from a backside of electronic device 1190. Portion 1114 can act to prop-up electronic device 1190 when game controller 1120 is resting on a flat surface. Other configurations are possible. Examples are shown in the following figures.

Figure 12:
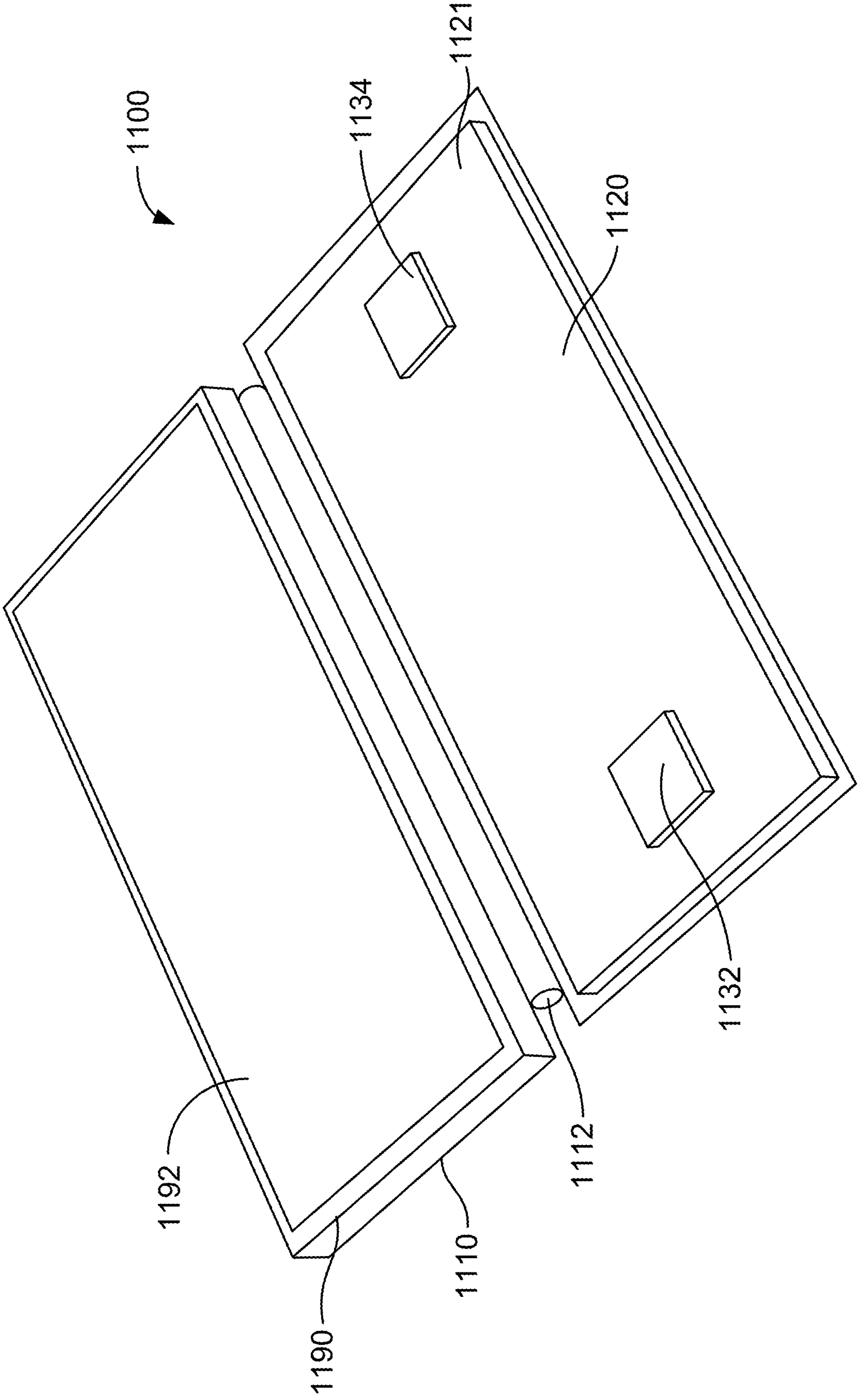
FIG. 12 illustrates the gaming accessory of FIG. 11.

FIG. 12 illustrates the gaming accessory of FIG. 11. In this example, hinge 1112 can allow gaming accessory 1100 to be opened to a flat position. This configuration can allow head-to-head competition, where a first game player can play a game using virtual controls on screen 1192 of electronic device 1190 and a second game player can play the game using cover screen 1121 and user-interface controls 1132 and 1134 on game controller 1120. In this example, screen 1192 and cover screen 1121 can be used as a single larger virtual screen where gameplay action occurs on both screens. In other examples, screen 1192 and cover screen 1121 can be used to show separate images.

Figure 13A:
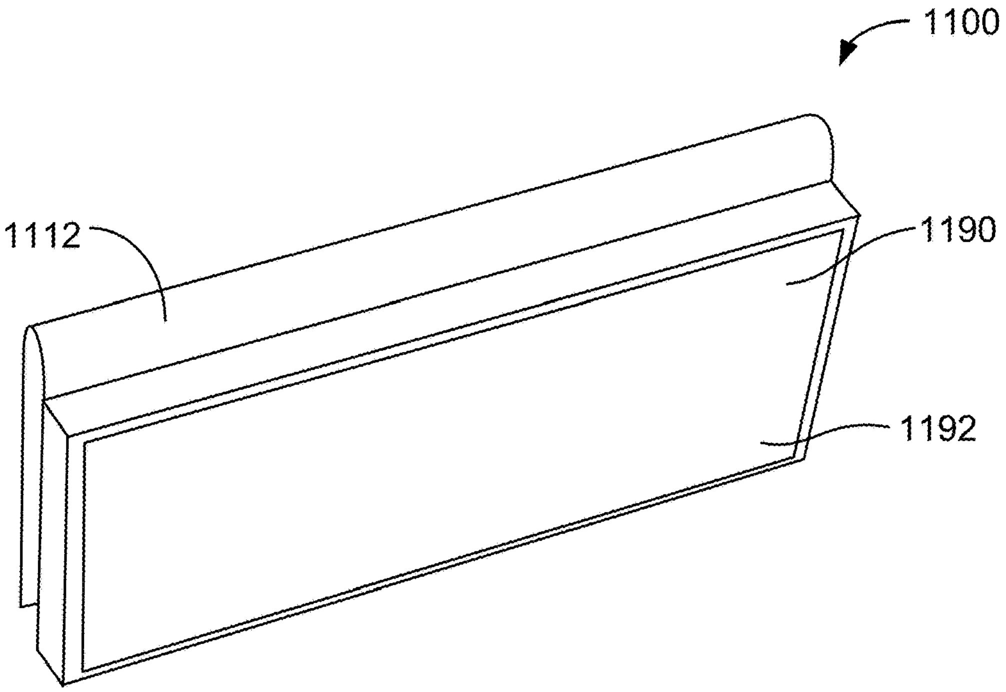
FIG. 13A and FIG. 13B illustrate the gaming accessory of FIG. 11.
Figure 13B:
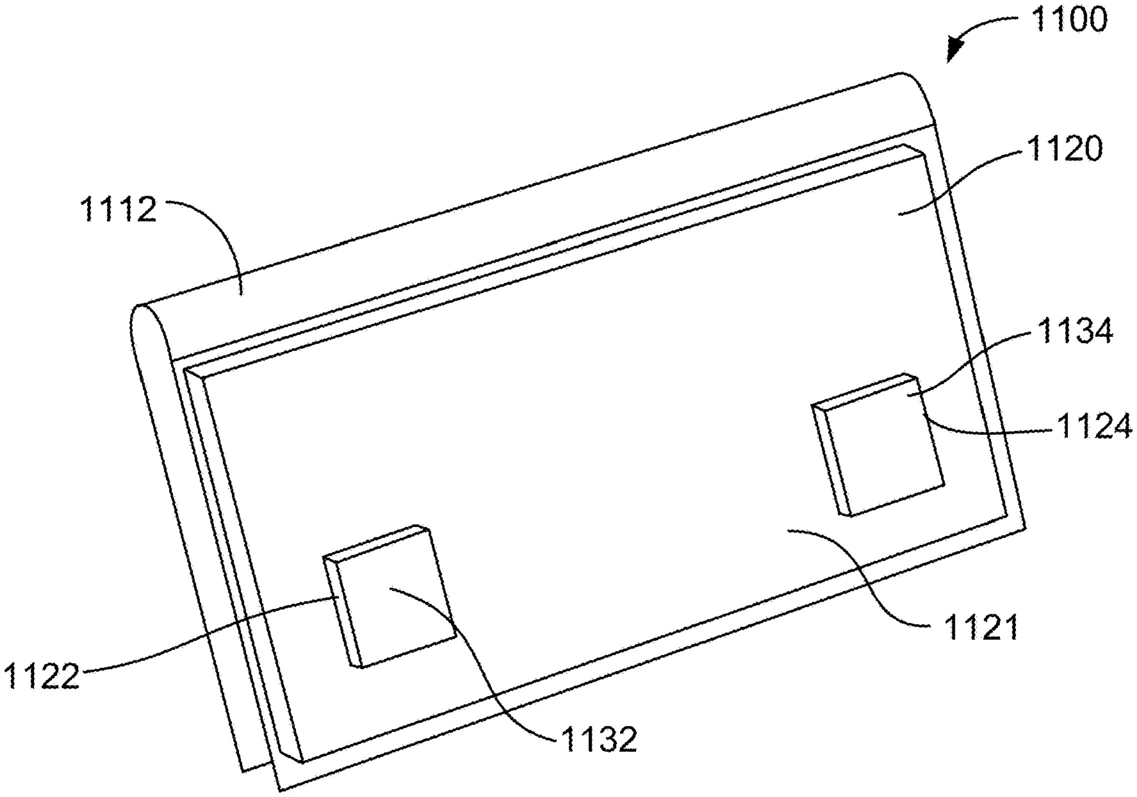

FIG. 13A and FIG. 13B illustrate the gaming accessory of FIG. 11. In this example, hinge 1112 can allow screen 1192 of electronic device 1190 and cover screen 1121 of gaming accessory 1100 to face in opposite directions. In FIG. 13A, a first game player can observe a screen 1192 of electronic device 1190, while electronic device 1190 is being used by second game player. In this example, the first game player can read information about the status of gameplay by the second game player on screen 1192. In FIG. 13B, the first game player can manipulate gameplay on cover screen 1121 of gaming accessory 1100 using user-interface control 1132 and user-interface control 1134. User-interface control 1132 can be positioned in opening 1122 of cover screen 1121. User-interface control 1134 can be positioned in opening 1124 of cover screen 1121. In this way, the first game player can play a game holding a first gaming accessory 1100 (as shown in FIG. 13B) and can observe status or other information about a second game player holding a second gaming accessory 1100 (as shown in FIG. 13A.)

The two screens, screen 1192 of electronic device 1190, and cover screen 1121 of game controller 1120 can be used as a single screen as shown in FIG. 12. This can be useful in gaming applications. This can also be useful in virtual reality or augmented reality applications. An example is shown in the following figure.

Figure 14:
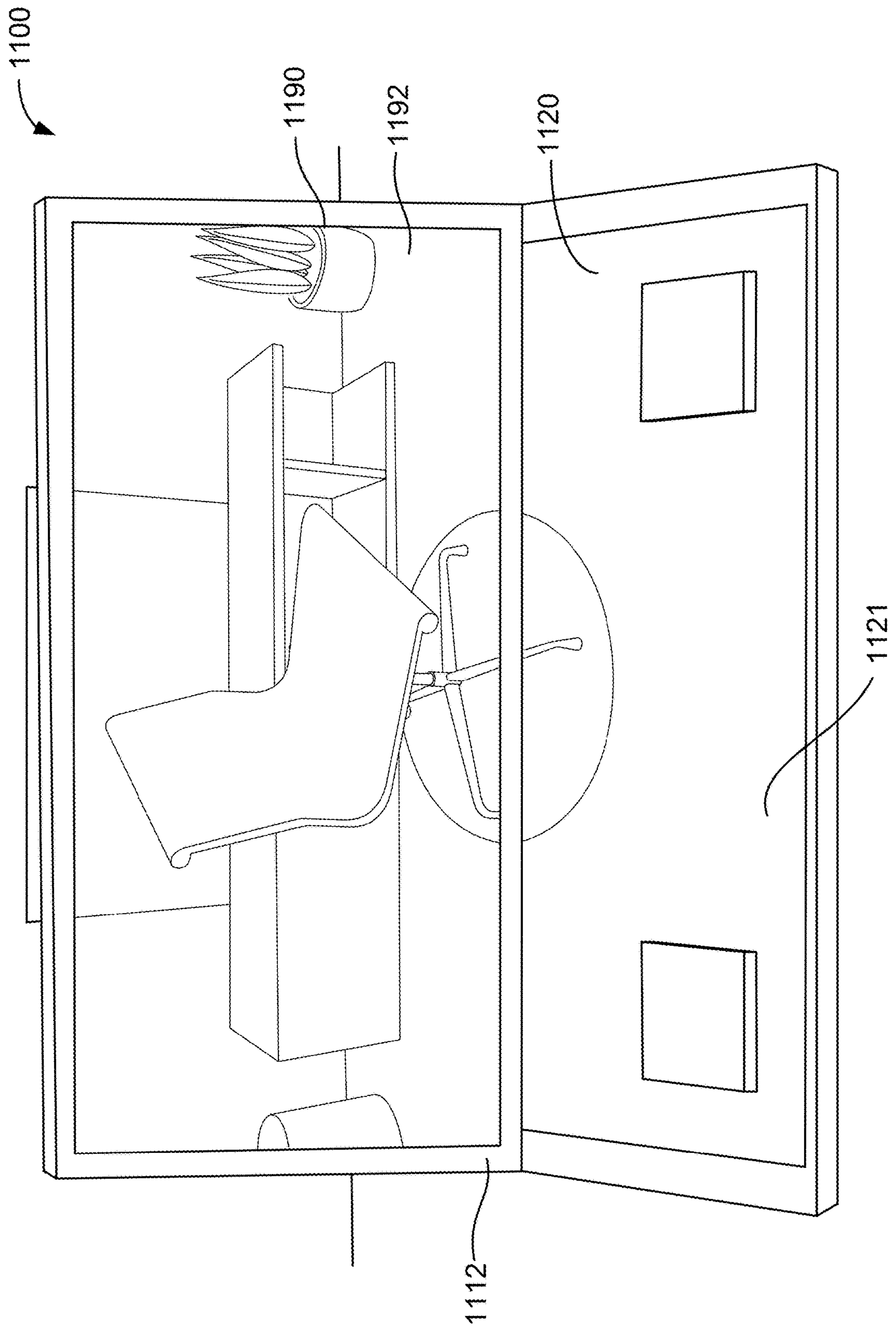
FIG. 14 illustrates the gaming accessory of FIG. 11.

FIG. 14 illustrates the gaming accessory of FIG. 11. In this example, screen 1192 of electronic device 1190 and cover screen 1121 of game controller 1120 can be connected through hinge 1112 and can be used to show a single virtual reality or augmented reality image. A camera (not shown) of electronic device 1190 can be used in generating some or all of the image displayed on screen 1192 and cover screen 1121. A camera (not shown) on a bottom or side surface of game controller 1120 can be used along with the camera of electronic device 1190 in forming the image on either or both screen 1192 and cover screen 1121.

Gaming accessory 1100 can readily attach to electronic device 1190. For example, tray 1110 can fit around electronic device 1190. Alternatively, tray 1110 can magnetically attach to electronic device 1190. This can be particularly true when tray 1110 has a cover or back panel configuration. Tray 1110 can include a magnet that can be attracted to a corresponding magnet in electronic device 1190. Tray 1110 can also or instead include a number of magnets that can be attracted to a corresponding number of magnets an electronic device 1190. Tray 1110 can also or instead include a magnet array that can be attracted to a corresponding magnet array in electronic device 1190. For example, tray 1110 can include a magnet array such as primary magnetic alignment component 1716 (shown in FIG. 17) while electronic device 1190 can include a magnet array such as secondary magnetic alignment component 1718 (shown in FIG. 17) or any of the other alignment components shown herein. Alternatively, tray 1110 can include a pass-through magnet array. The use of a pass-through magnet array can allow electronic device 1190 or gaming accessory 1100 to be charged while gaming accessory 1100 is attached to electronic device 1190. For example, tray 1110 can include an auxiliary magnet array such as auxiliary alignment component 3770 (shown in FIG. 37A.) These magnets in the magnet array in tray 1110 can be fixed in position or they can move to increase a magnetic attraction to electronic device 1190. For example, they can move closer to a top surface of tray 1110 and nearer electronic device 1190 when tray 1110 is or is about to be attached to electronic device 1190. Examples of moving magnet arrays are shown below in FIG. 38 through FIG. 55 below. Gaming accessory 1100 can further include an additional alignment feature, where the alignment feature can align gaming accessory 1100 in a particular orientation relative to electronic device 1190. The alignment feature can include magnets in the magnet array. The alignment feature can also or instead be additional magnets that are separate and spaced apart from the magnet array. For example, gaming accessory 1100 can include secondary rotational alignment component 2724 (shown in FIG. 27) or other alignment component such as those shown in FIGS. 28-32, while electronic device 1190 can include primary rotational alignment component 2722 (shown in FIG. 27) or other alignment component such as those shown in FIGS. 28-32.

Further circuits and components can be included to improve the usefulness of gaming accessory 1100. For example, tray 1110 can include near field communications circuitry. Near field communications circuitry in electronic device 1190 can detect the presence of the near field communications circuitry in tray 1110. From this, electronic device 1190 can determine that it is attached to tray 1110 and can enter a gaming mode of operation.

These near-field communication circuits can also provide data from gaming accessory 1100 to electronic device 1190, and from electronic device 1190 to gaming accessory 1100. Current can be provided to a near-field communication coil in electronic device 1190. This current can generate a magnetic field. A tag coupled to a near-field communication coil in gaming accessory 1100 can provide a time-varying impedance to the magnet field in order to transmit data. The variation in the magnetic field can be detected by the near-field communication circuitry in the electronic device 1190. From this, the data transmitted by gaming accessory 1100 can be read by electronic device 1190. Data can similarly be transmitted from electronic device 1190 to gaming accessory 1100 Gaming accessory 1100 can include a near-field communication coil such as NFC coil 4664 (shown in FIG. 46.)

Data can also or instead be transferred from gaming accessory 1100 to electronic device 1190 using charging circuitry. For example, control circuitry in gaming accessory 1100 can generate currents in a coil of gaming accessory 1100. These currents can generate a time-varying magnetic field that can be modulated. The modulation can be in amplitude, phase, frequency, or other parameter. The modulated time-varying magnetic field can induce currents in a corresponding coil in electronic device 1190. Control circuitry in electronic device 1190 can receive the induced currents and recover data transmitted by gaming accessory 1100. Gaming accessory 1100 can include a charging coil such as wireless transmitter coil 4612 (shown in FIG. 46) and control circuitry such as control circuitry 4614 (shown in FIG. 46) that can be used in transmitting data. Data can similarly be transferred from electronic device 1190 to gaming accessory 1100.

Data can also or instead be transferred from gaming accessory 1100 to electronic device 1190 using Bluetooth or other wireless protocol. Data can similarly be transferred from electronic device 1190 to gaming accessory 1100.

Various types of data can be transferred between gaming accessory 1100 and electronic device 1190. For example, button press information, pressure information, directional information, and other types of information can be sent from game controller 1120 of gaming accessory 1100 to electronic device 1190. Battery charge status and other status information can also be sent from gaming accessory 1100 to electronic device 1190. Electronic device 1190 can provide information to gaming accessory 1100 for the illumination of light-emitting diodes on gaming accessory 1100, as well as other types of information.

In these and other embodiments of the present invention, power can be provided to gaming accessory 1100 in various ways. For example, gaming accessory 1100 can receive wired power. Gaming accessory 1100 can also or instead receive wireless power. Gaming accessory 1100 can receive wired power through a connector receptacle in game controller 1120 or tray 1110 that can accept a corresponding connector insert attached to a first end of a cable. A second end of the cable can be attached to a power source, such as a host device, charging or other power source. Gaming accessory 1100 can receive wireless power from the electronic device 1190 or other wireless charger. For example, gaming accessory 1100 can include a charging coil such as wireless transmitter coil 4612 (shown in FIG. 46) and control circuitry such as control circuitry 4614 (shown in FIG. 46) that allow gaming accessory 1100 to be inductively charged by either electronic device 1190, a wireless charger, or other charging device. Power can be stored in one or more batteries that can be housed in one or more of tray 1110 and game controller 1120.

In these and other embodiments of the present invention, it can be desirable for a first gaming accessory used by a first game player to synchronize data with a second gaming accessory used by a second game player. An example is shown in the following figure.

Figure 15:
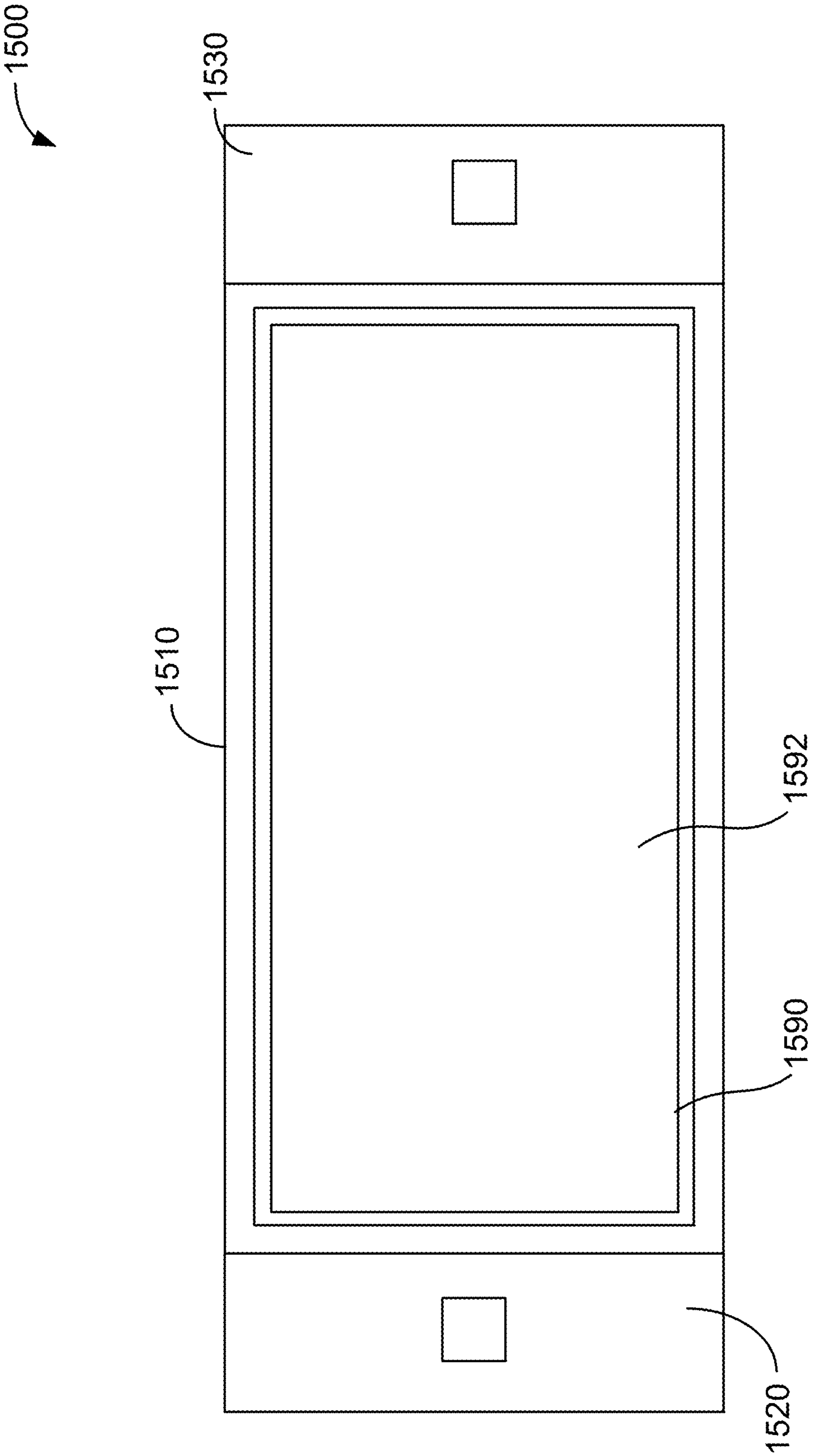
FIG. 15 illustrates another gaming accessory according to an embodiment of the present invention.

FIG. 15 illustrates another gaming accessory according to an embodiment of the present invention. Gaming accessory 1500 can include a back panel or tray 1510, first game controller 1520, and second game controller 1530. Tray 1510 can support electronic device 1590, while first game controller 1520 and second game controller 1530 can attached to or slide over ends of electronic device 1590, thereby leaving screen 1592 at least largely unobstructed.

Either or both first game controller 1520 and second game controller 1530 can be removed or otherwise detached from tray 1510. This operation can be performed by the first game player and second game player. The first game player the second game player can then swap one of their respective game controllers. By connecting the swapped game controller to the individual gaming accessories, data can be synchronized between the two gaming accessories. The first game player and second game player can then re-swap the game controllers for their original game controllers and can then commence with game playing.

For example, a first game player can connect a second game player's first game controller 1520 to their gaming accessory 1500, electronic device 1590, or both. The second game player can connect the first game player's first game controller 1520 to their gaming accessory 1500, electronic device 1590, or both. This can allow data from the first game player's gaming accessory 1500 to synchronize with the second game player's gaming accessory 1500, and from the second game player's gaming accessory 1500 to synchronize with the first game player's gaming accessory 1500. The first and second game players can re-swap their game controller and commence game play.

In these and other embodiments of the present invention, it can be desirable for a game player to share an image with a second game player or other individuals. Accordingly, embodiments of the present invention can provide a projector that can project an image on to a surface. An example is shown in the following figure.

Figure 16:
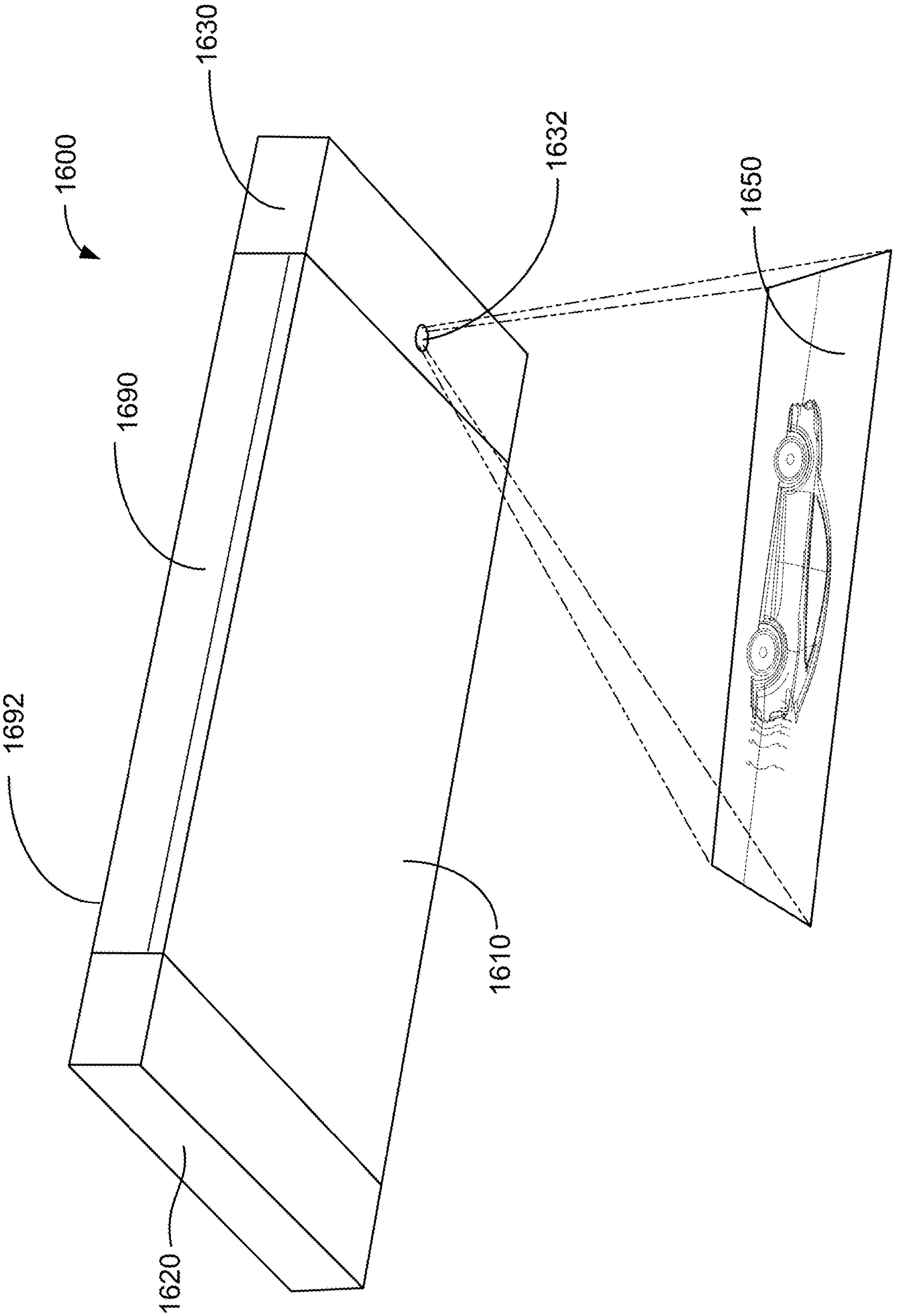
FIG. 16 illustrates another gaming accessory according to an embodiment of the present invention.

FIG. 16 illustrates another gaming accessory according to an embodiment of the present invention. Gaming accessory 1600 can be substantially the same or similar to gaming accessory 1500 shown in FIG. 15. Gaming accessory 1600 can include back panel or tray 1610, first game controller 1620, and second game controller 1630. Tray 1610 can support electronic device 1690, while first game controller 1620 and second game controller 1630 can attach to or slight over ends of electronic device 1690. Either or both first game controller 1620 or second game controller 1630 can include a projector having an opening 1632. In this example, second game controller 1630 can include opening 1632 for protecting image 1650 onto a surface. Image 1650 can then be observed by a second game player, or other third parties. Image 1650 can be the same or different as what is displayed on screen 1692 of electronic device 1690.

Gaming accessory 1600 can readily attach to electronic device 1690. For example, tray 1610 can fit around electronic device 1690. Alternatively, tray 1610 can magnetically attach to electronic device 1690. This can be particularly true when tray 1610 has a cover or back panel configuration. Tray 1610 can include a magnet that can be attracted to a corresponding magnet in electronic device 1690. Tray 1610 can also or instead include a number of magnets that can be attracted to a corresponding number of magnets an electronic device 1690. Tray 1610 can also or instead include a magnet array that can be attracted to a corresponding magnet array in electronic device 1690. For example, tray 1610 can include a magnet array such as primary magnetic alignment component 1716 (shown in FIG. 17) while electronic device 1690 can include a magnet array such as secondary magnetic alignment component 1718 (shown in FIG. 17) or any of the other alignment components shown herein. Alternatively, tray 1610 can include a pass-through magnet array. The use of a pass-through magnet array can allow electronic device 1690 or gaming accessory 1600 to be charged while gaming accessory 1600 is attached to electronic device 1690. For example, tray 1610 can include an auxiliary magnet array such as auxiliary alignment component 3770 (shown in FIG. 37A.) These magnets in the magnet array in tray 1610 can be fixed in position or they can move to increase a magnetic attraction to electronic device 1690. For example, they can move closer to a top surface of tray 1610 and nearer electronic device 1690 when tray 1610 is or is about to be attached to electronic device 1690. Examples of moving magnet arrays are shown below in FIG. 38 through FIG. 45 below. Gaming accessory 1600 can further include an additional alignment feature, where the alignment feature can align gaming accessory 1600 in a particular orientation relative to electronic device 1690. The alignment feature can include magnets in the magnet array. The alignment feature can also or instead be additional magnets that are separate and spaced apart from the magnet array. For example, gaming accessory 1600 can include secondary rotational alignment component 2724 (shown in FIG. 27) or other alignment component such as those shown in FIGS. 28-32, while electronic device 1690 can include primary rotational alignment component 2722 (shown in FIG. 27) or other alignment component such as those shown in FIGS. 28-32.

Further circuits and components can be included to improve the usefulness of gaming accessory 1600. For example, tray 1610 can include near field communications circuitry. Near field communications circuitry in electronic device 1690 can detect the presence of the near field communications circuitry in tray 1610. From this, electronic device 1690 can determine that it is attached to tray 1610 and can enter a gaming mode of operation.

These near-field communication circuits can also provide data from gaming accessory 1600 to electronic device 1690, and from electronic device 1690 to gaming accessory 1600. Current can be provided to a near-field communication coil in electronic device 1690. This current can generate a magnetic field. A tag coupled to a near-field communication coil in gaming accessory 1600 can provide a time-varying impedance to the magnet field in order to transmit data. The variation in the magnetic field can be detected by the near-field communication circuitry in the electronic device 1690. From this, the data transmitted by gaming accessory 1600 can be read by electronic device 1690. Data can similarly be transmitted from electronic device 1690 to gaming accessory 1600 Gaming accessory 1600 can include a near-field communication coil such as NFC coil 4664 (shown in FIG. 46.)

Data can also or instead be transferred from gaming accessory 1600 to electronic device 1690 using charging circuitry. For example, control circuitry in gaming accessory 1600 can generate currents in a coil of gaming accessory 1600. These currents can generate a time-varying magnetic field that can be modulated. The modulation can be in amplitude, phase, frequency, or other parameter. The modulated time-varying magnetic field can induce currents in a corresponding coil in electronic device 1690. Control circuitry in electronic device 1690 can receive the induced currents and recover data transmitted by gaming accessory 1600. Gaming accessory 1600 can include a charging coil such as wireless transmitter coil 4612 (shown in FIG. 46) and control circuitry such as control circuitry 4614 (shown in FIG. 46) that can be used in transmitting data. Data can similarly be transferred from electronic device 1690 to gaming accessory 1600.

Data can also or instead be transferred from gaming accessory 1600 to electronic device 1690 using Bluetooth or other wireless protocol. Data can similarly be transferred from electronic device 1690 to gaming accessory 1600.

Various types of data can be transferred between gaming accessory 1600 and electronic device 1690. For example, button press information, pressure information, directional information, and other types of information can be sent from first game controller 1620 and second game controller 1630 of gaming accessory 1600 to electronic device 1690. Battery charge status and other status information can also be sent from gaming accessory 1600 to electronic device 1690. Electronic device 1690 can provide information to gaming accessory 1600 for the illumination of light-emitting diodes on gaming accessory 1600, as well as other types of information.

In these and other embodiments of the present invention, power can be provided to gaming accessory 1600 in various ways. For example, gaming accessory 1600 can receive wired power. Gaming accessory 1600 can also or instead receive wireless power. Gaming accessory 1600 can receive wired power through a connector receptacle in first game controller 1620, second game controller 1630, or tray 1610 that can accept a corresponding connector insert attached to a first end of a cable. A second end of the cable can be attached to a power source, such as a host device, electronic device 1690, or other charging or other power source. Gaming accessory 1600 can receive wireless power from the electronic device 1690 or other wireless charger. For example, gaming accessory 1600 can include a charging coil such as wireless transmitter coil 4612 (shown in FIG. 46) and control circuitry such as control circuitry 4614 (shown in FIG. 46) that allow gaming accessory 1600 to be inductively charged by either electronic device 1690, a wireless charger, or other charging device. Power can be stored in one or more batteries that can be housed in one or more of the tray 1610, first game controller 1620, and second game controller 1630.

In these examples, electronic device 190, 390, 490, 590, 690, 890, 1190, 1590, and 1690 and the other electronic devices can be the same or similar electronic device, such as a phone, tablet, wearable computing device, or other electronic device.

Described herein are various embodiments of magnetic alignment systems and components thereof. A magnetic alignment system can include annular alignment components, where each annular alignment component can comprise a ring of magnets (or a single annular magnet) having a particular magnetic orientation or pattern of magnetic orientations such that a "primary" annular alignment component can attract and hold a complementary "secondary" annular alignment component. Magnetic alignment components can be incorporated into a variety of devices, and a magnetic alignment component in one device can attract another device having a complementary magnetic alignment component into a desired alignment and/or hold the other device in a desired alignment. (Devices aligned by a magnetic alignment system may be said to be "attached" to each other.)

For purposes of the present description, a number of different categories of devices can be distinguished. As used herein, a "portable electronic device" refers generally to any electronic device that is portable and that consumes power and provides at least some interaction with the user. Examples of portable electronic devices include: smart phones and other mobile phones; tablet computers; laptop computers; wearable devices (e.g., smart watches, headphones, earbuds); and any other electronic device that a user may carry or wear. Other portable electronic devices can include robotic devices, remote-controlled devices, personal-care appliances, and so on.

An "accessory device" (or "accessory") refers generally to a device that is useful in connection with a portable electronic device to enhance the functionality and/or esthetics of the portable electronic device. Many categories of accessories may incorporate magnetic alignment. For example, one category of accessories includes wireless charger accessories. As used herein, a "wireless charger accessory" (or "wireless charger device" or just "wireless charger") is an accessory that can provide power to a portable electronic device using wireless power transfer techniques. A "battery pack" (or "external battery") is a type of wireless charger accessory that incorporates a battery to store charge that can be transferred to the portable electronic device. In some embodiments, a battery pack may also receive power wirelessly from another wireless charger accessory. Wireless charger accessories may also be referred to as "active" accessories, in reference to their ability to provide and/or receive power. Other accessories are "passive accessories" that do not provide or receive power. For example, some passive accessories are "cases" that can cover one or more surfaces of the portable electronic device to provide protection (e.g., against damage caused by impact of the portable electronic device with other objects), esthetic enhancements (e.g., decorative colors or the like), and/or functional enhancements (e.g., cases that incorporate storage pockets, batteries, card readers, or sensors of various types). Cases can have a variety of form factors. For example, a "tray" can refer to a case that has a rear panel covering the back surface of the portable electronic device and side surfaces to secure the portable electronic device in the tray while leaving the front surface (which may include a display) exposed. A "sleeve" can refer to a case that has front and back panels with an open end (or "throat") into which a portable electronic device can be inserted so that the front and back surfaces of the device are covered; in some instances, the front panel of a sleeve can include a window through which a portion (or all) of a display of the portable electronic device is visible. A "folio" can refer to a case that has a retention portion that covers at least the back surface (and sometimes also one or more side surfaces) of the portable electronic device and a cover that can be closed to cover the display or opened to expose the display. It should be understood that not all cases are passive accessories. For example, a "battery case" can incorporate a battery pack in addition to protective and/or esthetic features; a battery case can be shaped generally as a tray, sleeve, or folio. Other examples of active cases can include cases that incorporate card readers, sensors, batteries, or other electronic components that enhance functionality of a portable electronic device.

In the present description, a distinction is sometimes made between a "charge-through accessory," which is an accessory that can be positioned between a portable electronic device and a wireless charger device without interfering with wireless power transfer between the wireless charger device and the portable electronic device, and a "terminal accessory," which is an accessory that is not a charge-through accessory. A wireless charging accessory is typically a terminal accessory, but not all terminal accessories provide wireless charging of a portable electronic device. For example some terminal accessories can be "mounting" accessories that are designed to hold the portable electronic device in a particular position. Examples of mounting include tripods, docking stations, other stands, or mounts that can hold a portable electronic device in a desired position and/or orientation (which might or might not be adjustable). Such accessories might or might not incorporate wireless charging capability.

According to embodiments described herein, a portable electronic device and an accessory device can include complementary magnetic alignment components that facilitate alignment of the accessory device with the portable electronic device and/or attachment of the accessory device to the portable electronic device. The magnetic alignment components can include annular magnetic alignment components that, in some embodiments, can surround inductive charging transmitter and receiver coils. In the nomenclature used herein, a "primary" annular magnetic alignment component refers to an annular magnetic alignment component used in a wireless charger device or other terminal accessory. A "secondary" annular magnetic alignment component refers to an annular magnetic alignment component used in a portable electronic device. An "auxiliary" annular magnetic alignment component refers to an annular magnetic alignment component used in a charge-through accessory. (In this disclosure, adjectives such as "annular," "magnetic," "primary," "secondary" and "auxiliary" may be omitted when the context is clear.)

In some embodiments, a magnetic alignment system can also include a rotational magnetic alignment component that facilitates aligning two devices in a preferred rotational orientation. A rotational magnetic alignment component can include, for example, one or more magnets disposed outboard of an annular alignment component. It should be understood that any device that has an annular alignment component might or might not also have a rotational alignment component, and rotational alignment components may be categorized as primary, secondary, or auxiliary depending on the type of device.

In some embodiments, a magnetic alignment system can also include a near-field communication (NFC) coil and supporting circuitry to allow devices to identify themselves to each other using an NFC protocol. An NFC coil in a particular device can be an annular coil that is disposed inboard of the annular alignment component or outboard of the annular alignment component. For example, in a device that has an annular alignment component surrounding an inductive charging coil, the NFC coil can be disposed in an annular gap between the inductive charging coil and the annular alignment component. It should be understood that an NFC component is optional in the context of providing magnetic alignment.

Figure 17:
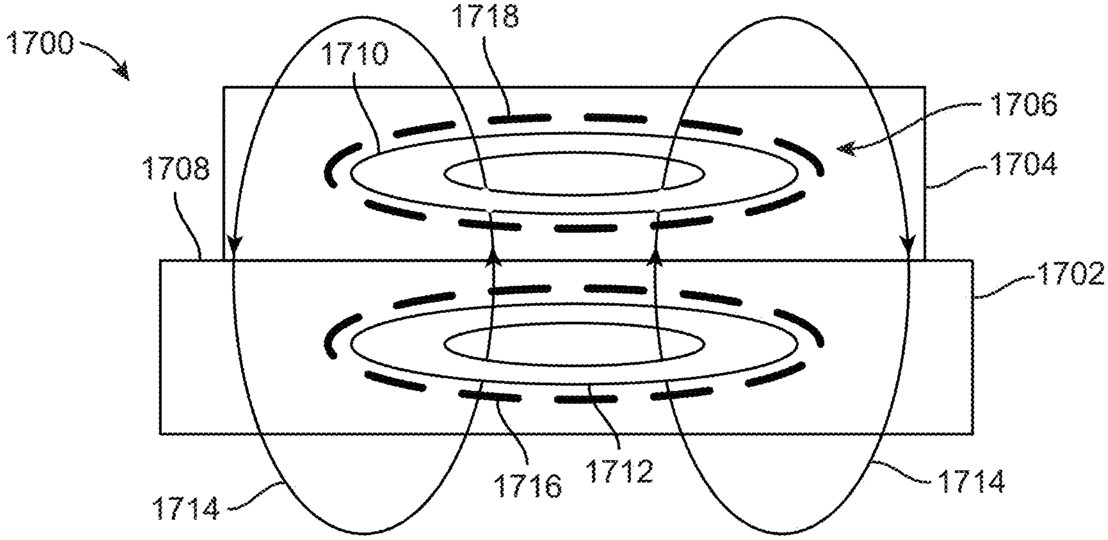
FIG. 17 shows a simplified representation of a wireless charging system incorporating a magnetic alignment system according to some embodiments.

FIG. 17 shows a simplified representation of a wireless charging system 1700 incorporating a magnetic alignment system 1706 according to some embodiments. A portable electronic device 1704 is positioned on a charging surface 1708 of a wireless charger device 1702. Portable electronic device 1704 can be a consumer electronic device, such as gaming accessory 100 or any of the other gaming accessories shown above or otherwise provided by an embodiment of the present invention, a smart phone, tablet, wearable device, or the like, or any other electronic device for which wireless charging is desired. Wireless charger device 1702 can be any device that is configured to generate time-varying magnetic flux to induce a current in a suitably configured receiving device. For instance, wireless charger device 1702 can be a wireless charging mat, puck, docking station, or the like. Wireless charger device 1702 can include or have access to a power source such as battery power or standard AC power.

To enable wireless power transfer, portable electronic device 1704 and wireless charger device 1702 can include inductive coils 1710 and 1712, respectively, which can operate to transfer power between them. For example, inductive coil 1712 can be a transmitter coil that generates a time-varying magnetic flux 1714, and inductive coil 1710 can be a receiver coil in which an electric current is induced in response to time-varying magnetic flux 1714. The received electric current can be used to charge a battery of portable electronic device 1704, to provide operating power to a component of portable electronic device 1704, and/or for other purposes as desired. ("Wireless power transfer" and "inductive power transfer," as used herein, refer generally to the process of generating a time-varying magnetic field in a conductive coil of a first device that induces an electric current in a conductive coil of a second device.)

To enable efficient wireless power transfer, it is desirable to align inductive coils 1712 and 1710. According to some embodiments, magnetic alignment system 1706 can provide such alignment. In the example shown in FIG. 17, magnetic alignment system 1706 includes a primary magnetic alignment component 1716 disposed within or on a surface of wireless charger device 1702 and a secondary magnetic alignment component 1718 disposed within or on a surface of portable electronic device 1704. Primary and secondary alignment components 1716 and 1718 are configured to magnetically attract one another into an aligned position in which inductive coils 1710 and 1712 are aligned with one another to provide efficient wireless power transfer.

According to embodiments described herein, a magnetic alignment component (including a primary or secondary alignment component) of a magnetic alignment system can be formed of arcuate magnets arranged in an annular configuration. In some embodiments, each magnet can have its magnetic polarity oriented in a desired direction so that magnetic attraction between the primary and secondary magnetic alignment components provides a desired alignment. In some embodiments, an arcuate magnet can include a first magnetic region with magnetic polarity oriented in a first direction and a second magnetic region with magnetic polarity oriented in a second direction different from (e.g., opposite to) the first direction. As will be described, different configurations can provide different degrees of magnetic field leakage.

Figure 18A:
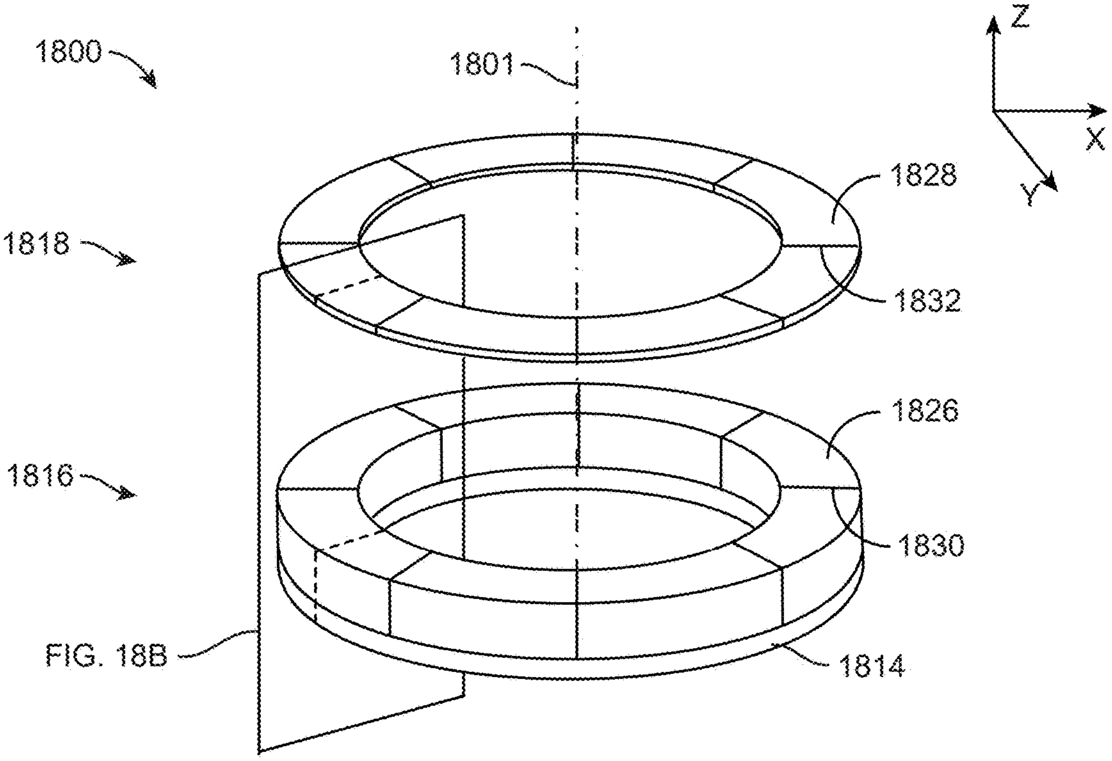
FIG. 18A shows a perspective view of a magnetic alignment system according to some embodiments.
Figure 18B:
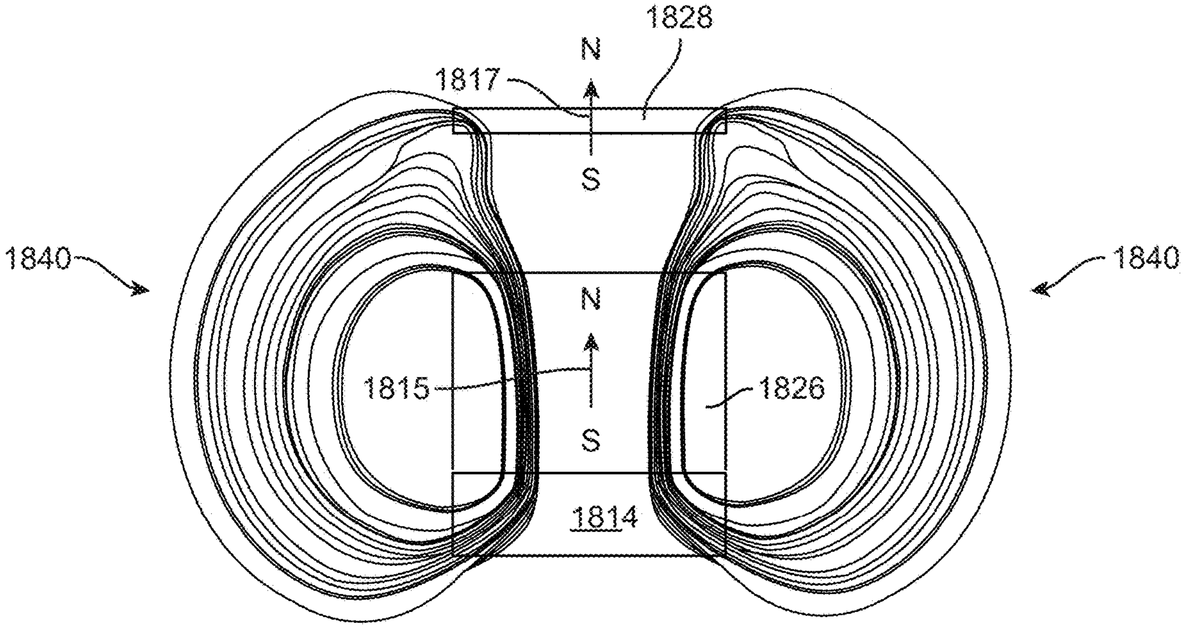
FIG. 18B shows a cross-section through the magnetic alignment system of FIG. 18A.

FIG. 18A shows a perspective view of a magnetic alignment system 1800 according to some embodiments, and FIG. 18B shows a cross-section through magnetic alignment system 1800 across the cut plane indicated in FIG. 18A. Magnetic alignment system 1800 can be an implementation of magnetic alignment system 1706 of FIG. 17. In magnetic alignment system 1800, the alignment components all have magnetic polarity oriented in the same direction (along the axis of the annular configuration). For convenience of description, an "axial" direction (also referred to as a "longitudinal" or "z" direction) is defined to be parallel to an axis of rotational symmetry 1801 of magnetic alignment system 1800, and a transverse plane (also referred to as a "lateral" or "x" or "y" direction) is defined to be normal to axis 1801. The term "proximal side" or "proximal surface" is used herein to refer to a side or surface of one alignment component that is oriented toward the other alignment component when the magnetic alignment system is aligned, and the term "distal side" or "distal surface" is used to refer to a side or surface opposite the proximal side or surface. (The terms "top" and "bottom" may be used in reference to a particular view shown in a drawing but have no other significance.)

As shown in FIG. 18A, magnetic alignment system 1800 can include a primary alignment component 1816 (which can be an implementation of primary alignment component 1716 of FIG. 17) and a secondary alignment component 1818 (which can be an implementation of secondary alignment component 1718 of FIG. 17). Primary alignment component 1816 and secondary alignment component 1818 have annular shapes and may also be referred to as "annular" alignment components. The particular dimensions can be chosen as desired. In some embodiments, primary alignment component 1816 and secondary alignment component 1818 can each have an outer diameter of about 214 mm and a radial width of about 22 mm. The outer diameters and radial widths of primary alignment component 1816 and secondary alignment component 1818 need not be exactly equal. For instance, the radial width of secondary alignment component 1818 can be slightly less than the radial width of primary alignment component 1816 and/or the outer diameter of secondary alignment component 1818 can also be slightly less than the radial width of primary alignment component 1816 so that, when in alignment, the inner and outer sides of primary alignment component 1816 extend beyond the corresponding inner and outer sides of secondary alignment component 1818. Thicknesses (or axial dimensions) of primary alignment component 1816 and secondary alignment component 1818 can also be chosen as desired. In some embodiments, primary alignment component 1816 has a thickness of about 17.5 mm while secondary alignment component 1818 has a thickness of about 0.37 mm.

Primary alignment component 1816 can include a number of sectors, each of which can be formed of one or more primary arcuate magnets 1826, and secondary alignment component 1818 can include a number of sectors, each of which can be formed of one or more secondary arcuate magnets 1828. In the example shown, the number of primary magnets 1826 is equal to the number of secondary magnets 1828, and each sector includes exactly one magnet, but this is not required. Primary magnets 1826 and secondary magnets 1828 can have arcuate (or curved) shapes in the transverse plane such that when primary magnets 1826 (or secondary magnets 1828) are positioned adjacent to one another end-to-end, primary magnets 1826 (or secondary magnets 1828) form an annular structure as shown. In some embodiments, primary magnets 1826 can be in contact with each other at interfaces 1830, and secondary magnets 1828 can be in contact with each other at interfaces 1832. Alternatively, small gaps or spaces may separate adjacent primary magnets 1826 or secondary magnets 1828, providing a greater degree of tolerance during manufacturing.

In some embodiments, primary alignment component 1816 can also include an annular shield 1814 (also referred to as a DC magnetic shield or DC shield) disposed on a distal surface of primary magnets 1826. In some embodiments, shield 1814 can be formed as a single annular piece of material and adhered to primary magnets 1826 to secure primary magnets 1826 into position. Shield 1814 can be formed of a material that has high magnetic permeability, such as stainless steel, and can redirect magnetic fields to prevent them from propagating beyond the distal side of primary alignment component 1816, thereby protecting sensitive electronic components located beyond the distal side of primary alignment component 1816 from magnetic interference.

Primary magnets 1826 and secondary magnets 1828 (and all other magnets described herein) can be made of a magnetic material such as an NdFeB material, other rare earth magnetic materials, or other materials that can be magnetized to create a persistent magnetic field. In some embodiments, the magnets can be plated with a thin layer (e.g., 23-13 μm) of NiCuNi or similar materials. Each primary magnet 1826 and each secondary magnet 1828 can have a monolithic structure having a single magnetic region with a magnetic polarity aligned in the axial direction as shown by magnetic polarity indicators 1815, 1817 in FIG. 18B. For example, each primary magnet 1826 and each secondary magnet 1828 can be a bar magnet that has been ground and shaped into an arcuate structure having an axial magnetic orientation. (As will be apparent, the term "magnetic orientation" refers to the direction of orientation of the magnetic polarity of a magnet or magnetized region.) In the example shown, primary magnet 1826 has its north pole oriented toward the proximal surface and south pole oriented toward the distal surface while secondary magnet 1828 has its south pole oriented toward the proximal surface and north pole oriented toward the distal surface. In other embodiments, the magnetic orientations can be reversed such that primary magnet 1826 has its south pole oriented toward the proximal surface and north pole oriented toward the distal surface while secondary magnet 1828 has its north pole oriented toward the proximal surface and south pole oriented toward the distal surface.

As shown in FIG. 18B, the axial magnetic orientation of primary magnet 1826 and secondary magnet 1828 can generate magnetic fields 1840 that exert an attractive force between primary magnet 1826 and secondary magnet 1828, thereby facilitating alignment between respective electronic devices in which primary alignment component 1816 and secondary alignment component 1818 are disposed (e.g., as shown in FIG. 17). While shield 1814 can redirect some of magnetic fields 1840 away from regions below primary magnet 1826, magnetic fields 1840 may still propagate to regions laterally adjacent to primary magnet 1826 and secondary magnet 1828. In some embodiments, the lateral propagation of magnetic fields 1840 may result in magnetic field leakage to other magnetically sensitive components. For instance, if an inductive coil having a ferromagnetic shield is placed in the interior (or inboard) region of annular primary alignment component 1816 (or secondary alignment component 1818), leakage of magnetic fields 1840 may saturate the ferrimagnetic shield, which can degrade wireless charging performance.

It will be appreciated that magnetic alignment system 1800 is illustrative and that variations and modifications are possible. For instance, while primary alignment component 1816 and secondary alignment component 1818 are each shown as being constructed of eight arcuate magnets, other embodiments may use a different number of magnets, such as sixteen magnets, thirty-six magnets, or any other number of magnets, and the number of primary magnets need not be equal to the number of secondary magnets. In other embodiments, primary alignment component 1816 and/or secondary alignment component 1818 can each be formed of a single, monolithic annular magnet; however, segmenting magnetic alignment components 1816 and 1818 into arcuate magnets may improve manufacturing because (for some types of magnetic material) smaller arcuate segments may be less brittle than a single, monolithic annular magnet and less prone to yield loss due to physical stresses imposed on the magnetic material during manufacturing.

As noted above with reference to FIG. 18B, a magnetic alignment system with a single axial magnetic orientation may allow lateral leakage of magnetic fields, which may adversely affect performance of other components of an electronic device. Accordingly, some embodiments provide magnetic alignment systems with a "closed-loop" configuration that reduces magnetic field leakage. Examples will now be described.

Figure 19A:
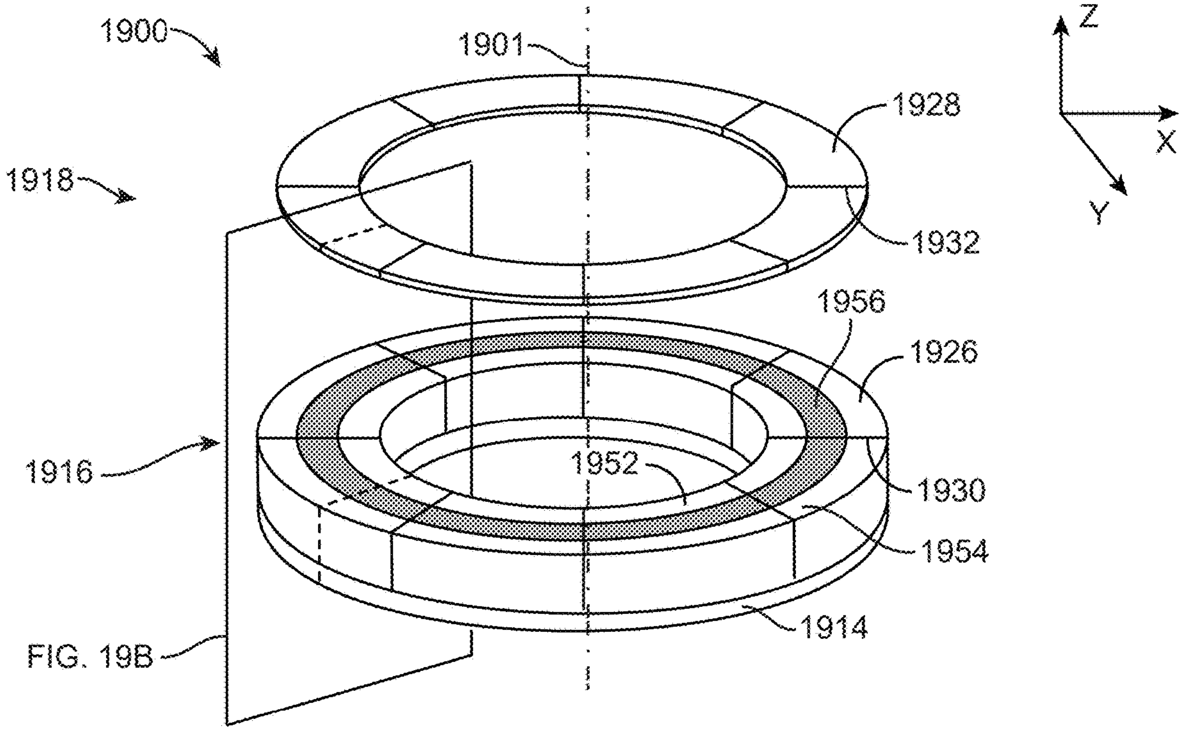
FIG. 19A shows a perspective view of a magnetic alignment system according to some embodiments.
Figure 19B:
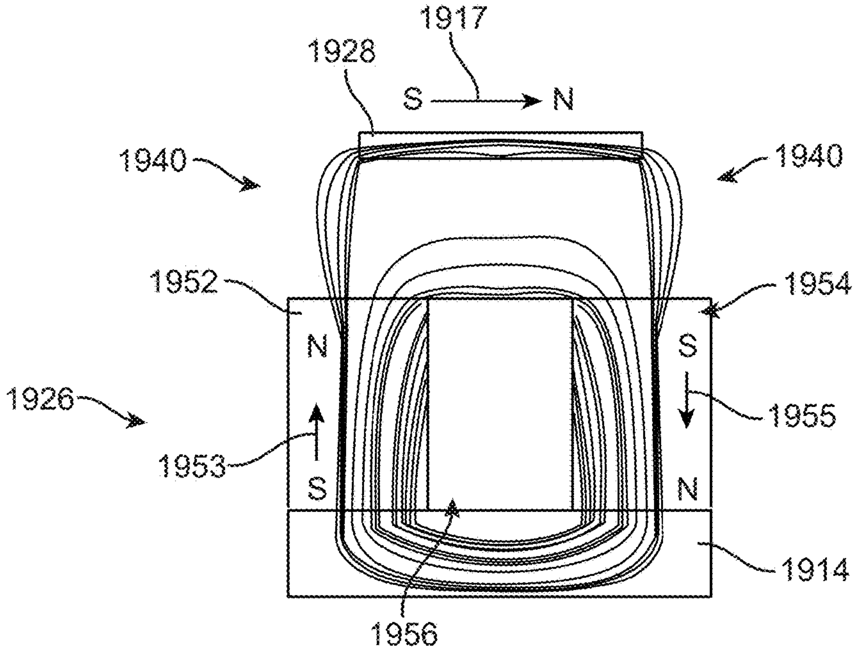
FIG. 19B shows a cross-section through the magnetic alignment system of FIG. 19A.

FIG. 19A shows a perspective view of a magnetic alignment system 1900 according to some embodiments, and FIG. 19B shows a cross-section through magnetic alignment system 1900 across the cut plane indicated in FIG. 19A. Magnetic alignment system 1900 can be an implementation of magnetic alignment system 1706 of FIG. 17. In magnetic alignment system 1900, the alignment components have magnetic components configured in a "closed loop" configuration as described below.

As shown in FIG. 19A, magnetic alignment system 1900 can include a primary alignment component 1916 (which can be an implementation of primary alignment component 1716 of FIG. 17) and a secondary alignment component 1918 (which can be an implementation of secondary alignment component 1718 of FIG. 17). Primary alignment component 1916 and secondary alignment component 1918 have annular shapes and may also be referred to as "annular" alignment components. The particular dimensions can be chosen as desired. In some embodiments, primary alignment component 1916 and secondary alignment component 1918 can each have an outer diameter of about 214 mm and a radial width of about 22 mm. The outer diameters and radial widths of primary alignment component 1916 and secondary alignment component 1918 need not be exactly equal. For instance, the radial width of secondary alignment component 1918 can be slightly less than the radial width of primary alignment component 1916 and/or the outer diameter of secondary alignment component 1918 can also be slightly less than the radial width of primary alignment component 1916 so that, when in alignment, the inner and outer sides of primary alignment component 1916 extend beyond the corresponding inner and outer sides of secondary alignment component 1918. Thicknesses (or axial dimensions) of primary alignment component 1916 and secondary alignment component 1918 can also be chosen as desired. In some embodiments, primary alignment component 1916 has a thickness of about 17.5 mm while secondary alignment component 1918 has a thickness of about 0.37 mm.

Primary alignment component 1916 can include a number of sectors, each of which can be formed of a number of primary magnets 1926, and secondary alignment component 1918 can include a number of sectors, each of which can be formed of a number of secondary magnets 1928. In the example shown, the number of primary magnets 1926 is equal to the number of secondary magnets 1928, and each sector includes exactly one magnet, but this is not required; for example, as described below a sector may include multiple magnets. Primary magnets 1926 and secondary magnets 1928 can have arcuate (or curved) shapes in the transverse plane such that when primary magnets 1926 (or secondary magnets 1928) are positioned adjacent to one another end-to-end, primary magnets 1926 (or secondary magnets 1928) form an annular structure as shown. In some embodiments, primary magnets 1926 can be in contact with each other at interfaces 1930, and secondary magnets 1928 can be in contact with each other at interfaces 1932. Alternatively, small gaps or spaces may separate adjacent primary magnets 1926 or secondary magnets 1928, providing a greater degree of tolerance during manufacturing.

In some embodiments, primary alignment component 1916 can also include an annular shield 1914 (also referred to as a DC magnetic shield or DC shield) disposed on a distal surface of primary magnets 1926. In some embodiments, shield 1914 can be formed as a single annular piece of material and adhered to primary magnets 1926 to secure primary magnets 1926 into position. Shield 1914 can be formed of a material that has high magnetic permeability, such as stainless steel, and can redirect magnetic fields to prevent them from propagating beyond the distal side of primary alignment component 1916, thereby protecting sensitive electronic components located beyond the distal side of primary alignment component 1916 from magnetic interference.

Primary magnets 1926 and secondary magnets 1928 can be made of a magnetic material such as an NdFeB material, other rare earth magnetic materials, or other materials that can be magnetized to create a persistent magnetic field. Each secondary magnet 1928 can have a single magnetic region with a magnetic polarity having a component in the radial direction in the transverse plane (as shown by magnetic polarity indicator 1917 in FIG. 19B). As described below, the magnetic orientation can be in a radial direction with respect to axis 1901 or another direction having a radial component in the transverse plane. Each primary magnet 1926 can include two magnetic regions having opposite magnetic orientations. For example, each primary magnet 1926 can include an inner arcuate magnetic region 1952 having a magnetic orientation in a first axial direction (as shown by polarity indicator 1953 in FIG. 19B), an outer arcuate magnetic region 1954 having a magnetic orientation in a second axial direction opposite the first direction (as shown by polarity indicator 1955 in FIG. 19B), and a central non-magnetized region 1956 that does not have a magnetic orientation. Central non-magnetized region 1956 can magnetically separate inner arcuate region 1952 from outer arcuate region 1954 by inhibiting magnetic fields from directly crossing through central region 1956. Magnets having regions of opposite magnetic orientation separated by a non-magnetized region are sometimes referred to herein as having a "quad-pole" configuration.

In some embodiments, each secondary magnet 1928 can be made of a magnetic material that has been ground and shaped into an arcuate structure, and a magnetic orientation having a radial component in the transverse plane can be created, e.g., using a magnetizer. Similarly, each primary magnet 1926 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 1926 can be a compound structure with two arcuate pieces of magnetic material providing inner arcuate magnetic region 1952 and outer arcuate magnetic region 1954; in such embodiments, central non-magnetized region 1956 can be can be formed of an arcuate piece of nonmagnetic (or demagnetized) material or formed as an air gap defined by sidewalls of inner arcuate magnetic region 1952 and outer arcuate magnetic region 1954. DC shield 1914 can be formed of a material that has high magnetic permeability, such as stainless steel or low carbon steel, and can be plated, e.g., with 21-10 μm of matte Ni. Alternatively, DC shield 1914 can be formed of a magnetic material having a radial magnetic orientation (in the opposite direction of secondary magnets 1928). In some embodiments, DC shield 1914 can be omitted entirely.

As shown in FIG. 19B, the magnetic polarity of secondary magnet 1928 (shown by indicator 1917) can be oriented such that when primary alignment component 1916 and secondary alignment component 1918 are aligned, the south pole of secondary magnet 1928 is oriented toward the north pole of inner arcuate magnetic region 1952 (shown by indicator 1953) while the north pole of secondary magnet 1928 is oriented toward the south pole of outer arcuate magnetic region 1954 (shown by indicator 1955). Accordingly, the respective magnetic orientations of inner arcuate magnetic region 1952, secondary magnet 1928 and outer arcuate magnetic region 1956 can generate magnetic fields 1940 that exert an attractive force between primary magnet 1926 and secondary magnet 1928, thereby facilitating alignment between respective electronic devices in which primary alignment component 1916 and secondary alignment component 1918 are disposed (e.g., as shown in FIG. 17). Shield 1914 can redirect some of magnetic fields 1940 away from regions below primary magnet 1926. Further, the "closed-loop" magnetic field 1940 formed around central non-magnetized region 1956 can have tight and compact field lines that do not stray outside of primary and secondary magnets 1926 and 1928 as far as magnetic field 1840 strays outside of primary and secondary magnets 1826 and 1828 in FIG. 18B. Thus, magnetically sensitive components can be placed relatively close to primary alignment component 1916 with reduced concern for stray magnetic fields. Accordingly, as compared to magnetic alignment system 1800, magnetic alignment system 1900 can help to reduce the overall size of a device in which primary alignment component 1916 is positioned and can also help reduce noise created by magnetic field 1940 in adjacent components or devices, such as an inductive receiver coil positioned inboard of secondary alignment component 1918.

While each primary magnet 1926 includes two regions of opposite magnetic orientation, it should be understood that the two regions can but need not provide equal magnetic field strength. For example, outer arcuate magnetized region 1954 can be more strongly polarized than inner arcuate magnetized region 1952. Depending on the particular implementation of primary magnets 1926, various techniques can be used to create asymmetric polarization strength. For example, inner arcuate region 1952 and outer arcuate region 1954 can have different radial widths; increasing radial width of a magnetic region increases the field strength of that region due to increased volume of magnetic material. Where inner arcuate region 1952 and outer arcuate region 1954 are discrete magnets, magnets having different magnetic strength can be used.

In some embodiments, having an asymmetric polarization where outer arcuate region 1954 is more strongly polarized than inner arcuate region 1952 can create a flux "sinking" effect toward the outer pole. This effect can be desirable in various situations. For example, when primary magnet 1926 is disposed within a wireless charger device and the wireless charger device is used to charge a "legacy" portable electronic device that has an inductive receiver coil but does not have a secondary (or any) annular magnetic alignment component, the (DC) magnetic flux from the primary annular alignment component may enter a ferrite shield around the inductive receiver coil. The DC magnetic flux can contribute to saturating the ferrite shield and reducing charging performance. Providing a primary annular alignment component with a stronger field at the outer arcuate region than the inner arcuate region can help to draw DC magnetic flux away from the ferrite shield, which can improve charging performance when a wireless charger device having an annular magnetic alignment component is used to charge a portable electronic device that lacks an annular magnetic alignment component.

It will be appreciated that magnetic alignment system 1900 is illustrative and that variations and modifications are possible. For instance, while primary alignment component 1916 and secondary alignment component 1918 are each shown as being constructed of eight arcuate magnets, other embodiments may use a different number of magnets, such as 176 magnets, 178 magnets, 192 magnets, 196 magnets, or any other number of magnets, and the number of primary magnets need not be equal to the number of secondary magnets. In other embodiments, secondary alignment component 1918 can be formed of a single, monolithic annular magnet. Similarly, primary alignment component 1916 can be formed of a single, monolithic annular piece of magnetic material with an appropriate magnetization pattern as described above, or primary alignment component 1916 can be formed of a monolithic inner annular magnet and a monolithic outer annular magnet, with an annular air gap or region of nonmagnetic material disposed between the inner annular magnet and outer annular magnet. In some embodiments, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various magnetic alignment components or individual magnets do not need to align exactly with the lateral and axial directions. The magnetic orientation can have any angle that provides a closed-loop path for a magnetic field through the primary and secondary alignment components.

Figure 20:
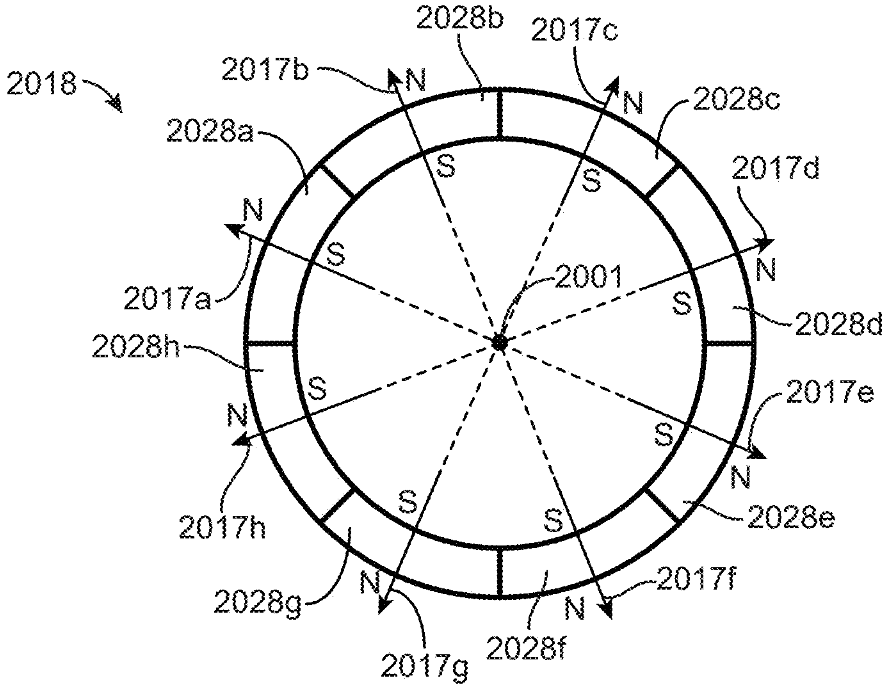
FIG. 20 shows a simplified top-down view of a secondary alignment component according to some embodiments.

As noted above, in embodiments of magnetic alignment systems having closed-loop magnetic orientations, such as magnetic alignment system 1900, secondary alignment component 1918 can have a magnetic orientation with a radial component. For example, in some embodiments, secondary alignment component 1918 can have a magnetic polarity in a radial orientation. FIG. 20 shows a simplified top-down view of a secondary alignment component 2018 according to some embodiments. Secondary alignment component 2018, like secondary alignment component 1918, can be formed of arcuate magnets 2028*a-h* having radial magnetic orientations as shown by magnetic polarity indicators 2017*a-h*. In this example, each arcuate magnet 2028*a-h* has a north magnetic pole oriented toward the radially outward side and a south magnetic pole toward the radially inward side; however, this orientation can be reversed, and the north magnetic pole of each arcuate magnet 2028*a-h* can be oriented toward the radially inward side while the south magnetic pole is oriented toward the radially outward side.

Figure 21A:
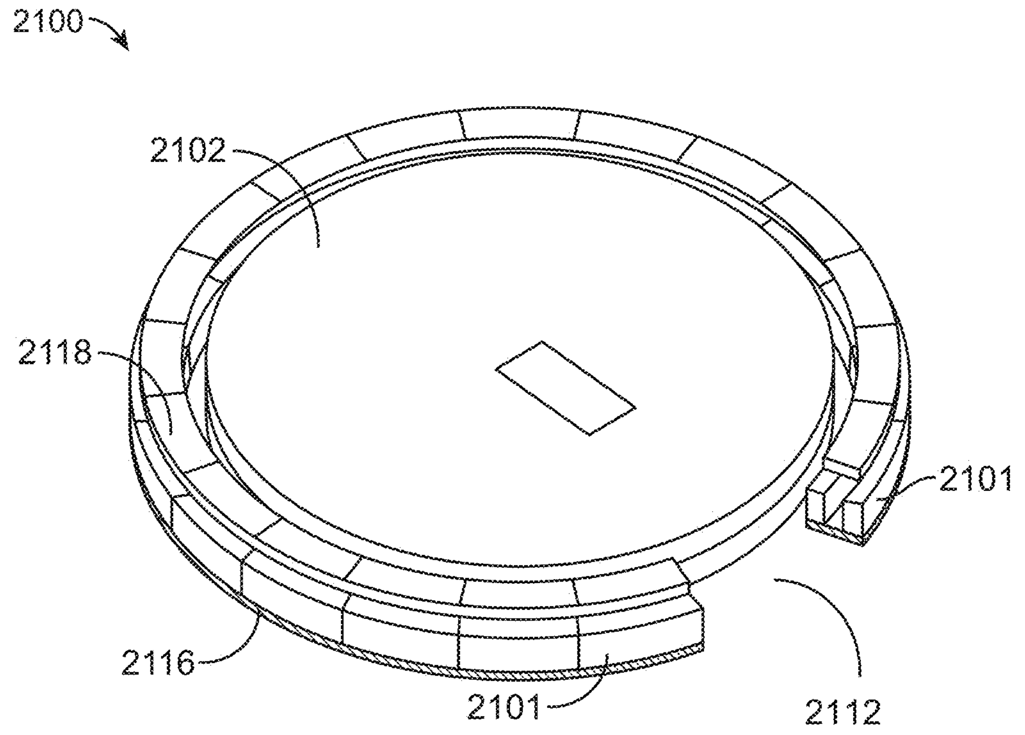
FIG. 21A shows a perspective view of a magnetic alignment system according to some embodiments.

FIG. 21A shows a perspective view of a magnetic alignment system 2100 according to some embodiments. Magnetic alignment system 2100, which can be an implementation of magnetic alignment system 1900, includes a secondary alignment component 2118 having a radially outward magnetic orientation (e.g., as shown in FIG. 20) and a complementary primary alignment component 2116. In this example, magnetic alignment system 2100 includes a gap 2112 between two of the sectors; however, gap 2112 is optional and magnetic alignment system 2100 can be a complete annular structure. Also shown are components 2102, which can include, for example an inductive coil assembly or other components located within the central region of primary magnetic alignment component 2116 or secondary magnetic alignment component 2118. Magnetic alignment system 2100 can have a closed-loop configuration similar to magnetic alignment system 1900 (as shown in FIG. 19B) and can include arcuate sectors 2101, each of which can be made of one or more arcuate magnets. In some embodiments, the closed-loop configuration of magnetic alignment system 2100 can reduce or prevent magnetic field leakage that may affect components 2102.

Figure 21B:
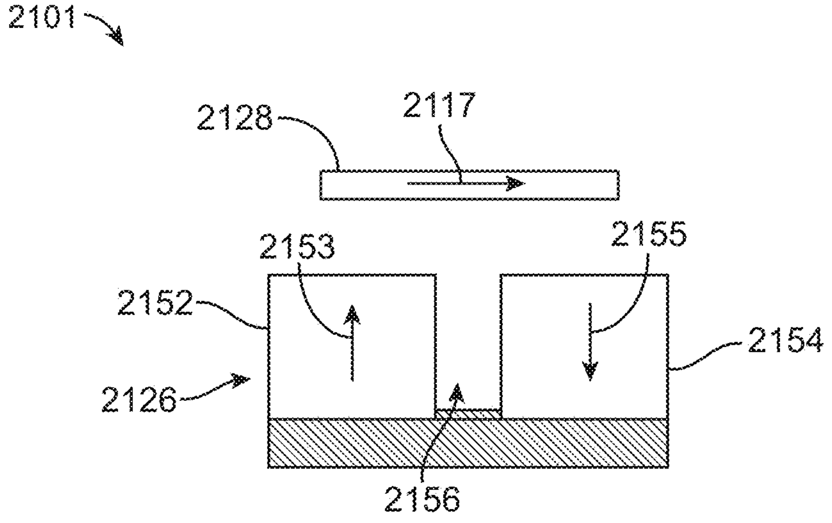

FIG. 21B shows an axial cross-section view through one of arcuate sectors 2101. Arcuate sector 2101 includes a primary magnet 2126 and a secondary magnet 2128. As shown by orientation indicator 2117, secondary magnet 2128 has a magnetic polarity oriented in a radially outward direction, i.e., the north magnetic pole is toward the radially outward side of magnetic alignment system 2100. Like primary magnets 1926 described above, primary magnet 2126 includes an inner arcuate magnetic region 2152, an outer arcuate magnetic region 2154, and a central non-magnetized region 2156 (which can include, e.g., an air gap or a region of nonmagnetic or non-magnetized material). Inner arcuate magnetic region 2152 has a magnetic polarity oriented axially such that the north magnetic pole is toward secondary magnet 2128, as shown by indicator 2153, while outer arcuate magnetic region 2154 has an opposite magnetic orientation, with the south magnetic pole oriented toward secondary magnet 2128, as shown by indicator 2155. As described above with reference to FIG. 19B, the arrangement of magnetic orientations shown in FIG. 21B results in magnetic attraction between primary magnet 2126 and secondary magnet 2128. In some embodiments, the magnetic polarities can be reversed such that the north magnetic pole of secondary magnet 2128 is oriented toward the radially inward side of magnetic alignment system 2100, the north magnetic pole of outer arcuate region 2154 of primary magnet 2126 is oriented toward secondary magnet 2128, and the north magnetic pole of inner arcuate region 2152 is oriented away from secondary magnet 2128.

When primary alignment component 2116 and secondary alignment component 2118 are aligned, the radially symmetrical arrangement and directional equivalence of magnetic polarities of primary alignment component 2116 and secondary alignment component 2118 allow secondary alignment component 2118 to rotate freely (relative to primary alignment component 2116) in the clockwise or counterclockwise direction in the lateral plane while maintaining alignment along the axis.

Figure 21C:
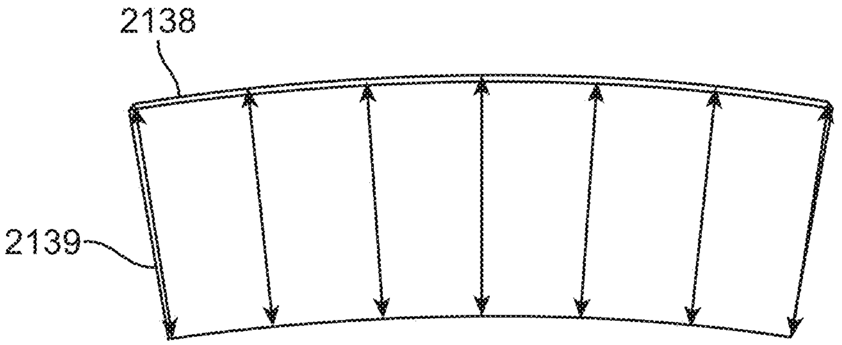
FIGS. 21C through 21E show examples of arcuate magnets with radial magnetic orientation according to some embodiments.
Figure 21D:
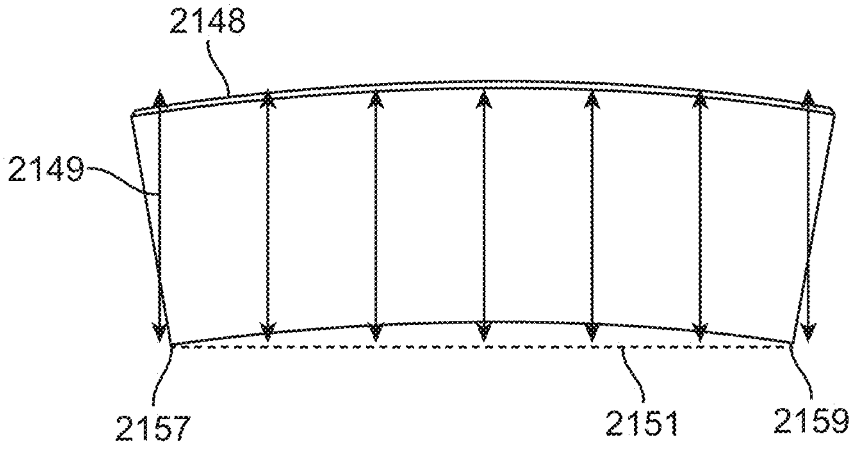
Figure 21E:
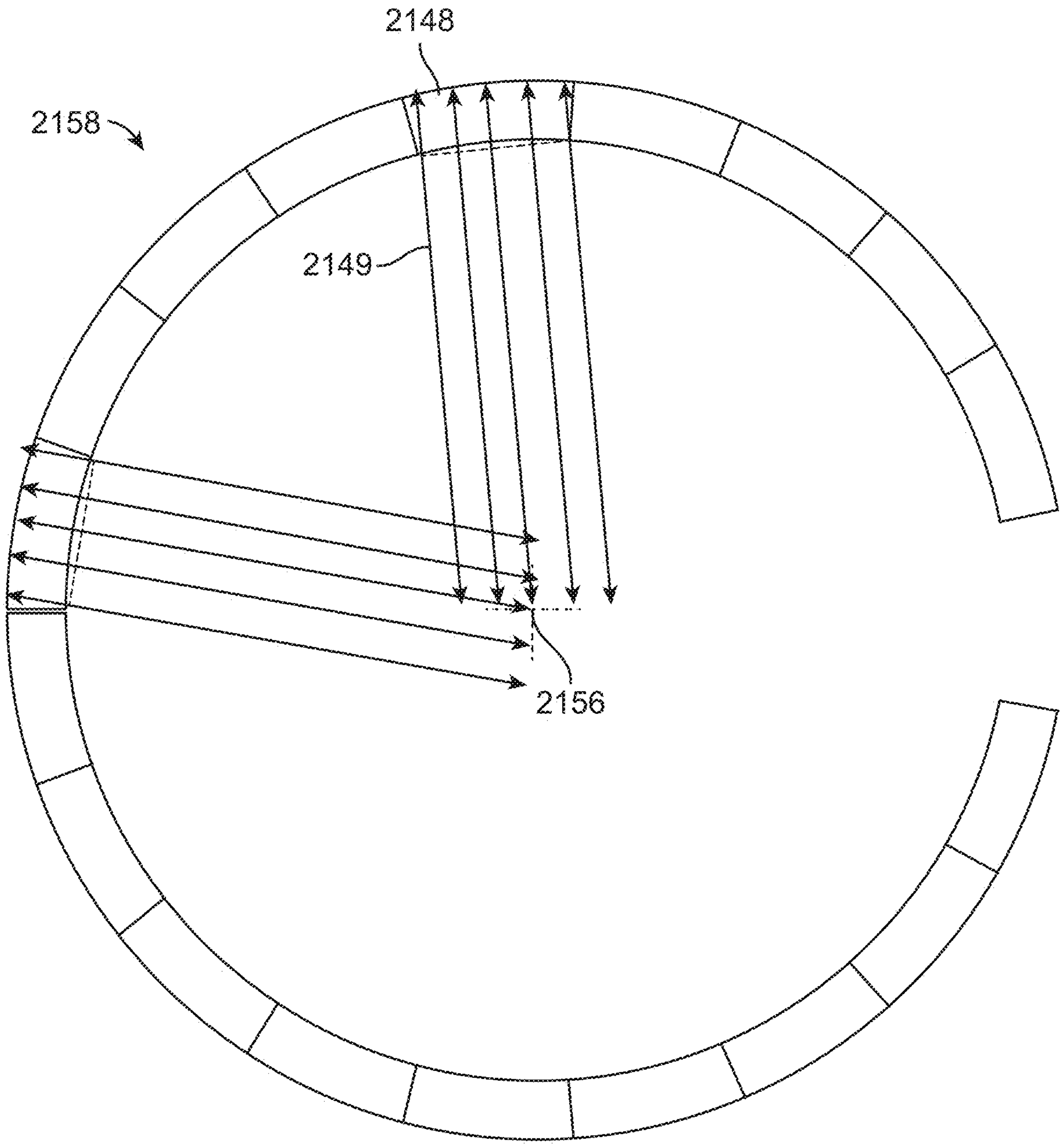

As used herein, a "radial" orientation need not be exactly or purely radial. For example, FIG. 21C shows a secondary arcuate magnet 2138 according to some embodiments. Secondary arcuate magnet 2138 has a purely radial magnetic orientation, as indicated by arrows 2139. Each arrow 2139 is directed at the center of curvature of magnet 2138; if extended inward, arrows 2139 would converge at the center of curvature. However, achieving this purely radial magnetization requires that magnetic domains within magnet 2138 be oriented obliquely to neighboring magnetic domains. For some types of magnetic materials, purely radial magnetic orientation may not be practical. Accordingly, some embodiments use a "pseudo-radial" magnetic orientation that approximates the purely radial orientation of FIG. 21C. FIG. 21D shows a secondary arcuate magnet 2148 with pseudo-radial magnetic orientation according to some embodiments. Magnet 2148 has a magnetic orientation, shown by arrows 2149, that is perpendicular to a baseline 2151 connecting the inner corners 2157, 2159 of arcuate magnet 2148. If extended inward, arrows 2149 would not converge. Thus, neighboring magnetic domains in magnet 2148 are parallel to each other, which is readily achievable in magnetic materials such as NdFeB. The overall effect in a magnetic alignment system, however, can be similar to the purely radial magnetic orientation shown FIG. 21C. FIG. 21E shows a secondary annular alignment component 2158 made up of magnets 2148 according to some embodiments. Magnetic orientation arrows 2149 have been extended to the center point 2161 of annular alignment component 2158. As shown the magnetic field direction can be approximately radial, with the closeness of the approximation depending on the number of magnets 2148 and the inner radius of annular alignment component 2158. In some embodiments, 178 magnets 2148 can provide a pseudo-radial orientation; in other embodiments, more or fewer magnets can be used. It should be understood that all references herein to magnets having a "radial" magnetic orientation include pseudo-radial magnetic orientations and other magnetic orientations that are approximately but not purely radial.

In some embodiments, a radial magnetic orientation in a secondary alignment component 2118 (e.g., as shown in FIG. 21B) provides a magnetic force profile between secondary alignment component 2118 and primary alignment component 2116 that is the same around the entire circumference of the magnetic alignment system. The radial magnetic orientation can also result in greater magnetic permeance, which allows secondary alignment component 2118 to resist demagnetization as well as enhancing the attractive force in the axial direction and improving shear force in the lateral directions when the two components are aligned.

Figure 22A:
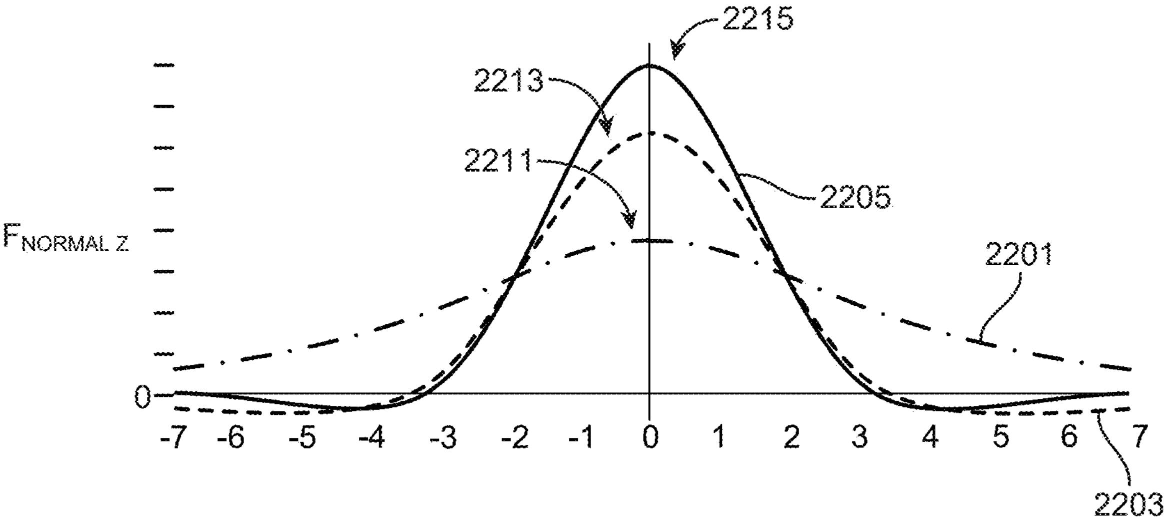
FIGS. 22A and 22B show graphs of force profiles for different magnetic alignment systems, according to some embodiments.
Figure 22B:
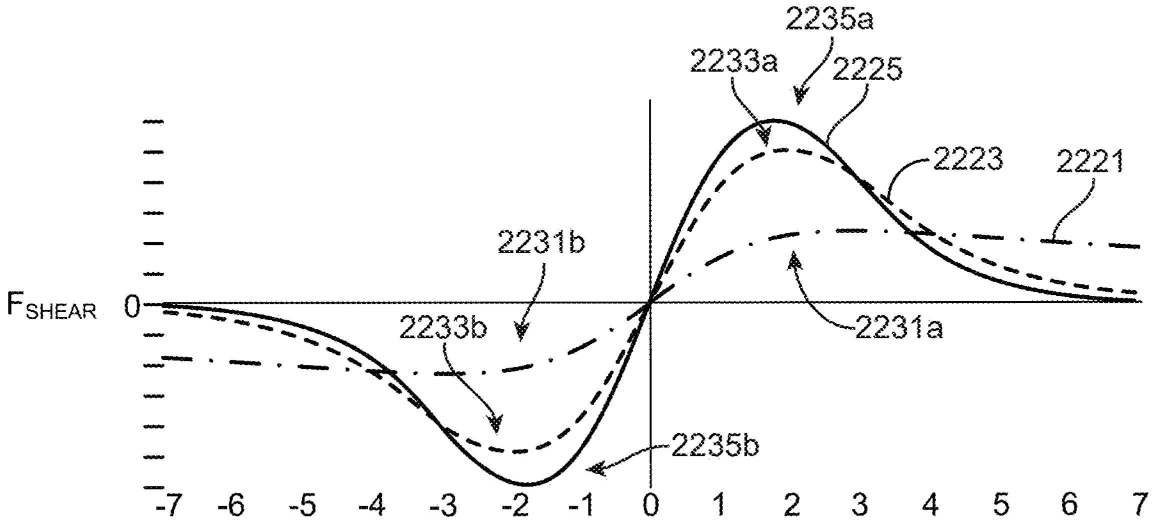

FIGS. 22A and 22B show graphs of force profiles for different magnetic alignment systems, according to some embodiments. Specifically, FIG. 22A shows a graph 2200 of vertical attractive (normal) force in the axial (z) direction for different magnetic alignment systems of comparable size and using similar types of magnets. Graph 2200 has a horizontal axis representing displacement from a center of alignment, where 0 represents the aligned position and negative and positive values represent displacements from the aligned position in opposite directions (in arbitrary units), and a vertical axis showing the normal force ($F_{NORMAL}$) as a function of displacement in the lateral plane (also in arbitrary units). For purposes of this description, $F_{NORMAL}$ is defined as the magnetic force between the primary and secondary alignment components in the axial direction; $F_{NORMAL}>0$ represents attractive force while $F_{NORMAL}<0$ represents repulsive force. Graph 2200 shows normal force profiles for three different types of magnetic alignment systems. A first type of magnetic alignment system uses "central" alignment components, such as a pair of complementary disc-shaped magnets placed along an axis; a representative normal force profile for a central magnetic alignment system is shown as line 2201 (dot-dash line). A second type of magnetic alignment system uses annular alignment components with axial magnetic orientations, e.g., magnetic alignment system 1800 of FIGS. 18A and 18B; a representative normal force profile for such an annular-axial magnetic alignment system is shown as line 2203 (dashed line). A third type of magnetic alignment system uses annular alignment components with closed-loop magnetic orientations and radial symmetry (e.g., magnetic alignment system 2100 of FIGS. 21A and 21B); a representative normal force profile for a radially symmetric closed-loop magnetic alignment system is shown as line 2205 (solid line).

Similarly, FIG. 22B shows a graph 2220 of lateral (shear) force in a transverse direction for different magnetic alignment systems. Graph 2220 has a horizontal axis representing lateral displacement in opposing directions from a center of alignment, using the same convention as graph 2200, and a vertical axis showing the shear force ($F_{SHEAR}$) as a function of direction (in arbitrary units). For purposes of this description, $F_{SHEAR}$ is defined as the magnetic force between the primary and secondary alignment components in the lateral direction; $F_{SHEAR}>0$ represents force toward the left along the displacement axis while $F_{SHEAR}<0$ represents force toward the right along the displacement axis. Graph 2220 shows shear force profiles for the same three types of magnetic alignment systems as graph 2200: a representative shear force profile for a central magnetic alignment system is shown as line 2221 (dot-dash line); a representative shear force profile for an annular-axial magnetic alignment system is shown as line 2223 (dashed line); and a representative normal force profile for a radially symmetric closed-loop magnetic alignment system is shown as line 2225 (solid line).

As shown in FIG. 22A, each type of magnetic alignment system achieves the strongest magnetic attraction in the axial direction (i.e., normal force) when the primary and secondary alignment components are in the aligned position (0 on the horizontal axis), as shown by respective peaks 2211, 2213, and 2215. While the most strongly attractive normal force is achieved in the aligned positioned for all systems, the magnitude of the peak depends on the type of magnetic alignment system. In particular, a radially-symmetric closed-loop magnetic alignment system (e.g., magnetic alignment system 2100 of FIG. 21) provides stronger magnetic attraction when in the aligned position than the other types of magnetic alignment systems. This strong attractive normal force can overcome small misalignments and can help to hold devices in the aligned position, thereby can achieving a more accurate and robust alignment between the primary and secondary alignment components, which in turn can provide a more accurate and robust alignment between a portable electronic device and a wireless charger device within which the magnetic alignment system is implemented.

As shown in FIG. 22B, the strongest shear forces are obtained when the primary and secondary alignment components are laterally just outside of the aligned position, e.g., at −2 and +2 units of separation from the aligned position, as shown by respective peaks 2231*a-b*, 2233*a-b*, and 2235*a-b*. These shear forces act to urge the alignment components toward the aligned position. Similarly to the normal force, the peak strength of shear force depends on the type of magnetic alignment system. In particular, a radially-symmetric closed-loop magnetic alignment system (e.g., magnetic alignment system 2100 of FIG. 21) provides higher magnitude of shear force when just outside of the aligned position than the other types of magnetic alignment systems. This strong shear force can provide tactile feedback (sometimes described as a sensation of "snappiness") to help the user identify when the two components are aligned. In addition, like the normal force, the shear force can overcome small misalignments due to frictional force and can achieve a more accurate and robust alignment between the primary and secondary alignment components, which in turn can provide a more accurate and robust alignment between a portable electronic device and a wireless charger device within which the magnetic alignment system is implemented.

Depending on the particular configuration of magnets, various design choices can be used to increase the sensation of snappiness for a closed-loop magnetic alignment system. For example, reducing the amount of magnetic material in the devices in areas near the magnetic alignment components—e.g., by using less material or by increasing the distance between the magnetic alignment component and the other magnetic material—can reduce stray fields and increase the perceived "snapping" effect of the magnetic alignment components. As another example, increasing the magnetic-field strength of the alignment magnets (e.g., by increasing the amount of material) can increase both shear and normal forces. As yet another example, the widths of the magnetized regions in the primary annular alignment component (and/or the relative strength of the magnetic field in each region) can be optimized based on the particular magnetic orientation pattern for the secondary annular alignment component (e.g., whether the secondary annular alignment components have the purely radial magnetic orientation of FIG. 21C or the pseudo-radial magnetic orientation of FIG. 21D). Another consideration can be the coefficient of friction between the surfaces of the devices containing primary and secondary alignment components; lower friction decreases resistance to the shear force exerted by the annular magnetic alignment components.

A radially-symmetric closed-loop magnetic alignment system (e.g., magnetic alignment system 2100 of FIGS. 21A and 21B) can provide accurate and robust alignment in the axial and lateral directions. Further, because of the radial symmetry, the alignment system does not have a preferred rotational orientation in the lateral plane about the axis; the shear force profile can be the same regardless of relative rotational orientation of the electronic devices being aligned.

Figure 23:
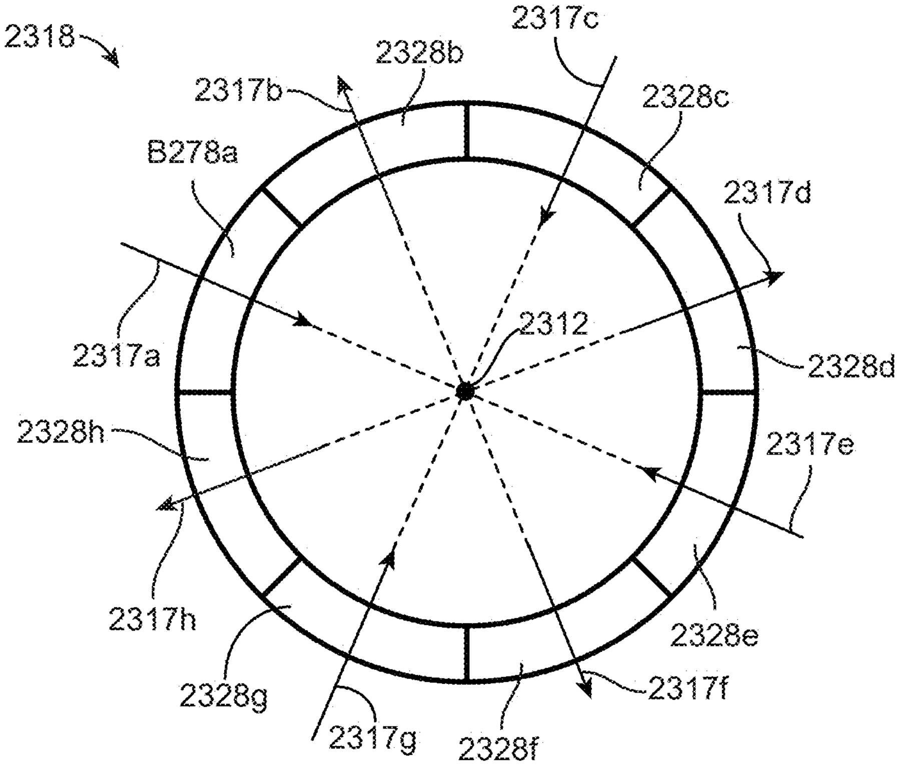
FIG. 23 shows a simplified top-down view of a secondary alignment component according to some embodiments.

In some embodiments, a closed-loop magnetic alignment system can be designed to provide one or more preferred rotational orientations. FIG. 23 shows a simplified top-down view of a secondary alignment component 2318 according to some embodiments. Secondary alignment component 2318 includes sectors 2328*a-h* having radial magnetic orientations as shown by magnetic polarity indicators 2317*a-h*. Each of sectors 2328*a-h* can include one or more secondary arcuate magnets. In this example, secondary magnets in sectors 2328*b*, 2328*d*, 2328*f*, and 2328*h* each have a north magnetic pole oriented toward the radially outward side and a south magnetic pole toward the radially inward side, while secondary magnets in sectors 2328*a*, 2328*c*, 2328*e*, and 2328*g* each have a north magnetic pole oriented toward the radially inward side and a south magnetic pole toward the radially outward side. In other words, magnets in adjacent sectors 2328*a-h* of secondary alignment component 2318 have alternating magnetic orientations.

Figure 24A:
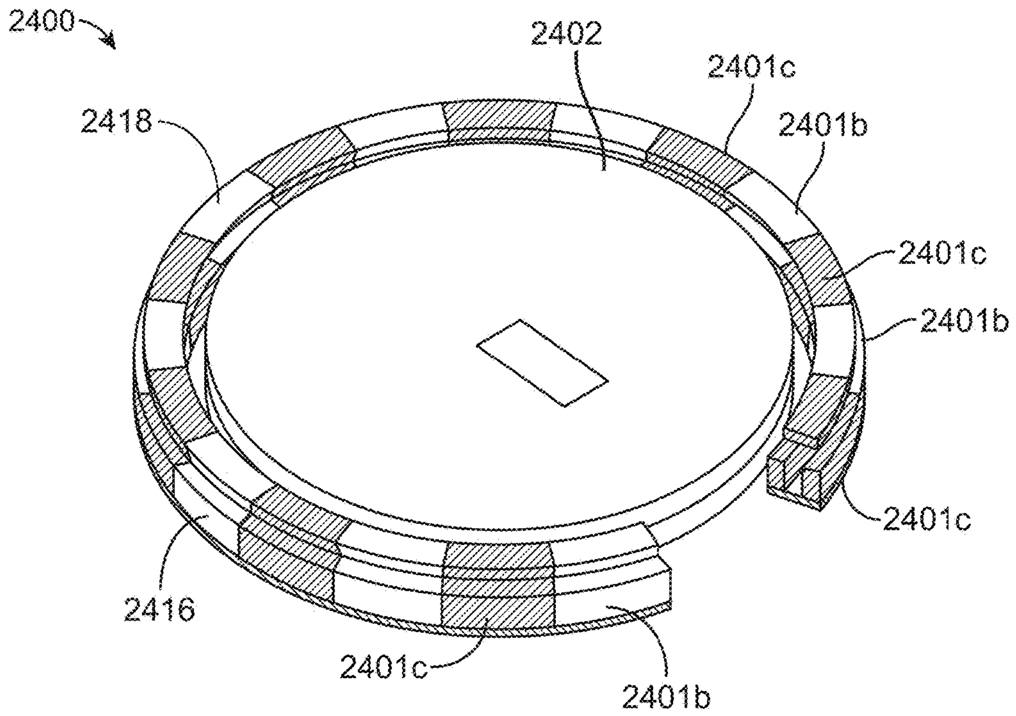
FIG. 24A shows a perspective view of a magnetic alignment system according to some embodiments.

A complementary primary alignment component can have sectors with correspondingly alternating magnetic orientations. For example, FIG. 24A shows a perspective view of a magnetic alignment system 2400 according to some embodiments. Magnetic alignment system 2400 includes a secondary alignment component 2418 having alternating radial magnetic orientations (e.g., as shown in FIG. 23) and a complementary primary alignment component 2416. Some of the arcuate sections of magnetic alignment system 2400 are not shown in order to reveal internal structure; however, it should be understood that magnetic alignment system 2400 can be a complete annular structure. Also shown are components 2402, which can include, for example, inductive coil assemblies or other components located within the central region of primary annular alignment component 2416 and/or secondary annular alignment component 2418. Magnetic alignment system 2400 can be a closed-loop magnetic alignment system similar to magnetic alignment system 1900 described above and can include arcuate sectors 2401*b*, 2401*c* of alternating magnetic orientations, with each arcuate sector 2401*b*, 2401*c* including one or more arcuate magnets in each of primary annular alignment component 2416 and secondary annular alignment component 2418. In some embodiments, the closed-loop configuration of magnetic alignment system 2400 can reduce or prevent magnetic field leakage that may affect component 2402. Like magnetic alignment system 2100, magnetic alignment system 2400 can include a gap 2403 between two sectors.

Figure 24B:
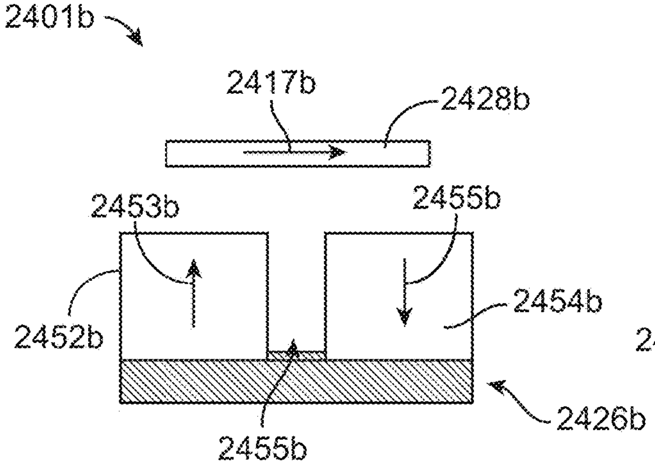
FIGS. 24B and 24C show axial cross-section views through different portions of the system of FIG. 24A.
Figure 24C:
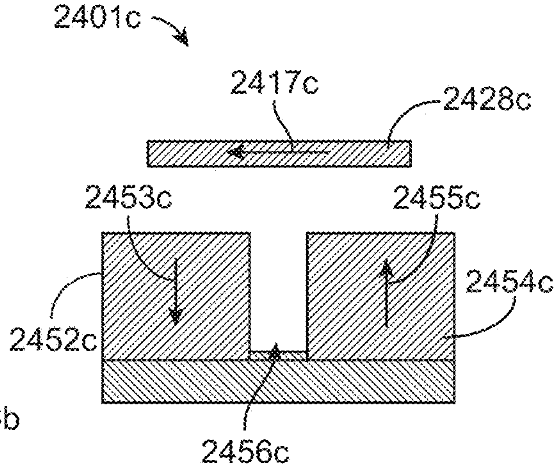

FIG. 24B shows an axial cross-section view through one of arcuate sectors 2401*b*, and FIG. 24C shows an axial cross-section view through one of arcuate sectors 2401*c*. Arcuate sector 2401*b* includes a primary magnet 2426*b* and a secondary magnet 2428*b*. As shown by orientation indicator 2417*b*, secondary magnet 2428*b* has a magnetic polarity oriented in a radially outward direction, i.e., the north magnetic pole is toward the radially outward side of magnetic alignment system 2400. Like primary magnets 1926 described above, primary magnet 2426*b* includes an inner arcuate magnetic region 2452*b*, an outer arcuate magnetic region 2454*b*, and a central non-magnetized region 2456*b* (which can include, e.g., an air gap or a region of nonmagnetic or non-magnetized material). Inner arcuate magnetic region 2452*b* has a magnetic polarity oriented axially such that the north magnetic pole is toward secondary magnet 2428*b*, as shown by indicator 2453*b*, while outer arcuate magnetic region 2454*b* has an opposite magnetic orientation, with the south magnetic pole oriented toward secondary magnet 2428*b*, as shown by indicator 2455*b*. As described above with reference to FIG. 19B, the arrangement of magnetic orientations shown in FIG. 24B results in magnetic attraction between primary magnet 2426*b* and secondary magnet 2428*b*.

As shown in FIG. 24C, arcuate sector 2401*c* has a "reversed" magnetic orientation relative to arcuate sector 2401*b*. Arcuate sector 2401*c* includes a primary magnet 2426*c* and a secondary magnet 2428*c*. As shown by orientation indicator 2417*c*, secondary magnet 2428*c* has a magnetic polarity oriented in a radially inward direction, i.e., the north magnetic pole is toward the radially inward side of magnetic alignment system 2400. Like primary magnets 1926 described above, primary magnet 2426*c* includes an inner arcuate magnetic region 2452*c*, an outer arcuate magnetic region 2454*c*, and a central non-magnetized region 2456*c* (which can include, e.g., an air gap or a region of nonmagnetic or non-magnetized material). Inner arcuate magnetic region 2452*c* has a magnetic polarity oriented axially such that the south magnetic pole is toward secondary magnet 2428*c*, as shown by indicator 2453*c*, while outer arcuate magnetic region 2454*c* has an opposite magnetic orientation, with the north magnetic pole oriented toward secondary magnet 2428*c*, as shown by indicator 2455*c*. As described above with reference to FIG. 19B, the arrangement of magnetic orientations shown in FIG. 24C results in magnetic attraction between primary magnet 2426*c* and secondary magnet 2428*c*.

An alternating arrangement of magnetic polarities as shown in FIGS. 23 and 24A-8C can create a "ratcheting" feel when secondary alignment component 2418 is aligned with primary alignment component 2416 and one of alignment components 2416, 2418 is rotated relative to the other about the common axis. For instance, as secondary alignment component 2416 is rotated relative to primary alignment component 2416, each radially-outward magnet 2428*b* alternately comes into proximity with a complementary magnet 2426*b* of primary alignment component 2416, resulting in an attractive magnetic force, or with an anti-complementary magnet 2426*c* of primary alignment component 2416, resulting in a repulsive magnetic force. If primary magnets 2426*b*, 2426*c* and secondary magnets 2428*b*, 2428*c* have the same angular size and spacing, in any given orientation, each pair of magnets will experience similar net (attractive or repulsive) magnetic forces such that alignment is stable and robust in rotational orientations in which complementary magnet pairs 2426*b*, 2428*b* and 2426*c*, 2428*c* are in proximity. In other rotational orientations, a torque toward a stable rotational orientation can be experienced.

Figure 25A:
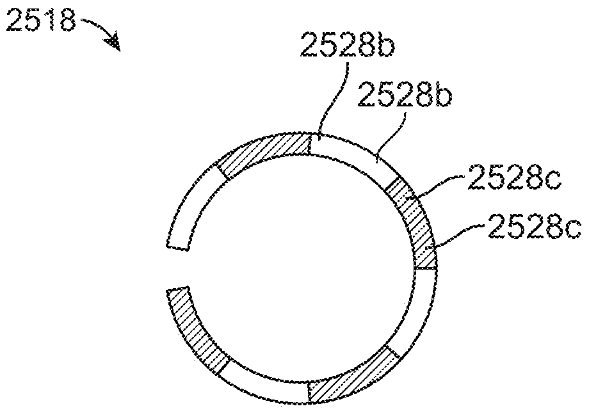
FIGS. 25A and 25B show simplified top-down views of secondary alignment components according to various embodiments.
Figure 25B:
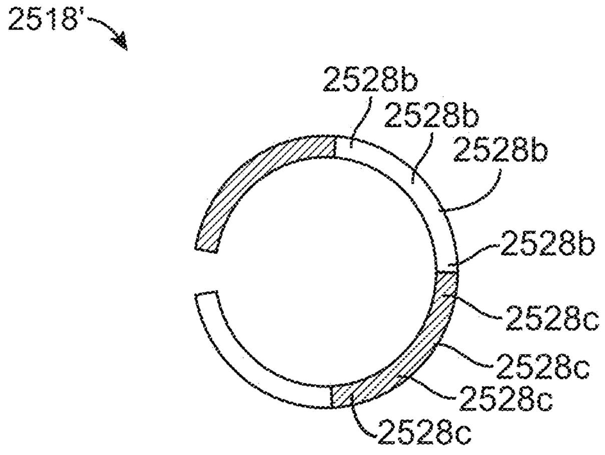

In the examples shown in FIGS. 23 and 24A-8C, each sector includes one magnet, and the direction of magnetic orientation alternates with each magnet. In some embodiments, a sector can include two or more magnets having the same direction of magnetic orientation. For example, FIG. 25A shows a simplified top-down view of a secondary alignment component 2518 according to some embodiments. Secondary alignment component 2518 includes secondary magnets 2528*b* with radially outward magnetic orientations and secondary magnets 2528*c* with radially inward orientations, similarly to secondary alignment component 2418 described above. In this example, the magnets are arranged such that a pair of outwardly-oriented magnets 2528*b* (forming a first sector 2501) are adjacent to a pair of inwardly-oriented magnets 2528*c* (forming a second sector 2503 adjacent to first sector 2501). The pattern of alternating sectors (with two magnets per sector) repeats around the circumference of secondary alignment component 2518. Similarly, FIG. 25B shows a simplified top-down view of another secondary alignment component 2518' according to some embodiments. Secondary alignment component 2518' includes secondary magnets 2528*b* with radially outward magnetic orientations and secondary magnets 2528*c* with radially inward orientations. In this example, the magnets are arranged such that a group of four radially-outward magnets 2528*b* (forming a first sector 2511) is adjacent to a group of four radially-inward magnets 2528*c* (forming a second sector 2513 adjacent to first sector 2511). The pattern of alternating sectors (with four magnets per sector) repeats around the circumference of secondary alignment component 2518'. Although not shown in FIGS. 25A and 25B, the structure of a complementary primary alignment component for secondary alignment component 2518 or 2518' should be apparent in view of FIGS. 24A-8C. A shear force profile for the alignment components of FIGS. 25A and 25B can be similar to the ratcheting profile described above, although the number of rotational orientations that provide stable alignment will be different.

Figure 26:
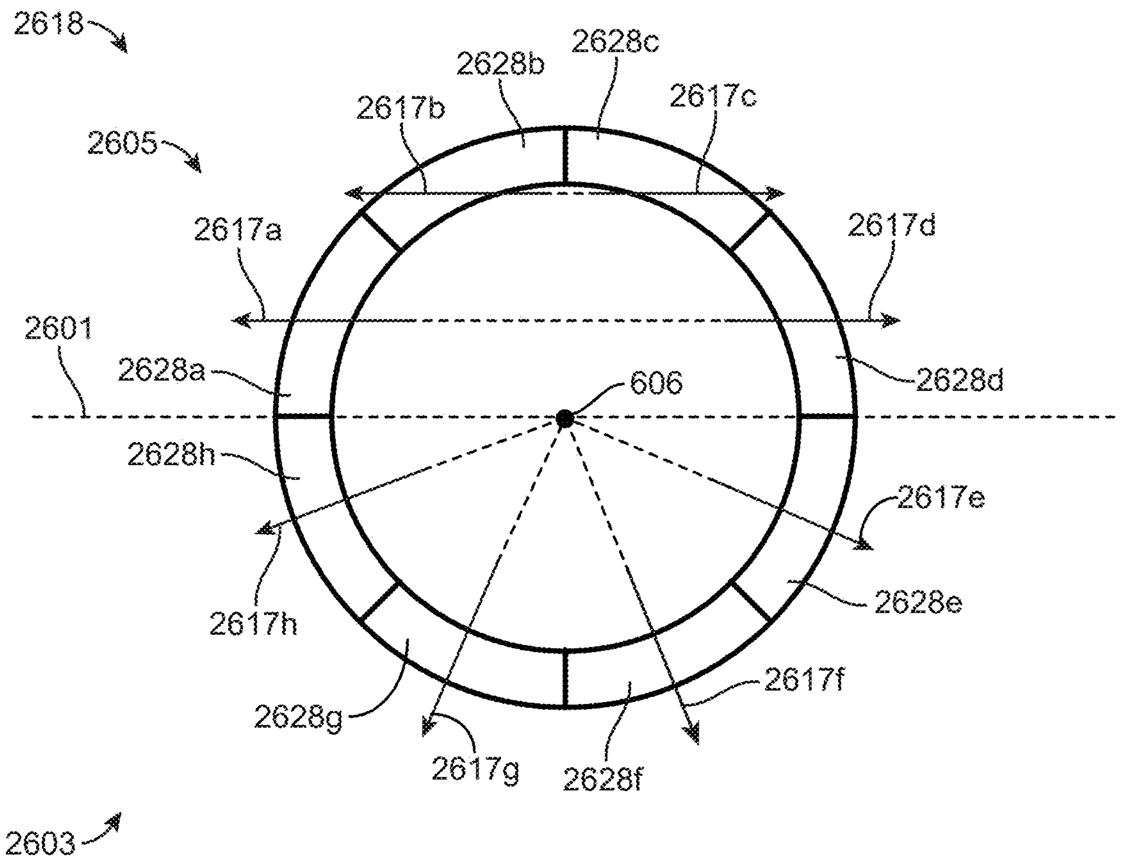
FIG. 26 shows a simplified top-down view of a secondary alignment component according to some embodiments.

In other embodiments, a variety of force profiles can be created by changing the magnetic orientations of different sectors within the primary and/or secondary alignment components. As just one example, FIG. 26 shows a simplified top-down view of a secondary alignment component 2618 according to some embodiments. Secondary alignment component has sectors 2628*a-h* with sector-dependent magnetic orientations as shown by magnetic polarity indicators 2617*a-h*. In this example, secondary alignment component 2618 can be regarded as bisected by bisector line 2601, which defines two halves of secondary alignment component 2618. In a first half 2603, sectors 2628*e-h* have magnetic polarities oriented radially outward, similarly to examples described above.

In the second half 2605, sectors 2628*a-d* have magnetic polarities oriented substantially parallel to bisector line 2601 rather than radially. In particular, sectors 2628*a* and 2628*b* have magnetic polarities oriented in a first direction parallel to bisector line 2601, while sectors 2628*c* and 2628*d* have magnetic polarities oriented in the direction opposite to the direction of the magnetic polarities of sectors 2628*a* and 2628*b*. A complementary primary alignment component can have an inner annular region with magnetic north pole oriented toward secondary alignment component 2618, an outer annular region with magnetic north pole oriented away from secondary alignment component 2618, and a central non-magnetized region, providing a closed-loop magnetic orientation as described above. The asymmetric arrangement of magnetic orientations in secondary alignment component 2618 can modify the shear force profile such that secondary alignment component 2618 generates less shear force resisting motion in the direction toward second half 2605 (upward in the drawing) than in the direction toward first half 2603 (downward in the drawing). In some embodiments, an asymmetrical arrangement of this kind can be used where the primary alignment component is mounted in a docking station and the secondary alignment component is mounted in a portable electronic device that docks with the docking station. Assuming secondary annular alignment component 2618 is oriented in the portable electronic device such that half-annulus 2605 is toward the top of the portable electronic device, the asymmetric shear force can facilitate an action of sliding the portable electronic device downward to dock with the docking station or upward to remove it from the docking station, while still providing an attractive force to draw the portable electronic device into a desired alignment with the docking station.

In the embodiments described above, the secondary annular magnetic alignment component has a magnetic orientation that is generally aligned in the transverse plane. In some alternative embodiments, a secondary annular magnetic alignment component can instead have a quad-pole configuration similar to that of primary annular magnetic alignment component 1916 of FIGS. 19A and 19B, with or without a DC shield (which, if present, can be similar to DC shield 1914 of FIGS. 19A and 19B) on the distal surface of the secondary arcuate magnets. Using quad-pole magnetic configurations in both the primary and secondary alignment components can provide a closed-loop DC magnetic flux path and a strong sensation of "snappiness"; however, the thickness of the secondary magnetic alignment component may need to be increased to accommodate the quad-pole magnets and DC shield, which may increase the overall thickness of a portable electronic device that houses the secondary magnetic alignment component. To reduce thickness, the DC shield on the distal surface of the secondary alignment component can be omitted; however, omitting the DC shield may result in increased flux leakage into neighboring components.

It will be appreciated that the foregoing examples are illustrative and not limiting. Sectors of a primary and/or secondary alignment component can include magnetic elements with the magnetic polarity oriented in any desired direction and in any combination, provided that the primary and secondary alignment components of a given magnetic alignment system have complementary magnetic orientations that exert forces toward the desired position of alignment. Different combinations of magnetic orientations may create different shear force profiles, and the selection of magnetic orientations may be made based on a desired shear force profile (e.g., high snappiness), avoidance of DC flux leakage into other components, and other design considerations.

In various embodiments described above, a magnetic alignment system can provide robust alignment in a lateral plane and may or may not provide rotational alignment. For example, radially symmetric magnetic alignment system 2100 of FIGS. 21A-5B may not define a preferred rotational orientation. Radially alternating magnetic alignment system 2400 of FIGS. 24A-8C can define multiple equally preferred rotational orientations. For some applications, such as alignment of a portable electronic device with a wireless charger puck or mat, rotational orientation may not be a concern. In other applications, such as alignment of a portable electronic device in a docking station or other mounting accessory, a particular rotational alignment may be desirable. Accordingly, in some embodiments an annular magnetic alignment component can be augmented with one or more rotational alignment components positioned outboard of and spaced apart from the annular magnetic alignment components. The rotational alignment component(s) can help guide devices into a target rotational orientation relative to each other.

Figure 27:
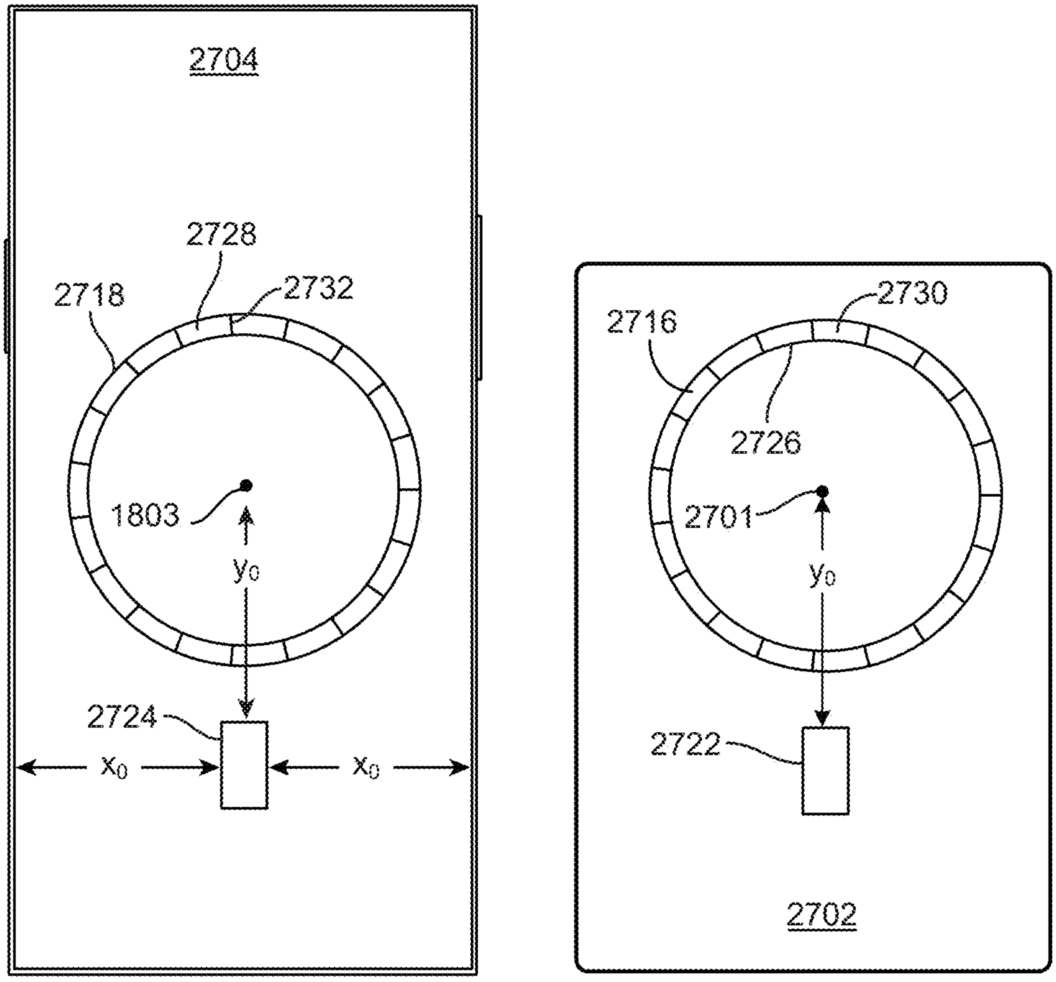
FIG. 27 shows an example of a portable electronic device and an accessory incorporating a magnetic alignment system with an annular alignment component and a rotational alignment component according to some embodiments.

FIG. 27 shows an example of a magnetic alignment system with an annular alignment component and a rotational alignment component according to some embodiments. FIG. 27 shows respective proximal surfaces of a portable electronic device 2704 and an accessory 2702. In this example, primary alignment components of the magnetic alignment system are included in an accessory device 2702, and secondary alignment components of the magnetic alignment system are included in a portable electronic device 2704. Portable electronic device 2704 can be, for example, a smart phone whose front surface provides a touchscreen display and whose back surface is designed to support wireless charging. Accessory device 2702 can be, for example, a charging dock that supports portable electronic device 2704 such that its display is visible and accessible to a user. For instance, accessory device 2702 can support portable electronic device 2704 such that the display is vertical or at a conveniently tilted angle for viewing and/or touching. In the example shown, accessory device 2702 supports portable electronic device 2704 in a "portrait" orientation (shorter sides of the display at the top and bottom); however, in some embodiments accessory device 2702 can support portable electronic device 2704 in a "landscape" orientation (longer sides of the display at the top and bottom). Accessory device 2702 can also be mounted on a swivel, gimbal, or the like, allowing the user to adjust the orientation of portable electronic device 2704 by adjusting the orientation of accessory device 2702.

As described above, components of a magnetic alignment system can include a primary annular alignment component 2716 disposed in accessory 2702 and a secondary annular alignment component 2718 disposed in portable electronic device 2704. Primary annular alignment component 2716 can be similar or identical to any of the primary alignment components described above. For example, primary annular alignment component 2716 can be formed of arcuate magnets 2726 arranged in an annular configuration. Although not shown in FIG. 27, one or more gaps can be provided in primary annular alignment component 2716, e.g., by omitting one or more of arcuate magnets 2726 or by providing a gap at one or more interfaces 2730 between adjacent arcuate magnets 2726. In some embodiments, each arcuate magnet 2726 can include an inner arcuate region having a first magnetic orientation (e.g., axially oriented in a first direction), an outer arcuate region having a second magnetic orientation opposite the first magnetic orientation (e.g., axially oriented opposite the first direction), and a central non-magnetized arcuate region between the inner and outer regions (as described above, the non-magnetized central region can include an air gap or a nonmagnetic material). In some embodiments, primary annular alignment component 2716 can also include a DC shield (not shown) on the distal side of arcuate magnets 2726.

Likewise, secondary annular alignment component 2718 can be similar or identical to any of the secondary alignment components described above. For example, secondary annular alignment component 2718 can be formed of arcuate magnets 2728 arranged in an annular configuration. Although not shown in FIG. 27, one or more gaps can be provided in secondary annular alignment component 2718, e.g., by omitting one or more arcuate magnets 2728 or by providing a gap at one or more interfaces 2732 between adjacent magnets 2728. As described above, arcuate magnets 2728 can provide radially-oriented magnetic polarities. For instance, all sectors of secondary annular alignment component 2718 can have a radially-outward magnetic orientation or a radially-inward magnetic orientation, or some sectors of secondary annular alignment component 2718 may have a radially-outward magnetic orientation while other sectors of secondary annular alignment component 2718 have a radially-inward magnetic orientation.

As described above, primary annular alignment component 2716 and secondary annular alignment component 2718 can provide shear forces that promote alignment in the lateral plane so that center point 2701 of primary annular alignment component 2716 aligns with center point 2703 of secondary annular alignment component 2718. However, primary annular alignment component 2716 and secondary annular alignment component 2718 might not provide torque forces that favor any particular rotational orientation, such as portrait orientation.

Accordingly, in some embodiments, a magnetic alignment system can incorporate one or more rotational alignment components in addition to the annular alignment components. The rotational alignment components can include one or more magnets that provide torque about the common axis of the (aligned) annular alignment components, so that a preferred rotational orientation can be reliably established. For example, as shown in FIG. 27, a primary rotational alignment component 2722 can be disposed outboard of and spaced apart from primary annular alignment component 2716 while a secondary rotational alignment component 2724 is disposed outboard of and spaced apart from secondary annular alignment component 2718. Secondary rotational alignment component 2724 can be positioned at a fixed distance ($y_0$) from center point 2703 of secondary annular alignment component 2718 and centered between the side edges of portable electronic device 2704 (as indicated by distance $x_0$ from either side edge). Similarly, primary rotational alignment component 2722 can be positioned at the same distance $y_0$ from center point 2701 of primary annular alignment component 2716 and located at a rotational angle that results in a torque profile that favors the desired orientation of portable electronic device 2704 relative to accessory 2702 when secondary rotational alignment component 2724 is aligned with primary rotational alignment component 2722. It should be noted that the same distance $y_0$ can be applied in a variety of portable electronic devices having different form factors, so that a single accessory can be compatible with a family of portable electronic devices. A longer distance $y_0$ can increase torque toward the preferred rotational alignment; however, the maximum distance $y_0$ may be limited by design considerations, such as the size of the smallest portable electronic device in a family of portable electronic devices that incorporate mutually compatible magnetic alignment systems.

According to some embodiments, each of primary rotational alignment component 2722 and secondary rotational alignment component 2724 can be implemented using one or more magnets (e.g., rare earth magnets such as NdFeB) each of which has each been magnetized such that its magnetic polarity is oriented in a desired direction. In the example of FIG. 27, the magnets have rectangular shapes; however, other shapes (e.g., rounded shapes) can be substituted. The magnetic orientations of rotational alignment components 2722 and 2724 can be complementary so that when the proximal surfaces of rotational alignment components 2722 and 2724 are near each other, an attractive magnetic force is exerted. This attractive magnetic force can help to rotate portable electronic device 2704 and accessory 2702 into a preferred rotational orientation in which the proximal surfaces of rotational alignment components 2722 and 2724 are aligned with each other. Examples of magnetic orientations for rotational alignment components 2722 and 2724 that can be used to provide a desired attractive force are described below. In some embodiments, primary rotational alignment component 2722 and secondary rotational alignment component 2724 can have the same lateral (xy) dimensions and the same thickness. The dimensions can be chosen based on a desired magnetic field strength and/or torque, the dimensions of devices in which the rotational alignment components are to be deployed, and other design considerations. In some embodiments, the lateral dimensions can be about 6 mm (x direction) by about 27 mm (y direction), and the thickness can be anywhere from about 0.3 mm to about 1.5 mm; the particular dimensions can be chosen based on the sizes of the devices that are to be aligned. In some embodiments, each of primary rotational alignment component 2722 and secondary rotational alignment component 2724 can be implemented using two or more rectangular blocks of magnetic material positioned adjacent to each other. As in other embodiments, a small gap may be present between adjacent magnets, e.g., due to manufacturing tolerances.

Figure 28A:
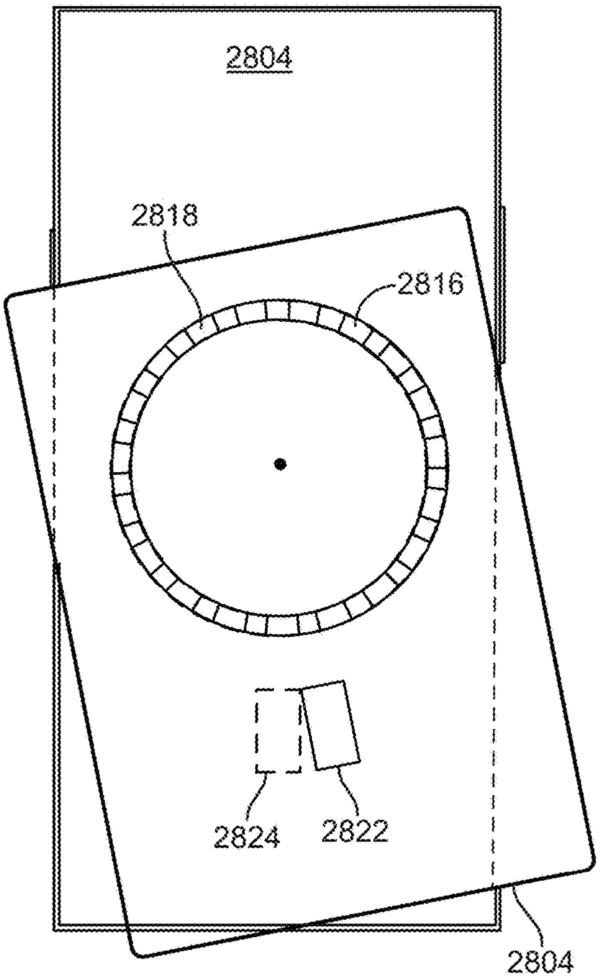
FIGS. 28A and 28B show an example of rotational alignment according to some embodiments.
Figure 28B:
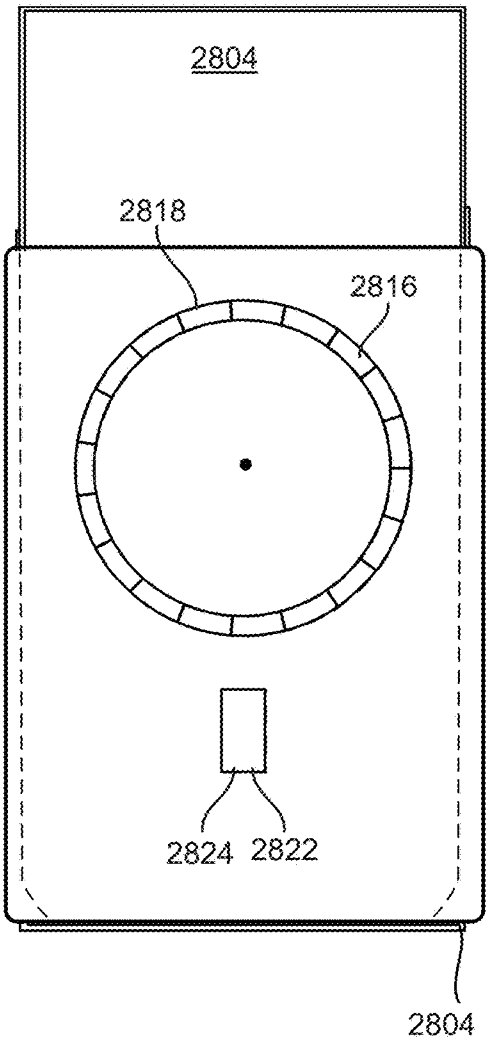

FIGS. 28A and 28B show an example of rotational alignment according to some embodiments. In FIG. 28A, accessory 2702 is placed on the back surface of portable electronic device 2704 such that primary annular alignment component 2716 and secondary alignment component 2718 are aligned with each other in the lateral plane such that, in the view shown, center point 2701 of primary annular alignment component 2716 overlies center point 2703 of secondary annular alignment component 2718. A relative rotation is present such that rotational alignment components 2722 and 2724 are not aligned. In this configuration, an attractive force between rotational alignment components 2722 and 2724 can urge portable electronic device 2704 and accessory 2702 toward a target rotational orientation. In FIG. 28B, the attractive magnetic force between rotational alignment components 2722 and 2724 has brought portable electronic device 2704 and accessory 2702 into the target rotational alignment with the sides of portable electronic device 2704 parallel to the sides of accessory 2702. In some embodiments, the attractive magnetic force between rotational alignment components 2722 and 2724 can also help to hold portable electronic device 2704 and accessory 2702 in a fixed rotational alignment.

Figure 29A:
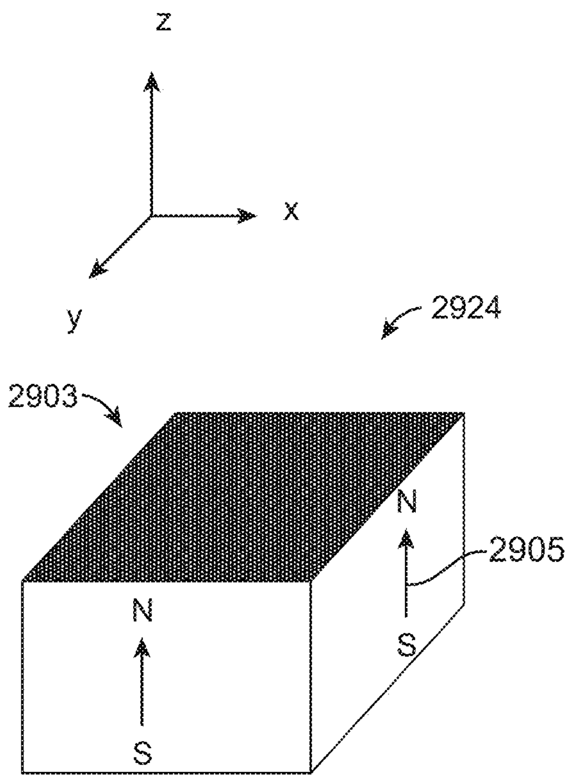
FIGS. 29A and 29B show a perspective view and a top view of a rotational alignment component having a "z-pole" configuration according to some embodiments.

Rotational alignment components 2722 and 2724 can have various patterns of magnetic orientations. As long as the magnetic orientations of rotational alignment components 2722 and 2724 are complementary to each other, a torque toward the target rotational orientation can be present when the devices are brought into lateral alignment and close to the target rotational orientation. FIGS. 29A-21B show examples of magnetic orientations for a rotational alignment component according to various embodiments. While the magnetic orientation is shown for only one rotational alignment component, it should be understood that the magnetic orientation of a complementary rotational alignment component can be complementary to the magnetic orientation of shown.

Figure 29B:
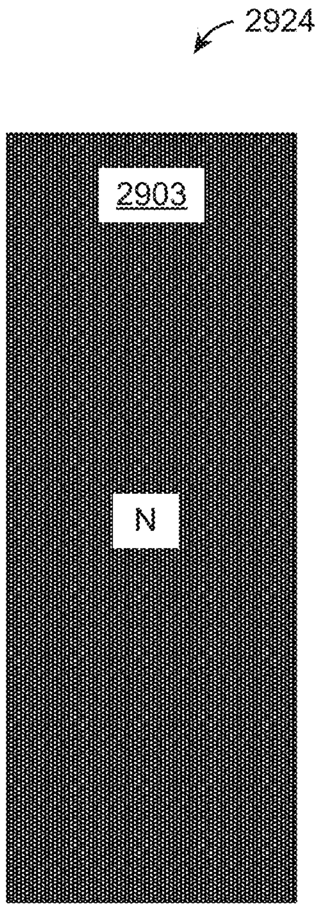

FIGS. 29A and 29B show a perspective view and a top view of a rotational alignment component 2924 having a "z-pole" configuration according to some embodiments. It should be understood that the perspective view is not to any particular scale and that the lateral (xy) dimensions and axial (z) thickness can be varied as desired. As shown in FIG. 29A, rotational alignment component 2924 can have a uniform magnetic orientation along the axial direction, as indicated by arrows 2905. Accordingly, as shown in FIG. 29B, a north magnetic pole (N) may be nearest the proximal surface 2903 of rotational alignment component 2924. A complementary z-pole alignment component can have a uniform magnetic orientation with a south magnetic pole nearest the proximal surface. The z-pole configuration can provide reliable alignment.

Other configurations can provide reliable alignment as well as a stronger, or more salient, "clocking" sensation for the user. A "clocking sensation," in this context, refers to a user-perceptible torque about the common axis of the annular alignment components that urges toward the target rotational alignment and/or resists small displacements from the target rotational alignment. A greater variation of torque as a function of rotational angle can provide a more salient clocking sensation. Following are examples of magnetization configurations for a rotational alignment component that can provide more salient clocking sensations than the z-pole configuration of FIGS. 29A and 29B.

Figure 30A:
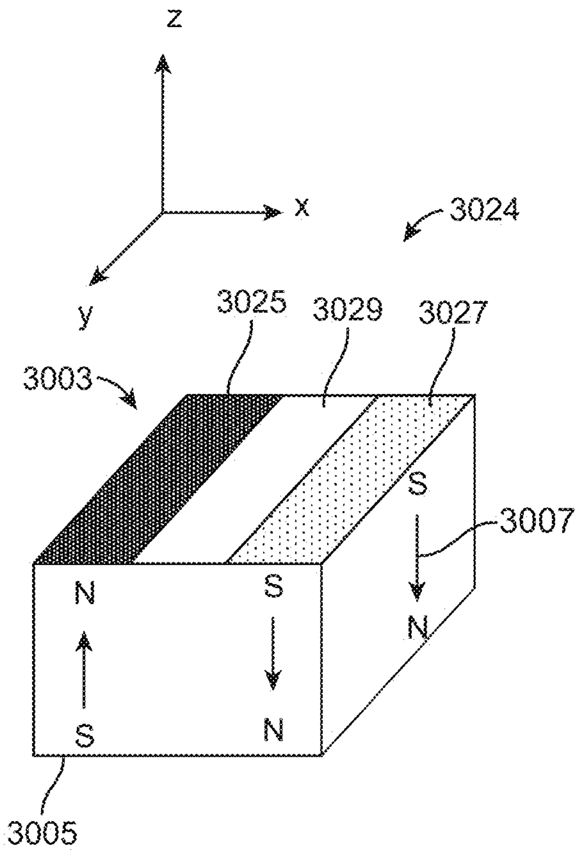
FIGS. 30A and 30B show a perspective view and a top view of a rotational alignment component having a "quad pole" configuration according to some embodiments.
Figure 30B:
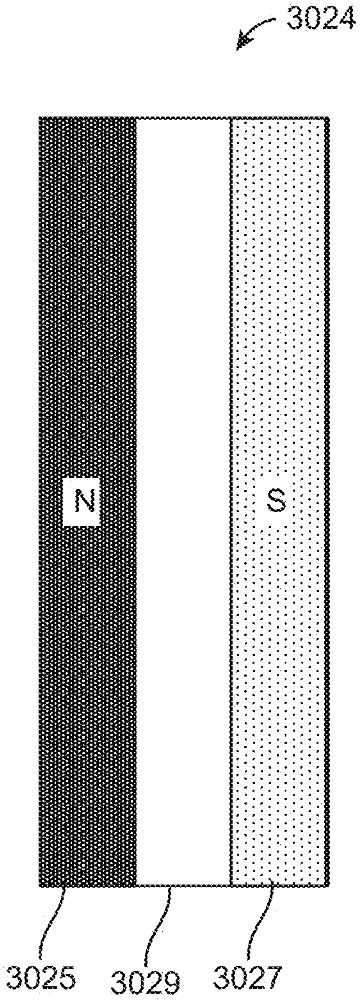

FIGS. 30A and 30B show a perspective view and a top view of a rotational alignment component 3024 having a "quad pole" configuration according to some embodiments. It should be understood that the perspective view is not to any particular scale and that the lateral (xy) dimensions and axial (z) thickness can be varied as desired. As shown in FIG. 30A, rotational alignment component 3024 has a first magnetized region 3025 with a magnetic orientation along the axial direction such that the north magnetic pole (N) is nearest the proximal (+z) surface 3003 of rotational alignment component 3024 (as indicated by arrow 3005) and a second magnetized region 3027 with a magnetic orientation opposite to the magnetic orientation of the first region such that the south magnetic pole (S) is nearest to proximal surface 3003 (as indicated by arrows 3007). Between magnetized regions 3025 and 3027 is a central region 3029 that is not magnetized. In some embodiments, rotational alignment component 3024 can be formed from a single piece of magnetic material that is exposed to a magnetizer to create regions 3025, 3027, 3029. Alternatively, rotational alignment component 3024 can be formed using two pieces of magnetic material with a nonmagnetic material or an air gap between them. As shown in FIG. 30B, the proximal surface of rotational alignment component 3024 can have one region having a "north" polarity and another region having a "south" polarity. A complementary quad-pole rotational alignment component can have corresponding regions of south and north polarity at the proximal surface.

Figure 31A:
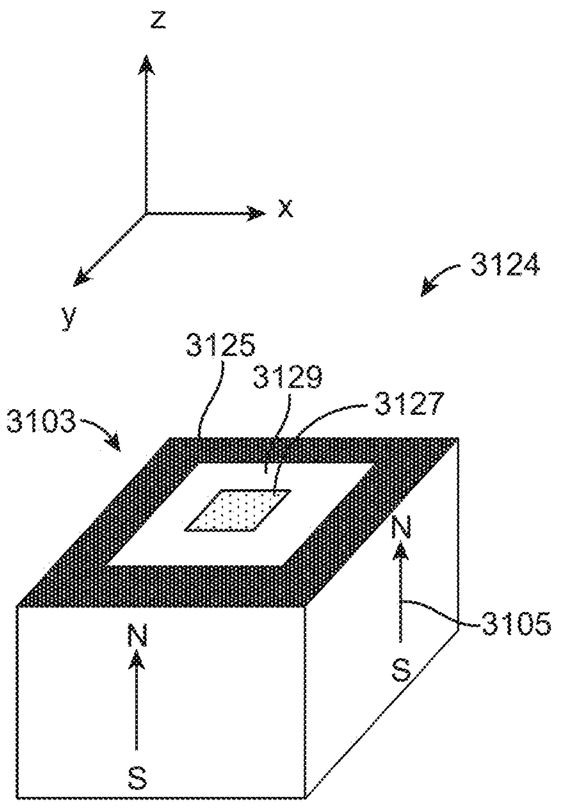
FIGS. 31A and 31B show a perspective view and a top view of a rotational alignment component having an "annulus design" configuration according to some embodiments.
Figure 31B:
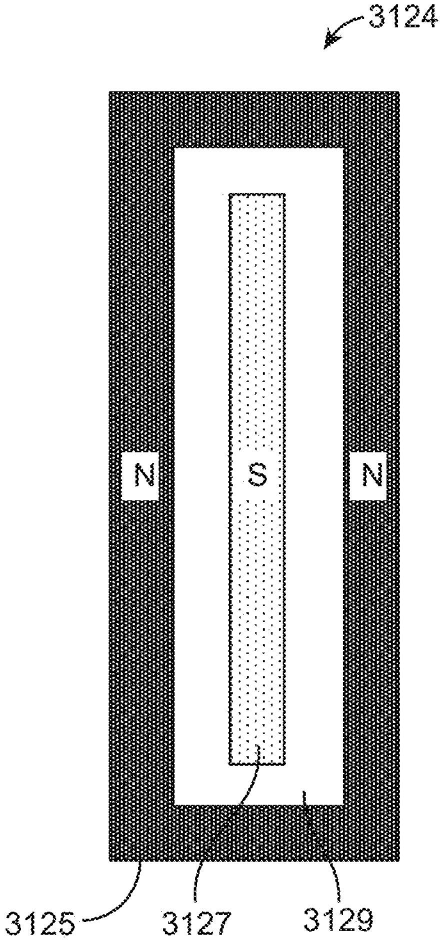

FIGS. 31A and 31B show a perspective view and a top view of a rotational alignment component 3124 having an "annulus design" configuration according to some embodiments. It should be understood that the perspective view is not to any particular scale and that the lateral (xy) dimensions and axial (z) thickness can be varied as desired. As shown in FIG. 31A, rotational alignment component 3124 has an annular outer magnetized region 3125 with a magnetic orientation along the axial direction such that the north magnetic pole (N) is nearest the proximal (+z) surface 3103 of rotational alignment component 3124 (as shown by arrows 3105) and an inner magnetized region 3127 with a magnetic orientation opposite to the magnetic orientation of the first region such that the south magnetic pole (S) is nearest to proximal surface 3103. Between magnetized regions 3125 and 3127 is a neutral annular region 3129 that is not magnetized. In some embodiments, rotational alignment component 3124 can be formed from a single piece of magnetic material that is exposed to a magnetizer to create regions 3125, 3127, 3129. Alternatively, rotational alignment component 3124 can be formed using two or more pieces of magnetic material with a nonmagnetic material or an air gap between them. As shown in FIG. 31B, the proximal surface of rotational alignment component 3124 can have an annular outer region having a "north" polarity and an inner region having a "south" polarity. The proximal surface of a complementary annulus-design rotational alignment component can have an annular outer region of south polarity and an inner region of north polarity.

Figure 32A:
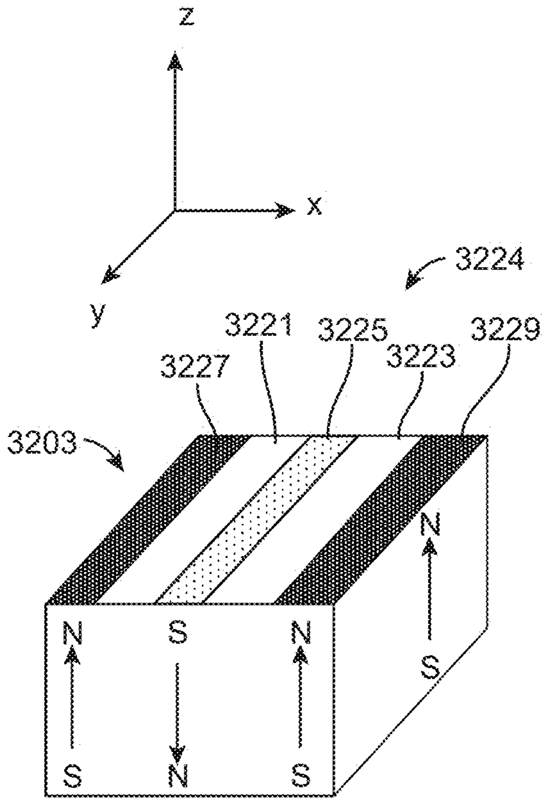
FIGS. 32A and 32B show a perspective view and a top view of a rotational alignment component having a "triple pole" configuration according to some embodiments.
Figure 32B:
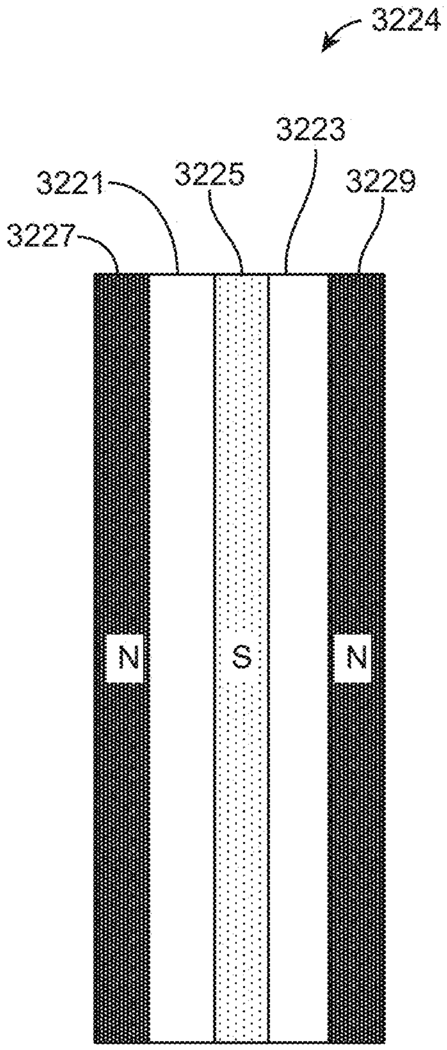

FIGS. 32A and 32B show a perspective view and a top view of a rotational alignment component 3224 having a "triple pole" configuration according to some embodiments. It should be understood that the perspective view is not to any particular scale and that the lateral (xy) dimensions and axial (z) thickness can be varied as desired. As shown in FIG. 32A, rotational alignment component 3224 has a central magnetized region 3225 with a magnetic orientation along the axial direction such that the south magnetic pole (S) is nearest the proximal (+z) surface 3203 of rotational alignment component 3224 (as shown by arrow 3205) and outer magnetized regions 3227, 3229 with a magnetic orientation opposite to the magnetic orientation of central region 3225 such that the north magnetic pole (N) is nearest to proximal surface 3203 (as shown by arrows 3207, 3209). Between central magnetized region 3225 and each of outer magnetized regions 3227, 3229 is a neutral region 3231, 3233 that is not strongly magnetized. In some embodiments, rotational alignment component 3224 can be formed from a single piece of magnetic material that is exposed to a magnetizer to create regions 3225, 3227, 3229. Alternatively, rotational alignment component 3224 can be formed using three (or more) pieces of magnetic material with nonmagnetic materials or air gaps between them. As shown in FIG. 32B, the proximal surface may have a central region having a "south" polarity with an outer region having "north" polarity to either side. The proximal surface of a complementary triple-pole rotational alignment component can have a central region of north polarity with an outer region of south polarity to either side.

It should be understood that the examples in FIGS. 29A-21B are illustrative and that other configurations may be used. The selection of a magnetization pattern for a rotational alignment component can be independent of the magnetization pattern of an annular alignment component with which the rotational alignment component is used.

In some embodiments, the selection of a magnetization pattern for a rotational alignment component can be based on optimizing the torque profile. For example, as noted above, it may be desirable to provide a salient clocking sensation to a user when close to the desired rotational alignment. The clocking sensation can be a result of torque about a rotational axis defined by the annular alignment components. The amount of torque depends on various factors, including the distance between the axis and the rotational alignment component (distance y0 in FIG. 27) and the length (in the y direction as defined in FIG. 27) of the rotational alignment component, as well as the strength of the magnetic fields of the rotational alignment components (which may depend on the size of the rotational alignment components) and whether the annular alignment components exert any torque toward a preferred rotational orientation.

Figure 33:
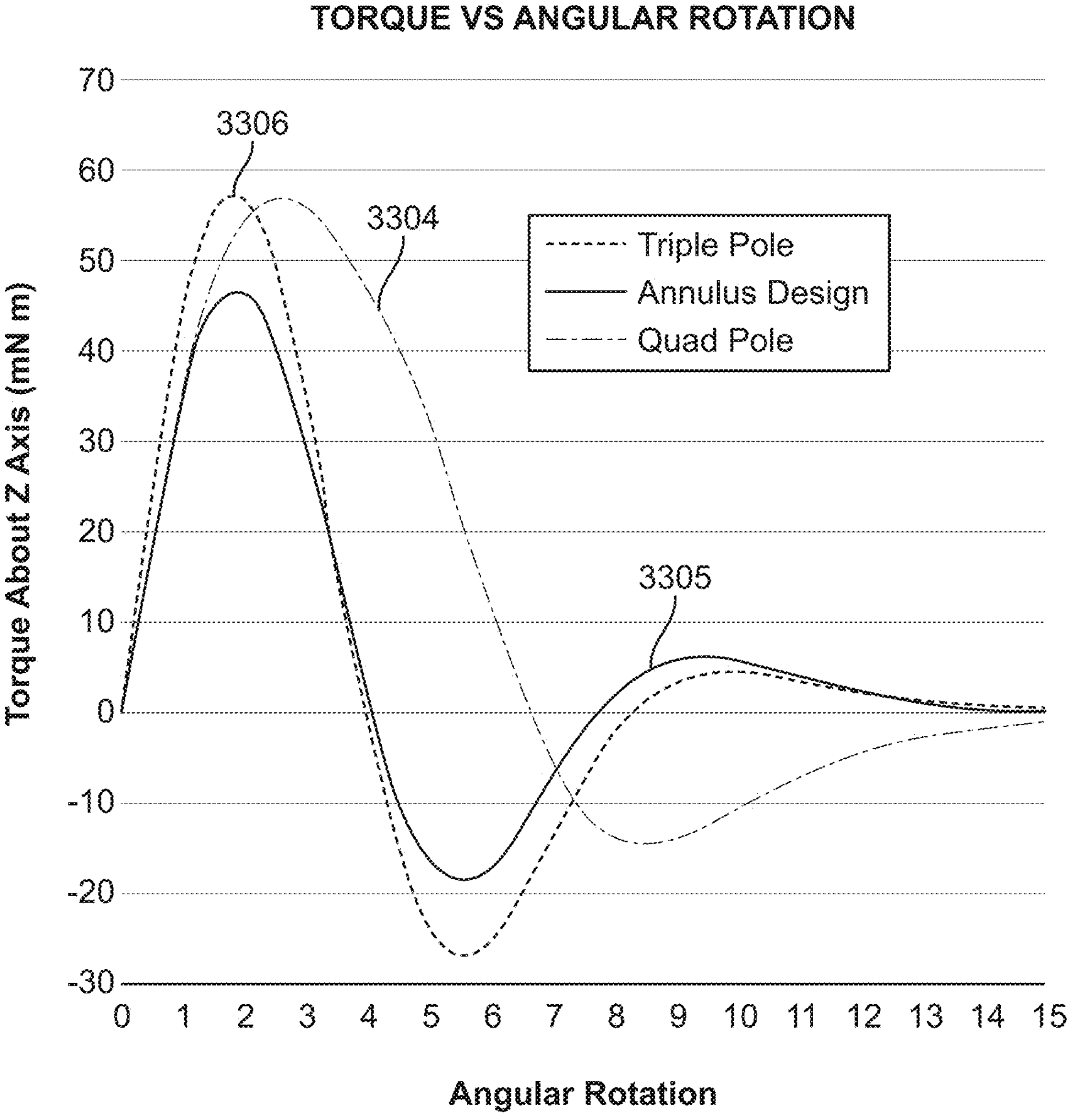
FIG. 33 shows graphs of torque as a function of angular rotation for magnetic alignment systems having rotational alignment components according to various embodiments.

FIG. 33 shows a graph of torque as a function of angular rotation (in degrees) for an alignment system of the kind shown in FIG. 27, for different magnetization configurations of the rotational alignment component according to various embodiments. Angular rotation is defined such that zero degrees corresponds to the target rotational alignment (where the proximal surfaces of rotational angular components 2722 and 2724 are in closest proximity, e.g., as shown in FIG. 28B). Torque is defined such that positive (negative) values indicate force in the direction of decreasing (increasing) rotational angle. For purpose of generating the torque profiles, it is assumed that annular alignment components 2716 and 2718 are rotationally symmetric and do not exert torque about the z axis defined by center points 2701 and 2703. Three different magnetization configurations are considered. Line 3304 corresponds to the quad-pole configuration of FIGS. 30A and 30B. Line 3305 corresponds to the annulus design configuration of FIGS. 31A and 31B. Line 3306 corresponds to the triple-pole configuration of FIGS. 32A and 32B. As shown, the annulus design (line 3305) and triple-pole (line 3306) configurations provide a sharper peak in the torque and therefore a more salient clocking sensation for the user, as compared to the quad-pole configuration (line 3304). In addition, the triple-pole configuration provides a stronger peak torque and therefore a more salient clocking sensation than the annulus-design configuration. (The triple-pole configuration can also provide reduced flux leakage as compared to other configurations.) It should be understood that the numerical values in FIG. 33 are illustrative, and that torque in a particular embodiment may depend on a variety of other factors in addition to the magnetization configuration, such as the magnet volume, aspect ratio, and distance y0 from the center of the annular alignment component.

Figure 34:
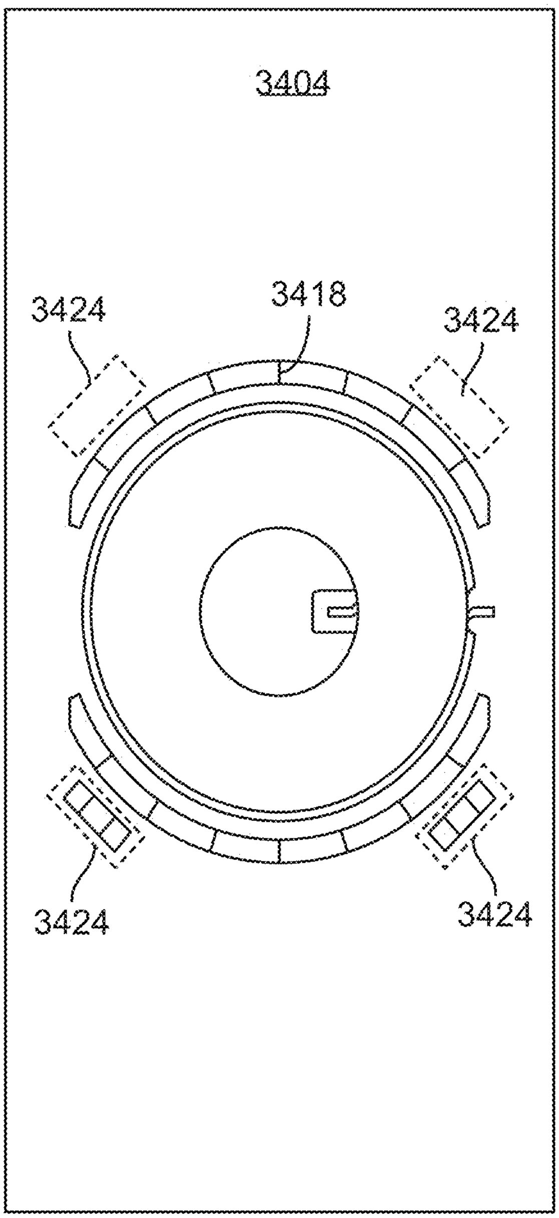
FIG. 34 shows a portable electronic device having an alignment system with multiple rotational alignment components according to some embodiments.

In the example shown in FIG. 27, a single rotational alignment component is placed outboard of the annular alignment component at a distance $y_0$ from the center of the annular alignment component. This arrangement allows a single magnetic element to generate torque that produces a salient clocking sensation for a user aligning devices. In some embodiments, other arrangements are also possible. For example, FIG. 34 shows a portable electronic device 3404 having an alignment system 3400 with multiple rotational alignment components according to some embodiments. In this example, alignment system 3400 includes an annular alignment component 3418 and a set of rotational alignment components 3424 positioned at various locations around the perimeter of annular alignment component 3418. In this example, there are four rotational alignment components 3424 positioned at angular intervals of approximately 90 degrees. In other embodiments, different numbers and spacing of rotational alignment components can be used. Each rotational alignment component 3424 can have any of the magnetization configurations described above, including z-pole, quad-pole, triple-pole, or annulus-design configurations, or a different configuration. Further, different rotational alignment components 3424 can have different magnetization configurations from each other. It should be noted that rotational alignment components 3424 can be placed close to the perimeter of annular alignment component 3418, and the larger number of magnetic components can provide sufficient torque with a shorter lever arm. Complementary rotational alignment components can be disposed around the outer perimeter of any type of annular alignment component (e.g., primary alignment components, secondary alignment components, or annular alignment components as described herein).

It will be appreciated that the foregoing examples of rotational alignment components are illustrative and that variations or modifications are possible. In some embodiments, a rotational alignment component can be provided as an optional adjunct to an annular alignment component, and a device that has both an annular alignment component and a rotational alignment component can align laterally to any other device that has a complementary annular alignment component, regardless of whether the other device has or does not have a rotational alignment component. Thus, for example, portable electronic device 2704 of FIG. 27 can align rotationally to accessory 2702 (which has both annular alignment component 2716 and rotational alignment component 2722) as well as aligning laterally to another accessory (such as wireless charger device 2000 of FIG. 20) that has annular alignment component 2716 but not rotational alignment component 2722. In the latter case, lateral alignment can be achieved, e.g., to support efficient wireless charging, but there may be no preferred rotational alignment, or rotational alignment may be achieved using a nonmagnetic feature (e.g., a mechanical retention feature such as a ledge, a clip, a notch, or the like). A rotational magnetic alignment component can be used together with any type of annular magnetic alignment component (e.g., primary annular magnetic alignment components, secondary annular magnetic alignment components, or auxiliary annular magnetic alignment components as described below).

In some embodiments, a magnetic alignment system can align more than two devices. Examples of magnetic alignment systems with three annular alignment components (referred to as primary, secondary, and auxiliary annular magnetic alignment components) will now be described. It should be understood that the primary and secondary annular magnetic alignment components described in this section can be identical to primary and secondary annular magnetic alignment components described above and that a given pair primary and secondary annular magnetic alignment components can be used with or without an auxiliary annular magnetic alignment component. It should also be understood that a system where alignment is desired may include more than three devices and that additional auxiliary annular alignment components can be provided to facilitate alignment of more than three devices.

Figure 35:
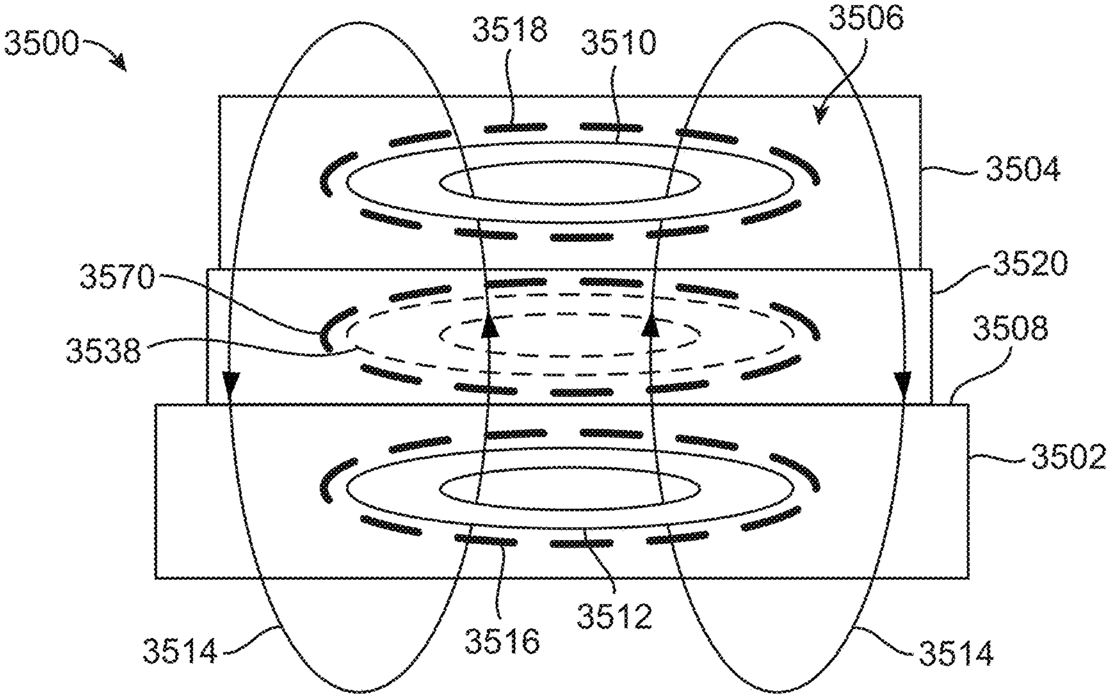
FIG. 35 shows a simplified representation of a wireless charging system incorporating a magnetic alignment system according to some embodiments.

FIG. 35 shows a simplified representation of a wireless charging system 3500 incorporating a three-component magnetic alignment system 3506 according to some embodiments. Wireless charging system 3500 includes a portable electronic device 3504, a wireless charger device 3502, and an accessory 3520 positioned between portable electronic device 3504 and wireless charger device 3502. Portable electronic device 3504 can be a consumer electronic device, such as a smart phone, tablet, wearable device, or the like, or any other electronic device for which wireless charging is desired. Wireless charger device 3502 can be any device that is configured to generate time-varying magnetic flux to induce a current in a suitably configured receiving device. For instance, wireless charger device 3502 can be a wireless charging mat, puck, docking station, or the like. Wireless charger device 3502 can include or have access to a power source such as battery power or standard AC power.

To enable wireless power transfer, portable electronic device 3504 and wireless charger device 3502 can include inductive coils 3510 and 3512, respectively, which can operate to transfer power between them. For example, inductive coil 3512 can be a transmitter coil that generates a time-varying magnetic flux 3514, and inductive coil 3510 can be a receiver coil in which an electric current is induced in response to time-varying magnetic flux 3514. The received electric current can be used to charge a battery of portable electronic device 3504, to provide operating power to a component of portable electronic device 3504, and/or for other purposes as desired. In some embodiments, wireless power transfer between wireless charger device 3502 and portable electronic device 3504 can occur regardless of whether accessory 3520 is present.

Accessory 3520 can be an accessory that is used with portable electronic device 3504 to protect, enhance, and/or supplement the aesthetics and/or functions of portable electronic device 3504. For example, accessory 3520 can be a protective case, an external battery pack, a camera attachment, or any other charge-through accessory. In some embodiments, accessory 3520 can include one or more wireless charging coils 3538. For example, accessory 3520 can be a portable external battery pack that can be attached to and carried together with portable electronic device 3504. In some embodiments, accessory 3520 can operate wireless charging coil 3538 as a receiver coil to charge its onboard battery (e.g., from wireless charger device 3502) or as a transmitter coil to provide power to portable electronic device 3504. In some embodiments, accessory 3520 cam include separate transmitter and receiver coils 3538. Accessory 3520 can operate coil(s) 3538 to transmit power or to receive and store power depending on current conditions. In still other embodiments, accessory 3520 can be an "unpowered" or "passive" accessory such as a case that contains no active circuitry, and wireless charging coil 3538 can be omitted. In such cases, accessory 3520 can be designed not to inhibit wireless power transfer between wireless charger device 3502 and portable electronic device 3504. For instance, relevant portions of accessory 3520 can be made of a material such as plastic, leather, or other material that is transparent to time-varying magnetic flux 3514.

To enable efficient wireless power transfer, it is desirable to align inductive coils 3512 and 3510 (and coil 3538 in embodiments where coil 3538 is present). According to some embodiments, magnetic alignment system 3506 can provide such alignment. In the example shown in FIG. 35, magnetic alignment system 3506 includes a primary magnetic alignment component 3516 disposed within or on a surface of wireless charger device 3502, a secondary magnetic alignment component 3518 disposed within or on a surface of portable electronic device 3504, and an auxiliary magnetic alignment component 3570 disposed within or on a surface of accessory 3520. Primary, secondary, and auxiliary magnetic alignment components 3516, 3518, and 3570 are configured to magnetically attract one another into an aligned position in which inductive coils 3510 and 3512 (and/or 3538 if present) are aligned with one another to provide efficient wireless power transfer.

Magnetic alignment system 3506 can enable modularity in that various types of accessories 3520 can align with primary and/or secondary magnetic alignment components 3516, 3518, provided that accessory 3520 includes auxiliary alignment component 3570. For instance, in some embodiments (e.g., where accessory 3520 is a protective case), accessory 3520 can mechanically couple to portable electronic device 3504 in a fixed position such that auxiliary magnetic alignment component 3570 is aligned with secondary magnetic alignment component 3518, and portable electronic device 3504 can rely wholly or partially on auxiliary magnetic alignment component 3570 to align with primary alignment component 3518 of wireless charger device 3502. Accordingly, when accessory 3520 is positioned on charging surface 3508 of wireless charger device 3502 such that primary alignment component 3516 is aligned with auxiliary alignment component 3570, secondary alignment component 3518 of portable electronic device 3504 is also aligned with primary alignment component 3570, and efficient wireless power transfer is supported.

As another example, in some embodiments where accessory 3520 is an external battery, auxiliary alignment component 3570 can attract to and align with secondary alignment component 3518 so that power from an internal power source (not shown) within accessory 3520 can be wirelessly transferred to portable electronic device 3504 using inductive coil 3538 and inductive coil 3510. The modularity of magnetic alignment system 3506 can also enable wireless charger device 3502 to stack with portable electronic device 3504 and accessory 3520. For example, auxiliary alignment component 3570 can attract and align to secondary alignment component 3518 and at the same time can attract and align to primary alignment component 3516. Accordingly, when portable electronic device 3504, accessory 3520, and wireless charger device 3502 are all stacked together, power can be transmitted wirelessly from wireless charger device 3502 to accessory 3520 (e.g., to charge an internal battery of accessory 3520) and from accessory 3520 to portable electronic device 3504. Both power transfers can be performed simultaneously; i.e., wireless charger device 3502 can provide power to accessory 3520 at the same time that accessory 3520 provides power to portable electronic device 3504. In some embodiments, to enable simultaneous power transfers, accessory 3520 can include two inductive coils 3538, one for receiving power and one for transmitting power. In other embodiments, the power transfers can be performed sequentially; e.g., wireless charger device 3502 can provide power to accessory 3520, and at a time when wireless charger device 3502 is not providing power, accessory 3520 can provide power to portable electronic device 3504.

FIG. 35 is illustrative and not limiting. For example, while FIG. 35 shows three devices stacked together, it should be understood that the same principles can be applied to form systems of four or more devices. For instance, a wireless charging system can include a portable electronic device coupled to a protective case that is attached to and magnetically aligned with an external battery, which is attached to and magnetically aligned to a wireless charger device. All the inductive coils within the respective devices can be aligned together, and wireless power can be transmitted between the wireless charger device and the external battery, between the battery and the portable electronic device, and/or between the wireless charger device and the portable electronic device. It is to be appreciated that any number of devices can be stacked together without departing from the spirit and scope of the present disclosure.

According to embodiments described herein, an alignment component (including a primary, secondary, or auxiliary alignment component) of a magnetic alignment system can be formed of arcuate magnets arranged in an annular configuration. In some embodiments, each magnet can have its magnetic polarity oriented in a desired direction so that magnetic attraction between the primary, secondary, and auxiliary alignment components provides a desired alignment. In some embodiments, an arcuate magnet can include a first magnetic region with magnetic polarity oriented in a first direction and a second magnetic region with magnetic polarity oriented in a second direction different from the first direction. As will be described, different configurations can provide different degrees of magnetic field leakage.

Figure 36A:
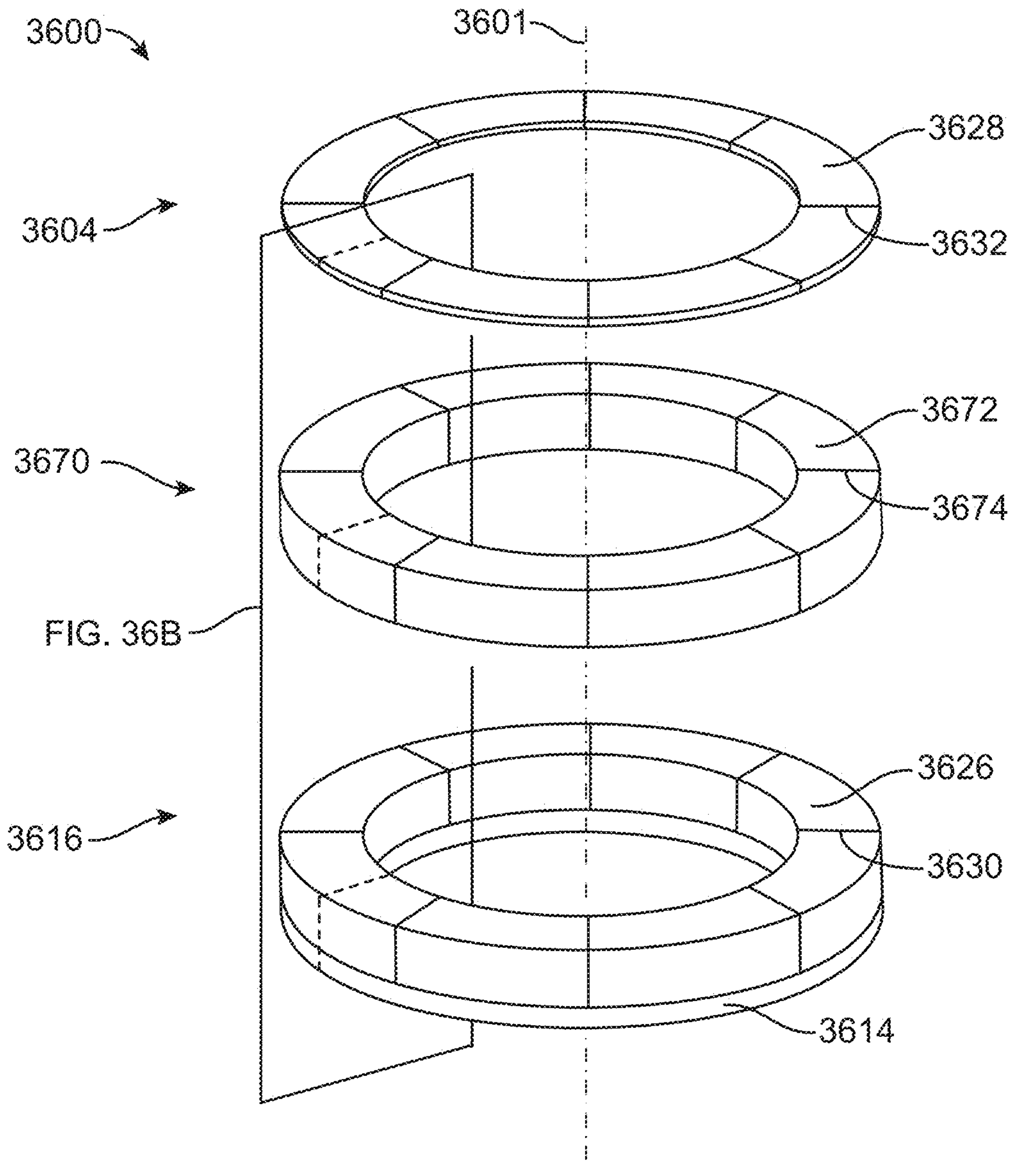
FIG. 36A shows a perspective view of a magnetic alignment system according to some embodiments.
Figure 36B:
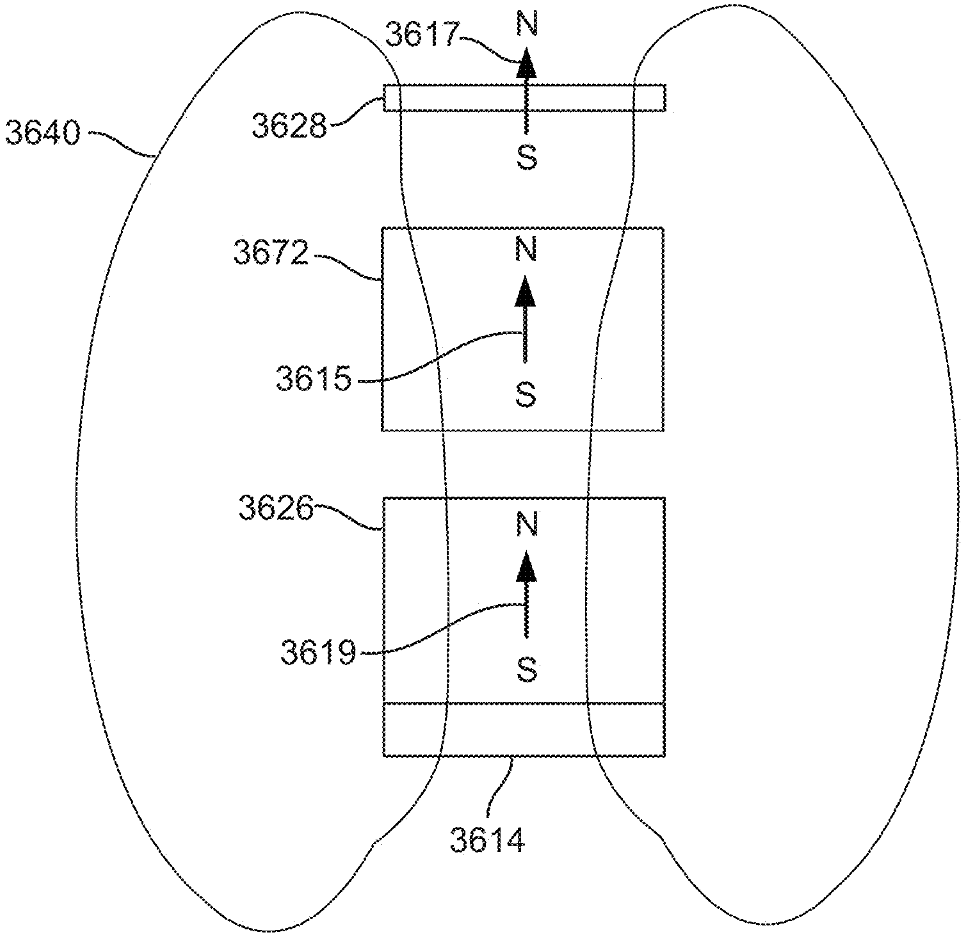
FIG. 36B shows a cross-section through the magnetic alignment system of FIG. 36A.

FIG. 36A shows a perspective view of a magnetic alignment system 3600 according to some embodiments, and FIG. 36B shows a cross-section through magnetic alignment system 3600 across the cut plane indicated in FIG. 36A. Magnetic alignment system 3600 can be an implementation of magnetic alignment system 3506 of FIG. 35. In magnetic alignment system 3600, the alignment components all have magnetic polarity oriented in the same direction (along the axis of the annular configuration).

As shown in FIG. 36A, magnetic alignment system 3600 can include a primary alignment component 3616 (which can be an implementation of primary alignment component 3516 of FIG. 35), a secondary alignment component 3618 (which can be an implementation of secondary alignment component 3518 of FIG. 35), and an auxiliary alignment component 3670 (which can be an implementation of auxiliary alignment component 3570 described above). Primary alignment component 3616 and secondary alignment component 3618 have annular shapes and may also be referred to as "annular" alignment components. The particular dimensions can be chosen as desired. In some embodiments, primary alignment component 3616 and secondary alignment component 3618 can each have an outer diameter of about 47 mm and a radial width of about 6 mm. The outer diameters and radial widths of primary alignment component 3616 and secondary alignment component 3618 need not be exactly equal. For instance, the radial width of secondary alignment component 3618 can be slightly less than the radial width of primary alignment component 3616 and/or the outer diameter of secondary alignment component 3618 can also be slightly less than the radial width of primary alignment component 3616 so that, when in alignment, the inner and outer sides of primary alignment component 3616 extend beyond the corresponding inner and outer sides of secondary alignment component 3618. Thicknesses (or axial dimensions) of primary alignment component 3616 and secondary alignment component 3618 can also be chosen as desired. In some embodiments, primary alignment component 3616 has a thickness of about 1.5 mm while secondary alignment component 3618 has a thickness of about 0.37 mm.

Primary alignment component 3616 can include a number of sectors, each of which can be formed of one or more primary arcuate magnets 3626. Secondary alignment component 3618 can include a number of sectors, each of which can be formed of one or more secondary arcuate magnets 3628. Auxiliary alignment component 3570 can include a number of sectors, each of which can be formed of one or more auxiliary arcuate magnets 3672. In the example shown, the number of primary magnets 3626 is equal to the number of secondary magnets 3628 and to the number of auxiliary magnets 3670, and each sector includes exactly one magnet, but this is not required. Primary magnets 3626, secondary magnets 3628, and auxiliary magnets 3672 can have arcuate (or curved) shapes in the transverse plane such that when primary magnets 3626 (or secondary magnets 3628 or auxiliary magnets 3672) are positioned adjacent to one another end-to-end, primary magnets 3626 (or secondary magnets 3628 or auxiliary magnets 3672) form an annular structure as shown. In some embodiments, primary magnets 3626 can be in contact with each other at interfaces 3630, secondary magnets 3628 can be in contact with each other at interfaces 3632, and auxiliary magnets 3672 can be in contact with each other at interfaces 3674. Alternatively, small gaps or spaces may separate adjacent primary magnets 3626 or adjacent secondary magnets 3628 or adjacent auxiliary magnets 3672, providing a greater degree of tolerance during manufacturing.

In some embodiments, primary alignment component 3616 can also include an annular shield 3614 disposed on a distal surface of primary magnets 3626. In some embodiments, shield 3614 can be formed as a single annular piece of material and adhered to primary magnets 3626 to secure primary magnets 3626 into position. Shield 3614 can be formed of a material that has high magnetic permeability, such as stainless steel, and can redirect magnetic fields to prevent them from propagating beyond the distal side of primary alignment component 3616, thereby protecting sensitive electronic components located beyond the distal side of primary alignment component 3616 from magnetic interference.

Primary magnets 3626, secondary magnets 3628, and auxiliary magnets 3672 can be made of a magnetic material such as an NdFeB material, other rare earth magnetic materials, or other materials that can be magnetized to create a persistent magnetic field. Each primary magnet 3626, each secondary magnet 3628, and each auxiliary magnet 3672 can have a monolithic structure having a single magnetic region with a magnetic polarity aligned in the axial direction as shown by magnetic polarity indicators 3615, 3617, 3619 in FIG. 36B. For example, each primary magnet 3626, each secondary magnet 3628, and each auxiliary magnet 3672 can be a bar magnet that has been ground and shaped into an arcuate structure having an axial magnetic orientation. In the example shown, primary magnet 3626 has its north pole oriented toward the proximal surface and south pole oriented toward the distal surface, secondary magnet 3628 has its south pole oriented toward the proximal surface and north pole oriented toward the distal surface, and auxiliary magnet 3672 has a corresponding magnetic orientation such that the north pole of auxiliary magnet 3672 is oriented toward the proximal surface of secondary magnet 3628 and the south pole of auxiliary magnet 3672 is oriented toward the proximal surface of primary magnet 3626. In other embodiments, the magnetic orientations can be reversed such that primary magnet 3626 has its south pole oriented toward the proximal surface and north pole oriented toward the distal surface while secondary magnet 3628 has its north pole oriented toward the proximal surface and south pole oriented toward the distal surface and auxiliary magnet 3672 has a corresponding magnetic orientation such that the south pole of auxiliary magnet 3672 is oriented toward the proximal surface of secondary magnet 3628 and the north pole of auxiliary magnet 3672 is oriented toward the proximal surface of primary magnet 3626.

As shown in FIG. 36B, the axial magnetic orientations of primary magnet 3626, auxiliary magnet 3672, and secondary magnet 3628 can generate magnetic fields 3640 that exert attractive forces between primary magnet 3626 and auxiliary magnet 3672 and between auxiliary magnet 3672 and secondary magnet 3628, thereby facilitating alignment between respective devices in which primary alignment component 3616, auxiliary alignment component 3670, and secondary alignment component 3618 are disposed (e.g., as shown in FIG. 35). While shield 3614 can redirect some of magnetic fields 3640 away from regions below primary magnet 3626, magnetic fields 3640 may still propagate to regions laterally adjacent to primary magnet 3626 and secondary magnet 3628. In some embodiments, the lateral propagation of magnetic fields 3640 may result in magnetic field leakage to other magnetically sensitive components. For instance, if an inductive coil having a ferromagnetic shield is placed in the interior (or inboard) region of annular primary alignment component 3616 (or secondary alignment component 3618), leakage of magnetic fields 3640 may saturate the ferrimagnetic shield, which can degrade wireless charging performance.

It will be appreciated that magnetic alignment system 3600 is illustrative and that variations and modifications are possible. For instance, while primary alignment component 3616, auxiliary alignment component 3670, and secondary alignment component 3618 are each shown as being constructed of eight arcuate magnets, other embodiments may use a different number of magnets, such as sixteen magnets, thirty-six magnets, or any other number of magnets, and the number of primary magnets need not be equal to the number of secondary magnets. Similarly, the number of auxiliary magnets need not be equal to either the number of primary magnets or the number of secondary magnets. In other embodiments, primary alignment component 3616 and/or secondary alignment component 3618 and/or auxiliary alignment component 3670 can each be formed of a single, monolithic annular magnet; however, segmenting alignment components 3616, 3618, and 3670 into arcuate magnets may improve manufacturing, as described above with reference to FIGS. 3A and 3B.

As noted above with reference to FIG. 36B, a magnetic alignment system with a single axial magnetic orientation may allow lateral leakage of magnetic fields, which may adversely affect performance of other components of an electronic device. Accordingly, some embodiments provide magnetic alignment systems with a closed-loop magnetic configuration that reduces magnetic field leakage. Examples will now be described.

Figure 37A:
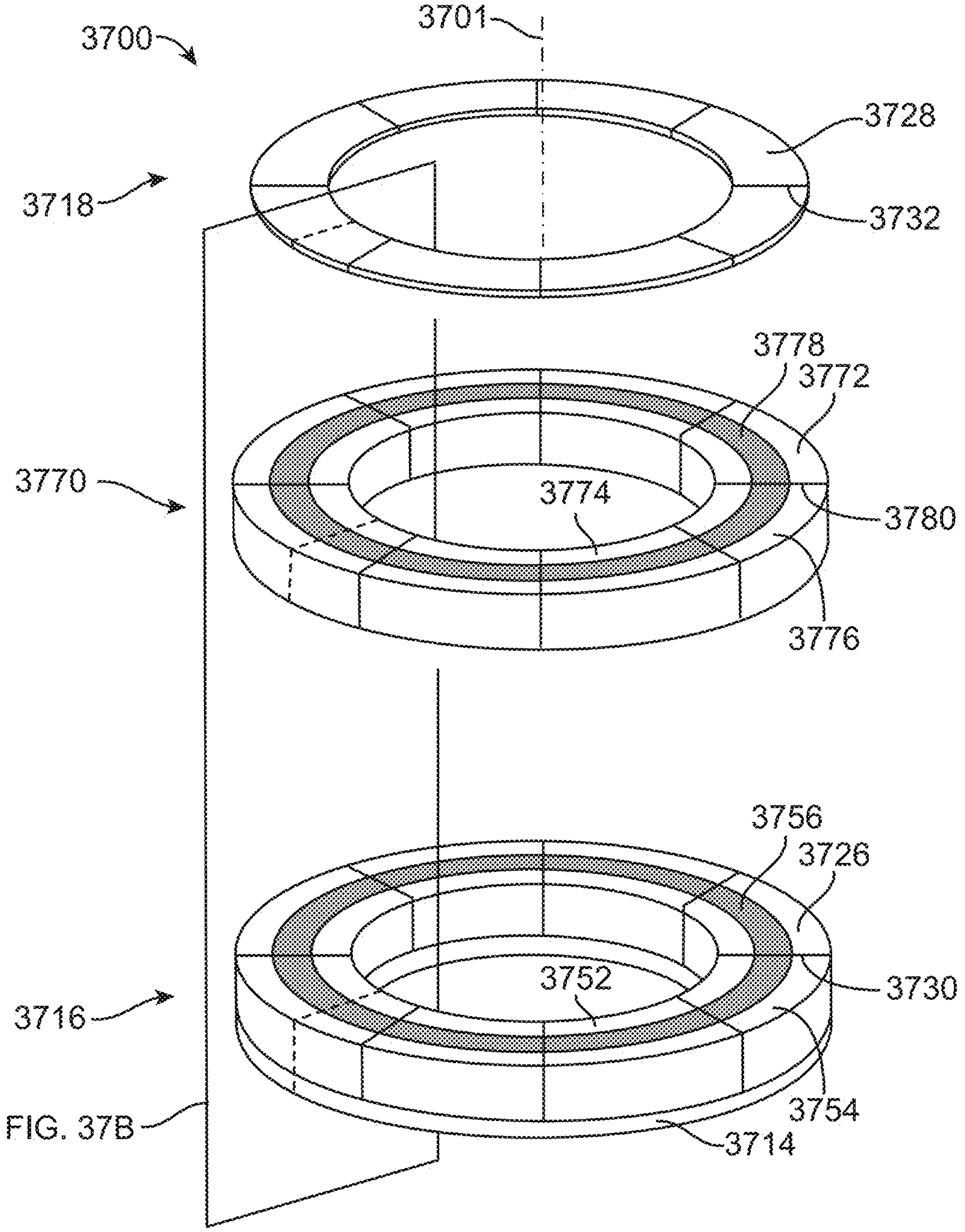
FIG. 37A shows a perspective view of a magnetic alignment system according to some embodiments.
Figure 37B:
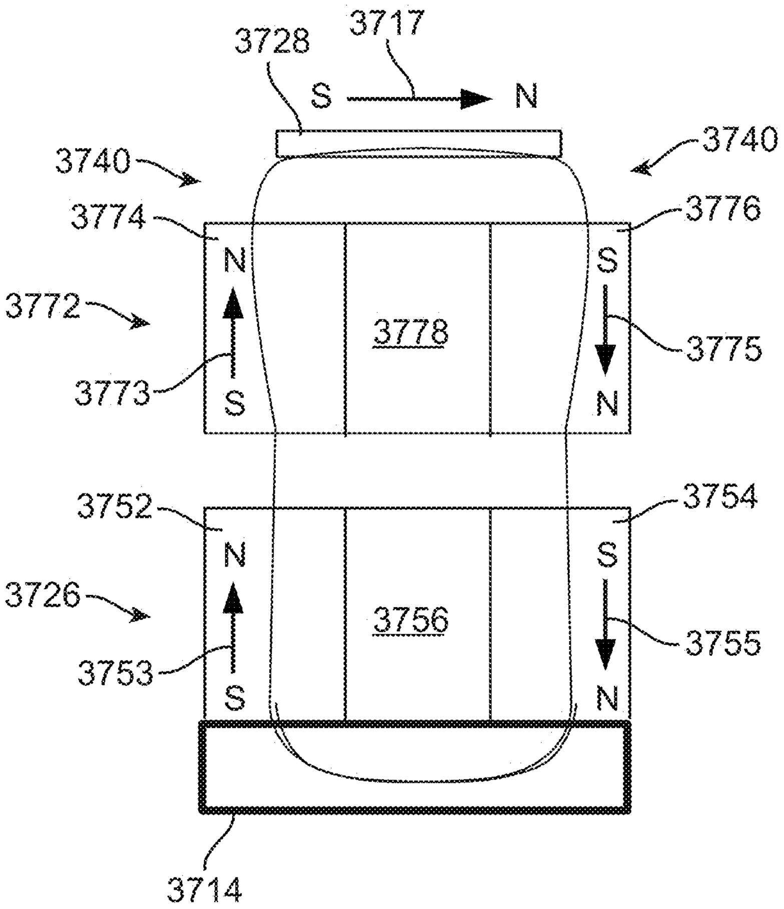
FIG. 37B shows a cross-section through the magnetic alignment system of FIG. 37A.

FIG. 37A shows a perspective view of a magnetic alignment system 3700 according to some embodiments, and FIG. 37B shows a cross-section through magnetic alignment system 3700 across the cut plane indicated in FIG. 37A. Magnetic alignment system 3700 can be an implementation of magnetic alignment system 3506 of FIG. 35. In magnetic alignment system 3700, the alignment components have magnetic components configured in a "closed loop" configuration as described below.

As shown in FIG. 37A, magnetic alignment system 3700 can include a primary alignment component 3716 (which can be an implementation of primary alignment component 3516 of FIG. 35), a secondary alignment component 3718 (which can be an implementation of secondary alignment component 3518 of FIG. 35), and an auxiliary alignment component 3770 (which can be an implementation of auxiliary alignment component 3570 of FIG. 35). Primary alignment component 3716 and secondary alignment component 3718 have annular shapes and may also be referred to as "annular" alignment components. The particular dimensions can be chosen as desired. In some embodiments, primary alignment component 3716 and secondary alignment component 3718 can each have an outer diameter of about 47 mm and a radial width of about 6 mm. The outer diameters and radial widths of primary alignment component 3716 and secondary alignment component 3718 need not be exactly equal. For instance, the radial width of secondary alignment component 3718 can be slightly less than the radial width of primary alignment component 3716 and/or the outer diameter of secondary alignment component 3718 can also be slightly less than the radial width of primary alignment component 3716 so that, when in alignment, the inner and outer sides of primary alignment component 3716 extend beyond the corresponding inner and outer sides of secondary alignment component 3718. Thicknesses (or axial dimensions) of primary alignment component 3716 and secondary alignment component 3718 can also be chosen as desired. In some embodiments, primary alignment component 3716 has a thickness of about 1.5 mm while secondary alignment component 3718 has a thickness of about 0.37 mm.

Primary alignment component 3716 can include a number of sectors, each of which can be formed of a number of primary magnets 3726; secondary alignment component 3718 can include a number of sectors, each of which can be formed of a number of secondary magnets 3728; and auxiliary alignment component 3770 can include a number of sectors, each of which can be formed of a number of auxiliary magnets 3772. In the example shown, the number of primary magnets 3726 is equal to the number of secondary magnets 3728 and to the number of auxiliary magnets 3772, and each sector includes one magnet, but this is not required. Primary magnets 3726, secondary magnets 3728, and auxiliary magnets 3772 can have arcuate (or curved) shapes in the transverse plane such that when primary magnets 3726 (or secondary magnets 3728 or auxiliary magnets 3772) are positioned adjacent to one another end-to-end, primary magnets 3726 (or secondary magnets 3728 or auxiliary magnets 3772) form an annular structure as shown. In some embodiments, adjacent primary magnets 3726 can be in contact with each other at interfaces 3730, adjacent secondary magnets 3728 can be in contact with each other at interfaces 3732, and adjacent auxiliary magnets 3772 can be in contact with each other at interfaces 3780. Alternatively, small gaps or spaces may separate adjacent primary magnets 3726, adjacent secondary magnets 3728, or adjacent auxiliary magnets 3772, providing a greater degree of tolerance during manufacturing.

In some embodiments, primary alignment component 3716 can also include an annular shield 3714 disposed on a distal surface of primary magnets 3726. In some embodiments, shield 3714 can be formed as a single annular piece of material and adhered to primary magnets 3726 to secure primary magnets 3726 into position. Shield 3714 can be formed of a material that has high magnetic permeability, such as stainless steel, and can redirect magnetic fields to prevent them from propagating beyond the distal side of primary alignment component 3716, thereby protecting sensitive electronic components located beyond the distal side of primary alignment component 3716 from magnetic interference. In some embodiments, auxiliary alignment component 3770 does not include a similar shield, so that a stronger magnetic attraction with primary alignment component 3716 can be provided.

Primary magnets 3726, secondary magnets 3728, and auxiliary magnets 3772 can be made of a magnetic material such as an NdFeB material, other rare earth magnetic materials, or other materials that can be magnetized to create a persistent magnetic field. Each secondary magnet 3728 can have a single magnetic region with a magnetic polarity having a component in the radial direction in the transverse plane (as shown by magnetic polarity indicator 3717 in FIG. 37B). As described below, the magnetic orientation can be in a radial direction with respect to axis 3701 or another direction having a radial component in the transverse plane. Each primary magnet 3726 can include two magnetic regions having opposite magnetic orientations. For example, each primary magnet 3726 can include an inner arcuate magnetic region 3752 having a magnetic orientation in a first axial direction (as shown by polarity indicator 3753 in FIG. 37B), an outer arcuate magnetic region 3754 having a magnetic orientation in a second axial direction opposite the first direction (as shown by polarity indicator 3755 in FIG. 37B), and a central non-magnetized region 3756 that does not have a magnetic orientation. Central non-magnetized region 3756 can magnetically separate inner arcuate region 3752 from outer arcuate region 3754 by inhibiting magnetic fields from directly crossing through center region 3756. Similarly, each auxiliary magnet 3772 can include two magnetic regions having opposite magnetic orientations. For example, each auxiliary magnet 3772 can include an inner arcuate magnetic region 3774 having a magnetic orientation in a first axial direction (as shown by polarity indicator 3773 in FIG. 37B), an outer arcuate magnetic region 3776 having a magnetic orientation in a second axial direction opposite the first direction (as shown by polarity indicator 3775 in FIG. 37B), and a central non-magnetized region 3778 that does not have a magnetic orientation. Central non-magnetized region 3778 can magnetically separate inner arcuate region 3774 from outer arcuate region 3776 by inhibiting magnetic fields from directly crossing through center region 3778.

In some embodiments, each secondary magnet 3726 can be made of a magnetic material that has been ground and shaped into an arcuate structure, and a magnetic orientation having a radial component in the transverse plane can be created, e.g., using a magnetizer. Similarly, each primary magnet 3726 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each primary magnet 3726 can be a compound structure with two arcuate pieces of magnetic material providing inner arcuate magnetic region 3752 and outer arcuate magnetic region 3754; in such embodiments, central non-magnetized region 3756 can be can be formed of an arcuate piece of nonmagnetic material or formed as an air gap defined by sidewalls of inner arcuate magnetic region 3752 and outer arcuate magnetic region 3754. Any manufacturing technique that can be used to form primary magnets 3726 can also be used to form auxiliary magnets 3772. Thus, each auxiliary magnet 3772 can be made of a single piece of magnetic material that has been ground and shaped into an arcuate structure, and a magnetizer can be applied to the arcuate structure to induce an axial magnetic orientation in one direction within an inner arcuate region of the structure and an axial magnetic orientation in the opposite direction within an outer arcuate region of the structure, while demagnetizing or avoiding creation of a magnetic orientation in the central region. In some alternative embodiments, each auxiliary magnet 3772 can be a compound structure with two arcuate pieces of magnetic material providing inner arcuate magnetic region 3774 and outer arcuate magnetic region 3776; in such embodiments, central non-magnetized region 3778 can be can be formed of an arcuate piece of nonmagnetic (or demagnetized) material or formed as an air gap defined by sidewalls of inner arcuate magnetic region 3774 and outer arcuate magnetic region 3776. It should be understood that in some embodiments one manufacturing technique can be used for primary magnets 3726 while a different manufacturing technique can be used for auxiliary magnets 3772; for example, each auxiliary magnet 3772 can be monolithic while each primary magnet 3726 is a compound structure. As long as the magnetic fields of the various magnets align as described, alignment between devices can be provided. Further, as described above with reference to FIGS. 3A and 3B, the inner and outer arcuate magnetic regions of a quad-pole primary or auxiliary arcuate magnet can but need not have equal magnetic field strength; asymmetric polarization as described above can be applied.

As shown in FIG. 37B, inner arcuate magnetic region 3752 of primary magnet 3726 and inner arcuate magnetic region 3774 of auxiliary magnet 3772 can have the same magnetic orientation, as shown by polarity indictors 3753 and 3773. Similarly, outer arcuate magnetic region 3754 of primary magnet 3726 and outer arcuate magnetic region 3776 of auxiliary magnet 3772 can have the same magnetic orientation, as shown by polarity indictors 3755 and 3775. This configuration creates a magnetic attraction between primary magnet 3726 and auxiliary magnet 3772, which can facilitate alignment between them. The magnetic polarity of secondary magnet 3728 (shown by indicator 3717) can be oriented such that when secondary magnetic alignment component 3718 is aligned with auxiliary magnetic alignment component 3770, the south pole of secondary magnet 3728 is oriented toward the north pole of inner arcuate magnetic region 3774 of auxiliary magnet 3772 (and also toward the north pole of inner arcuate magnetic region 3752 of primary magnet 3726) while the north pole of secondary magnet 3728 is oriented toward the south pole of outer arcuate magnetic region 3776 of auxiliary magnet 3772 (and also toward the south pole of outer arcuate magnetic region 3754 of primary magnet 3726).

Accordingly, the respective magnetic orientations of inner arcuate magnetic regions 3752, 3774, secondary magnet 3728 and outer arcuate magnetic region 3776, 3778 can generate magnetic fields 3740 that exert an attractive force between primary magnet 3726 and auxiliary magnet 3772 and between auxiliary magnet 3772 and secondary magnet 3728, thereby facilitating alignment between respective electronic devices in which primary alignment component 3716, auxiliary alignment component 3770, and secondary alignment component 3718 are disposed (e.g., as shown in FIG. 35). Shield 3714 at the distal surface of primary magnet 3726 can redirect some of magnetic fields 3740 away from regions below primary magnet 3726. Further, the "closed-loop" magnetic field 3740 formed around central non-magnetized regions 3756 and 3778 can have tight and compact field lines that do not stray outside of primary, auxiliary, and secondary magnets 3726, 3772, 3728 as far as magnetic field 3640 strays outside of primary, auxiliary, and secondary magnets 3626, 3672, 3628 in FIG. 36B. Thus, magnetically sensitive components can be placed relatively close to primary alignment component 3716 with reduced concern for stray magnetic fields. Accordingly, as compared to magnetic alignment system 3600, magnetic alignment system 3700 can help to reduce the overall size of a device in which primary alignment component 3716 is positioned and can also help reduce noise created by magnetic field 3740 in adjacent components, such as an inductive receiving coil positioned inboard of secondary alignment component 3718.

It will be appreciated that magnetic alignment system 3700 is illustrative and that variations and modifications are possible. For instance, while primary alignment component 3716, auxiliary alignment component 3772, and secondary alignment component 3718 are each shown as being constructed of eight arcuate magnets, other embodiments may use a different number of magnets, such as sixteen magnets, thirty-six magnets, or any other number of magnets, and the number of primary magnets need not be equal to the number of secondary magnets. Similarly, the number of auxiliary magnets need not be equal to either the number of primary magnets or the number of secondary magnets. In other embodiments, secondary alignment component 3718 can be formed of a single, monolithic annular magnet. Similarly, primary alignment component 3716 and/or auxiliary alignment component 3772 can each be formed of a single, monolithic annular piece of magnetic material with an appropriate magnetization pattern as described above, or primary alignment component 3716 and/or auxiliary alignment component 3772 can each be formed of a monolithic inner annular magnet and a monolithic outer annular magnet, with an annular air gap or region of nonmagnetic material disposed between the inner annular magnet and outer annular magnet. However, a construction using multiple arcuate magnets may improve manufacturing because smaller arcuate magnets are less brittle than a single, monolithic annular magnet and are less prone to yield loss due to physical stresses imposed on the magnetic material during manufacturing. It should also be understood that the magnetic orientations of the various components or individual magnets do not need to align exactly with the lateral and axial directions. The magnetic orientation can have any angle that provides a closed-loop path for a magnetic field through the primary and secondary alignment components.

In embodiments described above, it is assumed (though not required) that the magnetic alignment components are fixed in position relative to the device enclosure and do not move in the axial or lateral direction. This provides a fixed magnetic flux. In some embodiments, it may be desirable for one or more of the magnetic alignment components to move in the axial direction. For example, in various embodiments of the present invention, it can be desirable to limit the magnetic flux provided by these magnetic structures. Limiting the magnetic flux can help to prevent the demagnetization of various charge and payment cards that a user might be carrying with an electronic device that incorporates one of these magnetic structures. But in some circumstances, it can be desirable to increase this magnetic flux in order to increase a magnetic attraction between an electronic device and an accessory or a second electronic device. Also, it can be desirable for one or more of the magnetic alignment components to move laterally. For example, an electronic device and an attachment structure or wireless device can be offset from each other in a lateral direction. The ability of a magnetic alignment component to move laterally can compensate for this offset and improve coupling between devices, particularly where a coil moves with the magnetic alignment component. Accordingly, embodiments of the present invention can provide structures where some or all of the magnets in these magnetic structures are able to change positions or otherwise move. Examples of magnetic structures having moving magnets are shown in the following figures.

Figure 38A:
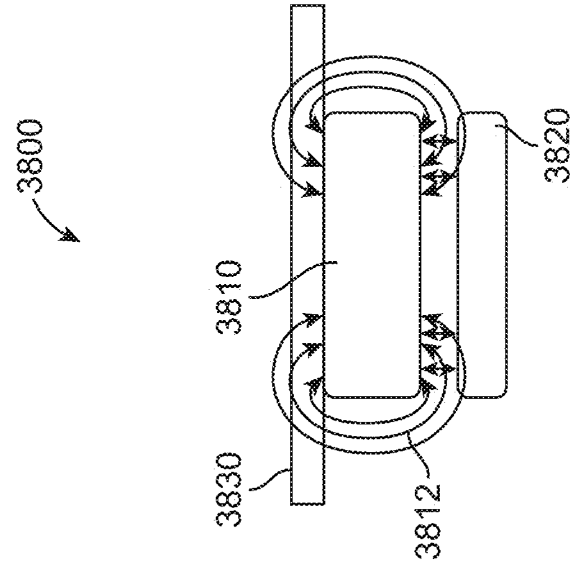
FIGS. 38A through 38C illustrate moving magnets according to an embodiment of the present invention.
Figure 38B:
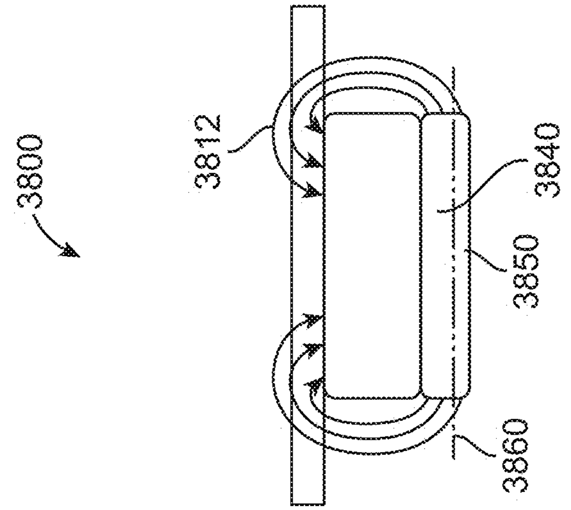
Figure 38C:
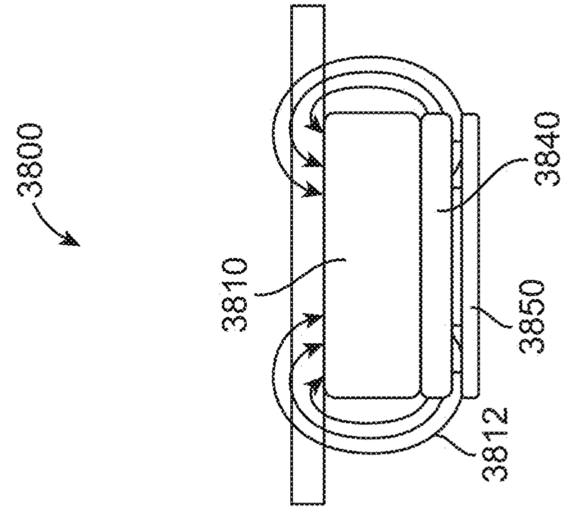

FIGS. 38A through 38C illustrate examples of moving magnets according to an embodiment of the present invention. In this example, first electronic device 3800 can be gaming accessory 100 or any of the other gaming accessories shown above, a wireless charging device, or other device having a magnet 3810 (which can be, e.g., any of the annular or other magnetic alignment components described herein.) In FIG. 38A, moving magnet 3810 can be housed in a first electronic device 3800. First electronic device 3800 can include device enclosure 3830, magnet 3810, and shield 3820. Magnet 3810 can be in a first position (not shown) adjacent to nonmoving shield 3820. In this position, magnet 3810 can be separated from device enclosure 3830. As a result, the magnetic flux 3812 at a surface of device enclosure 3830 can be relatively low, thereby protecting magnetic devices and magnetically stored information, such as information stored on payment cards. As magnet 3810 in first electronic device 3800 is attracted to a second magnet (not shown) in a second electronic device (not shown), magnet 3810 can move, for example it can move away from shield 3820 to be adjacent to device enclosure 3830, as shown. With magnet 3810 at this location, magnetic flux 3812 at surface of device enclosure 3830 can be relatively high. This increase in magnetic flux 3812 can help to attract the second electronic device to first electronic device 3800.

With this configuration, it can take a large amount of magnetic attraction for magnet 3810 to separate from shield 3820. Accordingly, these and other embodiments of the present invention can include a shield that is split into a shield portion and a return plate portion. For example, in FIG. 38B, line 3860 can be used to indicate a split of shield 3820 into a shield 3840 and return plate 3850.

In FIG. 38C, moving magnet 3810 can be housed in first electronic device 3800. First electronic device 3800 can include device enclosure 3830, magnet 3810, shield 3840, and return plate 3850. In the absence of a magnetic attraction, magnet 3810 can be in a first position (not shown) such that shield 3840 can be adjacent to return plate 3850. Again, in this configuration, magnetic flux 3812 at a surface of device enclosure 3830 can be relatively low. As magnet 3810 and first electronic device is attracted to a second magnet (not shown) in a second electronic device (not shown), magnet 3810 can move, for example it can move away from return plate 3850 to be adjacent to device enclosure 3830, as shown. In this configuration, shield 3840 can separate from return plate 3850 and the magnetic flux 3812 at a surface of device enclosure 3830 can be increased. As before, this increase in magnetic flux 3812 can help to attract the second electronic device to the first electronic device 3800.

In these and other embodiments of the present invention, various housings and structures can be used to guide a moving magnet. Also, various surfaces can be used in conjunction with these moving magnets. These surfaces can be rigid. Alternatively, these surfaces can be compliant and at least somewhat flexible. Examples are shown in the following figures.

Figure 39B:
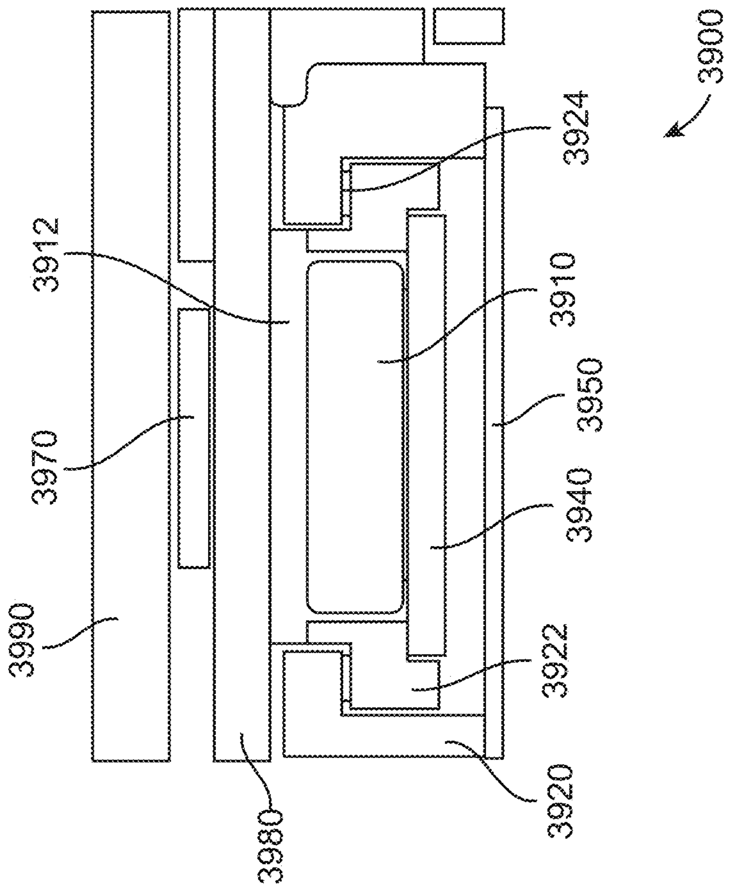
FIGS. 39A and 39B illustrate a moving magnetic structure according to an embodiment of the present invention.
Figure 39A:
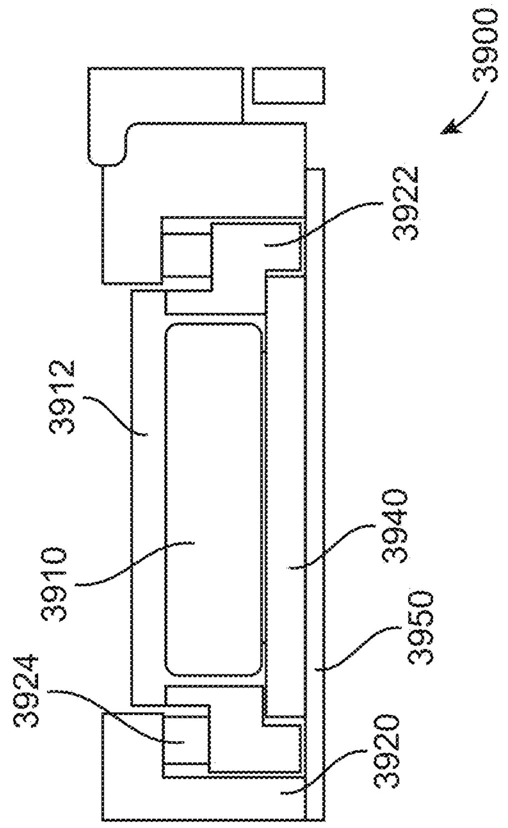

FIGS. 39A and 39B illustrate a moving magnetic structure according to an embodiment of the present invention In this example, first electronic device 3900 can be gaming accessory 100 or any of the other gaming accessories shown above, a wireless charging device, or other device having a magnet 3910 (which can be, e.g., any of the annular or other magnetic alignment components described herein.) FIG. 39A illustrates a moving first magnet 3910 in a first electronic device 3900. First electronic device 3900 can include first magnet 3910, protective surface 3912, housings 3920 and 3922, compliant structure 3924, shield 3940, and return plate 3950. In this figure, first magnet 3910 is not attracted to a second magnet (not shown), and therefore shield 3940 is magnetically attracted to or attached to return plate 3950. In this position, compliant structure 3924 can be expanded or relaxed. Compliant structure 3924 can be formed of an elastomer, silicon rubber open cell foam, silicon rubber, polyurethane foam, or other foam or other compressible material.

In FIG. 39B, second electronic device 3960 has been brought into proximity of first electronic device 3900. Second magnet 3970 can attract first magnet 3910, thereby causing shield 3940 and return plate 3950 to separate from each other. Housings 3920 and 3922 can compress compliant structure 3924, thereby allowing protective surface 3912 of first electronic device 3900 to move towards or adjacent to housing 3980 of second electronic device 3960. Second magnet 3970 can be held in place in second electronic device 3960 by housing 3990 or other structure. As second electronic device 3960 is removed from first electronic device 3900, first magnet 3910 and shield 3940 can be magnetically attracted to return plate 3950, as shown in FIG. 39A.

Figure 40B:
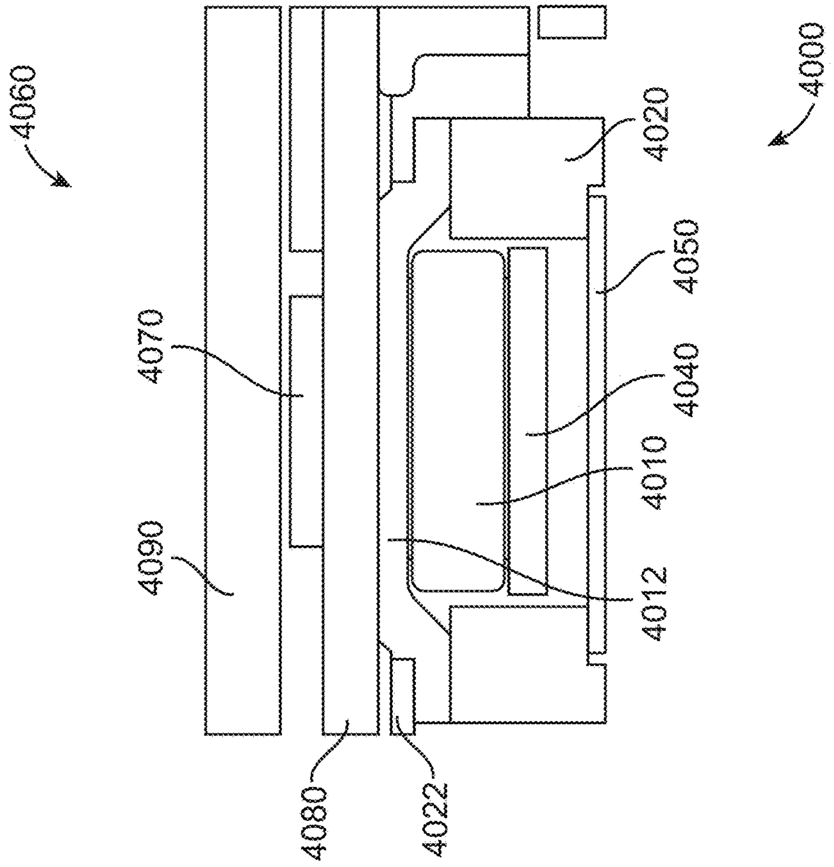
FIGS. 40A and 40B illustrate a moving magnetic structure according to an embodiment of the present invention.
Figure 40A:
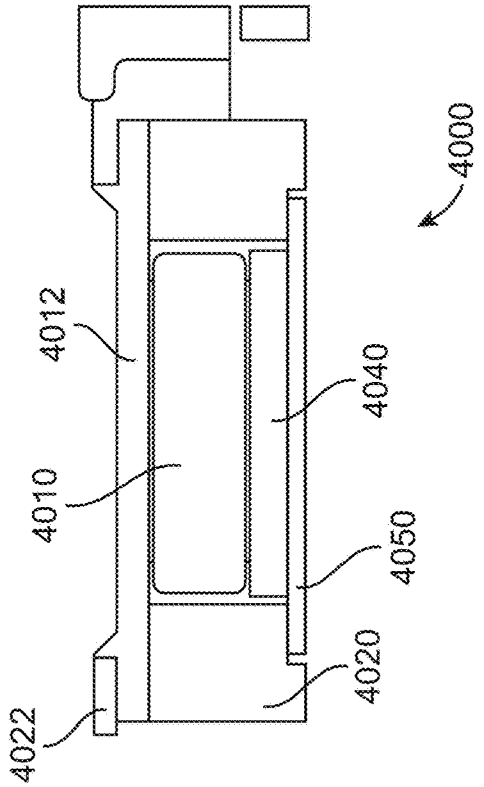

FIGS. 40A and 40B illustrate moving magnetic structures according to an embodiment of the present invention. In this example, first electronic device 4000 can be gaming accessory 100 or any of the other gaming accessories shown above, a wireless charging device, or other device having a magnet 4010 (which can be, e.g., any of the annular or other magnetic alignment components described herein.) FIG. 40A illustrates a moving first magnet 4010 in a first electronic device 4000. First electronic device 4000 can include first magnet 4010, pliable surface 4012, housing portions 4020 and 4022, shield 4040, and return plate 4050. In this figure, first magnet 4010 is not attracted to a second magnet, and therefore shield 4040 is magnetically attached or attracted to return plate 4050. In this position, pliable surface 4012 can be relaxed. Pliable surface 4012 can be formed of an elastomer, silicon rubber open cell foam, silicon rubber, polyurethane foam, or other foam or other compressible material.

In FIG. 40B, second electronic device 4060 has been brought into the proximity of first electronic device 4000. Second magnet 4070 can attract first magnet 4010, thereby causing shield 4040 and return plate 4050 to separate from each other. First magnet 4010 can stretch pliable surface 4012 towards second electronic device 4060, thereby allowing first magnet 4010 of first electronic device 4000 to move towards housing 4080 of second electronic device 4060. Second magnet 4070 can be held in place in second electronic device 4060 by housing 4090 or other structure. As second electronic device 4060 is removed from first electronic device 4000, first magnet 4010 and shield 4040 can be magnetically attracted to return plate 4050 as shown in FIG. 40A.

Figure 41:
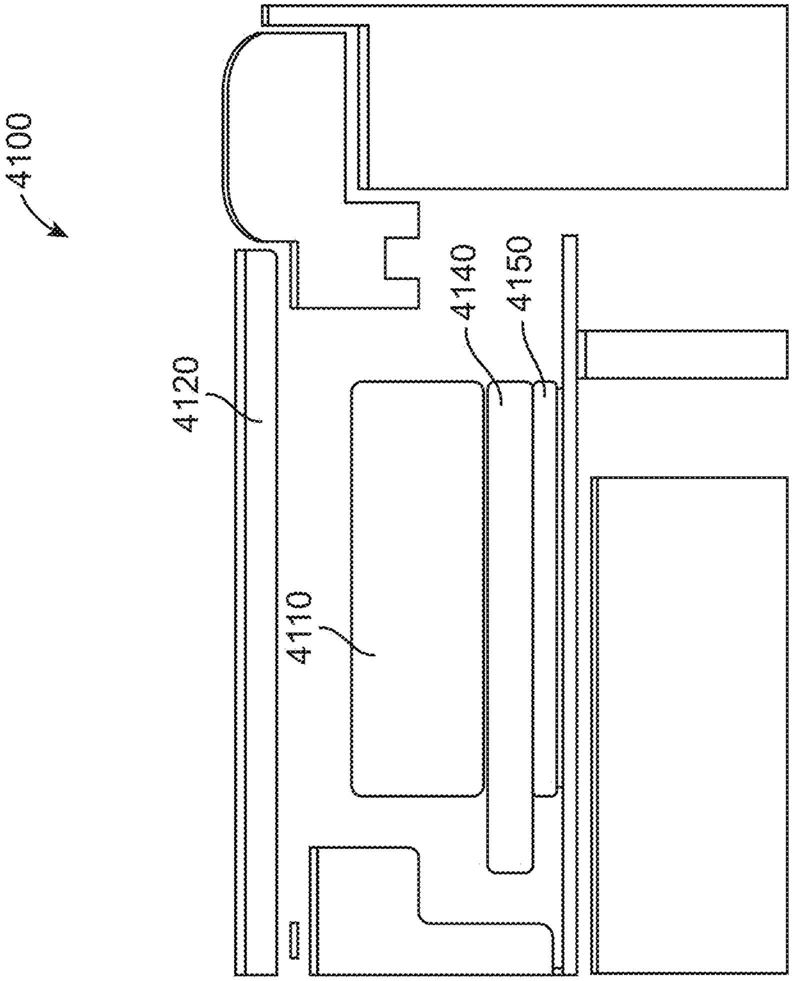
FIGS. 41 through FIG. 43 illustrate a moving magnetic structure according to an embodiment of the present invention.
Figure 42:
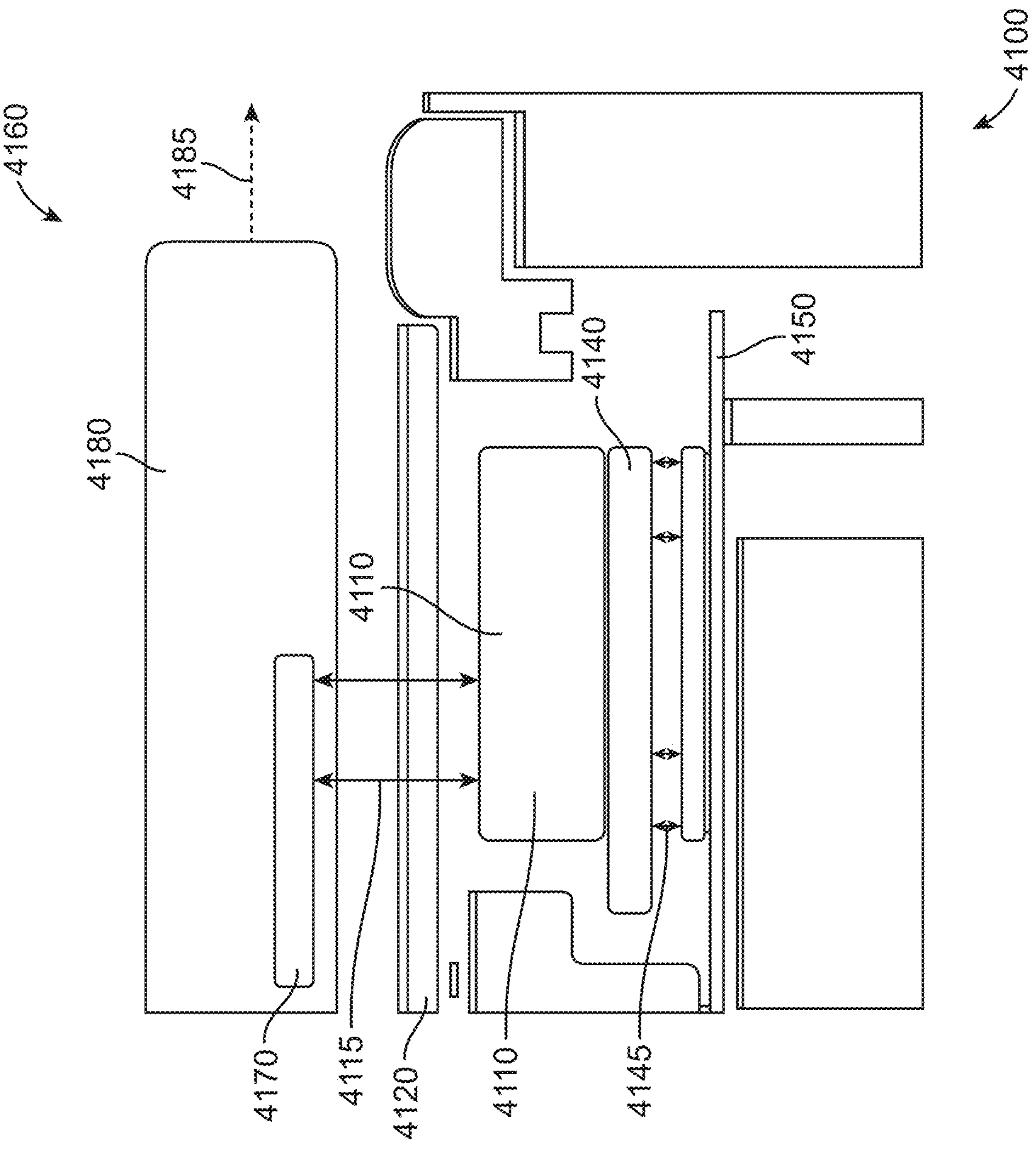
Figure 43:
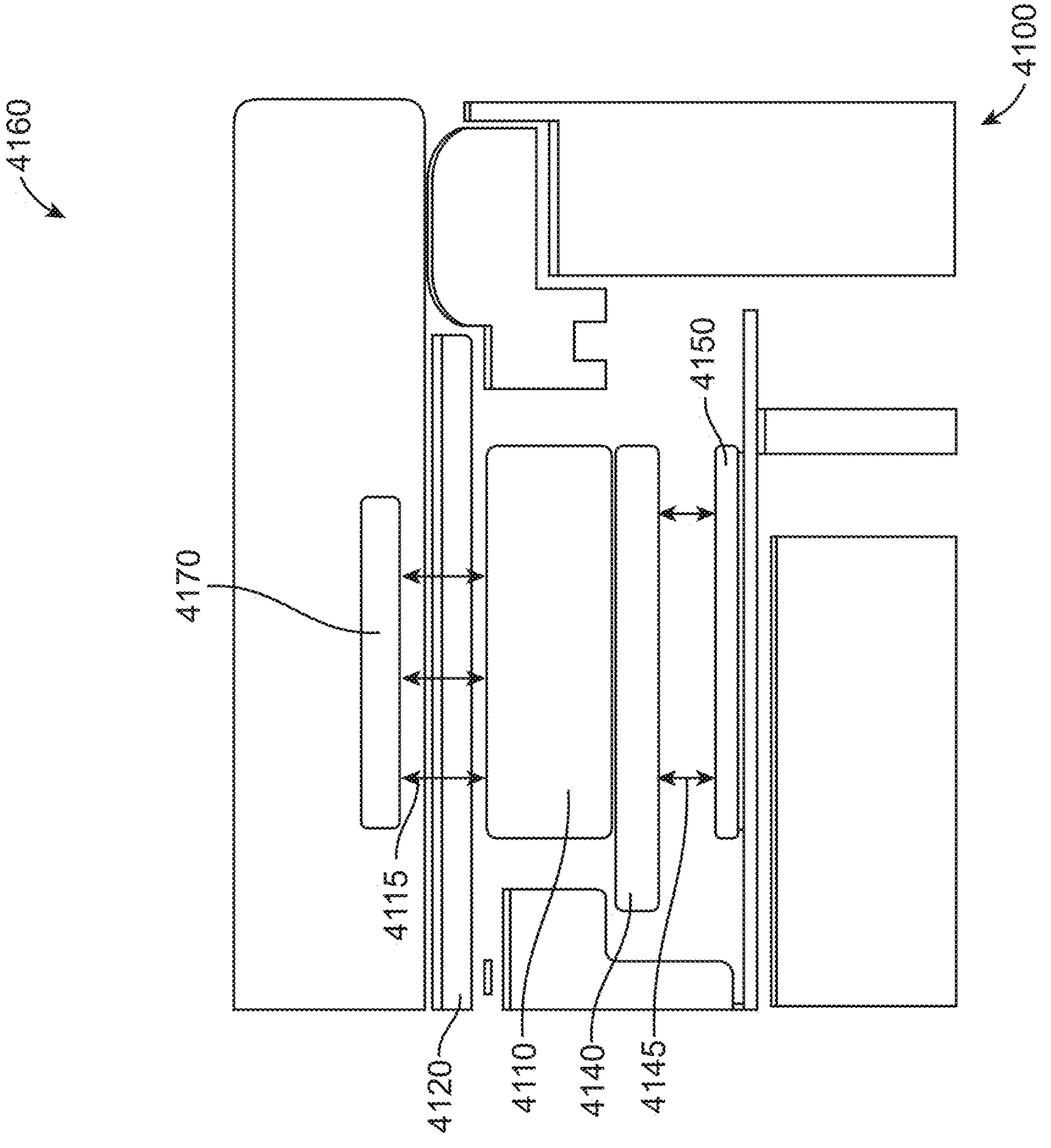

FIG. 41 to FIG. 43 illustrate a moving magnetic structure according to an embodiment of the present invention. In this example, first electronic device 4100 can be gaming accessory 100 or any of the other gaming accessories shown above, a wireless charging device, or other device having a magnet 4110 (which can be, e.g., any of the annular or other magnetic alignment components described herein.) In FIG. 41, first magnet 4110 and shield 4140 can be magnetically attracted or attached to return plate 4150 in first electronic device 4100. First electronic device 4100 can be at least partially housed in device enclosure 4120. In FIG. 42, housing 4180 of second electronic device 4160 can move laterally across a surface of device enclosure 4120 of first electronic device 4100 in a direction 4185. Second magnet 4170 in second electronic device 4160 can begin to attract first magnet 4110 in first electronic device 4100. This magnetic attraction 4115 can cause first magnet 4110 and shield 4140 to pull away from return plate 4150 by overcoming the magnetic attraction 4145 between shield 4140 and return plate 4150. In FIG. 43, second magnet 4170 in second electronic device 4160 has become aligned with first magnet 4110 in first electronic device 4100. First magnet 4110 and shield 4140 have pulled away from return plate 4150 thereby reducing the magnetic attraction 4145. First magnet 4110 has moved nearby or adjacent to device enclosure 4120, thereby increasing the magnetic attraction 4115 to second magnet 4170 in second electronic device 4160.

As shown in FIGS. 41 through FIG. 43, the magnetic attraction between first magnet 4110 in first electronic device 4100 and the second magnet 4170 in the second electronic device 4160 can increase when first magnet 4110 and shield 4140 pull away from return plate 4150. This is shown graphically in the following figures.

Figure 44:
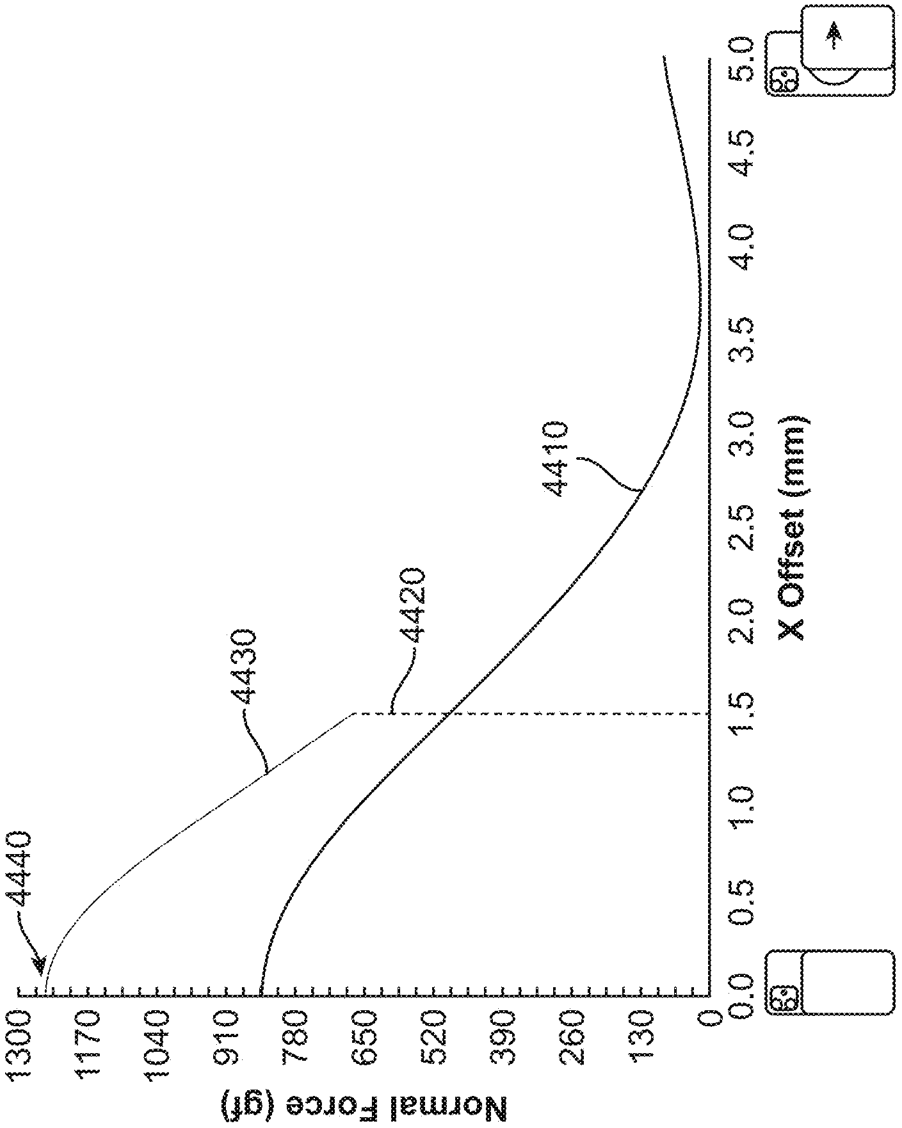
FIG. 44 illustrates a normal force between a first magnet in a first electronic device and a second magnet in a second electronic device.

FIG. 44 illustrates a normal force between a first magnet in first electronic device and a second magnet in a second electronic device as a function of a lateral offset between them. As shown in FIGS. 41-36, with a large offset between first magnet 4110 and second magnet 4370, first magnet 4110 and shield 4140 can remain attached to return plate 4150 in first electronic device 4100 and the magnetic attraction 4115 can be minimal. The shear force necessary to overcome this magnetic attraction is illustrated here as curve 4410. As shown in FIG. 42, as the offset or lateral distance between first magnet 4110 and second magnet 4170 decreases, first magnet 4110 and shield 4140 can pull away or separate from return plate 4150, thereby increasing the magnetic attraction 4115 between first magnet 4110 and second magnet 4170. This is illustrated here as discontinuity 4420. As shown in FIG. 43, as first magnet 4110 and second magnet 4170 come into alignment, the magnetic attraction 4115 increases along curve 4430 to a maximum 4440. The difference between curve 4410 and curve 4430 can show the increase in magnetic attraction between a phone or other electronic device, such as second electronic device 4160 and an attachable wallet or wireless charging device, such as first electronic device 4100, that results from first magnet 4110 being able to move axially. It should also be noted that in this example first magnet 4110 does not move in a lateral direction, though in other examples it is capable of such movement. Where first magnet 4110 is capable of moving in a lateral direction, curve 4430 can have a flattened peak from an offset of zero to an offset that can be overcome by a range of possible lateral movement of first magnet 4110.

Figure 45:
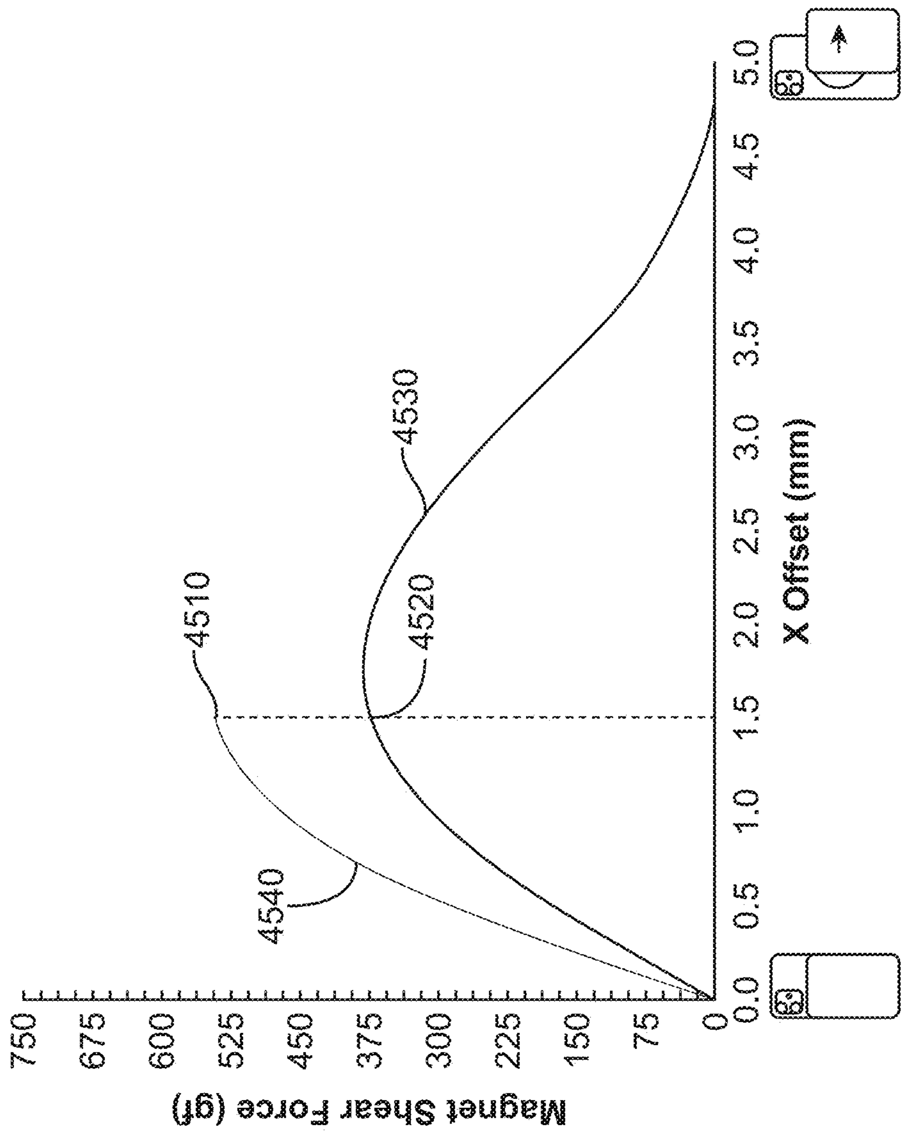
FIG. 45 illustrates a shear force between a first magnet in a first electronic device and a second magnet in a second electronic device.

FIG. 45 illustrates a shear force between a first magnet in a first electronic device and a second magnet in a second electronic device as a function of a lateral offset between them. With no offset between first magnet 4110 and second magnet 4160, there it is no shear force to move second magnet 4170 relative to first magnet 4110, as shown in FIG. 41. As the offset is increased, the shear force, that is the force attempting to realign the magnets, can increase along curve 4540. At discontinuity 4510, first magnet 4110 and shield 4140 can return to return plate 4150 (as shown in FIGS. 41-36), thereby decreasing the magnetic shear force to point 4520. The magnetic shear force can continue to drop off along curve 4530 as the offset increases. The difference between curve 4530 and curve 4540 can show the increase in magnetic attraction between a phone or other electronic device, such as second electronic device 4160 and an attachable wallet or wireless charging device, such as first electronic device 4100, that results from first magnet 4110 being able to move axially. It should also be noted that in this example first magnet 4110 does not move in a lateral direction, though in other examples it is capable of such movement. Where first magnet 4110 is capable of moving in a lateral direction, curve 4530 can remain at zero until the lateral movement of the second magnet 4170 overcomes the range of possible lateral movement of first magnet 4110.

In these and other embodiments of the present invention, it can be desirable to further increase this shear force. Accordingly, embodiments of the present invention can provide various high friction or high stiction surfaces, suction cups, pins, or other structures to increase this shear force.

For various applications, it may be desirable to enable a device having a magnetic alignment component to identify other devices that are brought into alignment. In some embodiments where the devices support a wireless charging standard that defines a communication protocol between devices, the devices can use that protocol to communicate. For example, the Qi standard for wireless power transfer defines a communication protocol that enables a power-receiving device (i.e., a device that has an inductive coil to receive power transferred wirelessly) to communicate information to a power-transmitting device (i.e., a device that has an inductive coil to generate time-varying magnetic fields to transfer power wirelessly to another device) via a modulation scheme in the inductive coils. The Qi communication protocol or similar protocols can be used to communicate information such as device identification or charging status or requests to increase or decrease power transfer from the power-receiving device to the power-transmitting device.

In some embodiments, a separate communication subsystem, such as a Near-Field Communication (NFC) subsystem can be provided to enable additional communication, including device identification, from a tag circuit located in one device to a reader circuit located in another device. (As used herein, "NFC" encompasses various protocols, including known standard protocols, that use near-field electromagnetic radiation to communicate data between antenna structures, e.g., coils of wire, that are in proximity to each other.) For example, each device that has an annular magnetic alignment component can also have an NFC coil that can be disposed inboard of and concentric with the annular magnetic alignment component. Where the device also has an inductive charging coil (which can be a transmitter coil or a receiver coil), the NFC coil can be disposed in an annular gap between the inductive charging coil and the annular magnetic alignment component. In some embodiments, an NFC protocol can be used to allow a portable electronic device to identify an accessory device when the respective magnetic alignment components of the portable electronic device and the accessory device are brought into alignment. For example, the NFC coil of a portable electronic device can be coupled to an NFC reader circuit while the NFC coil of an accessory device is coupled to an NFC tag circuit. When devices are brought into proximity, the NFC reader circuit of the portable electronic device can be activated to read the NFC tag of the accessory device. In this manner, the portable electronic device can obtain information (e.g., device identification) from the accessory device.

In some embodiments, an NFC reader in a portable electronic device can be triggered by detecting a change in a DC (or static) magnetic field within the portable electronic device that corresponds to a change expected when an accessory device having a complementary magnetic alignment component is brought into alignment. When the expected change is detected, the NFC reader can be activated to read an NFC tag in the other device, assuming the other device is present.

Examples of devices incorporating NFC circuitry and magnetic alignment components will now be described.

In some embodiments, an NFC tag may be located in a device that includes a wireless charger and an annular alignment structure. The NFC tag can be positioned and configured such that when the wireless charger device is aligned with a portable device having a complementary annular alignment structure and an NFC reader, the NFC tag is readable by the NFC reader of the portable electronic device.

Figure 46:
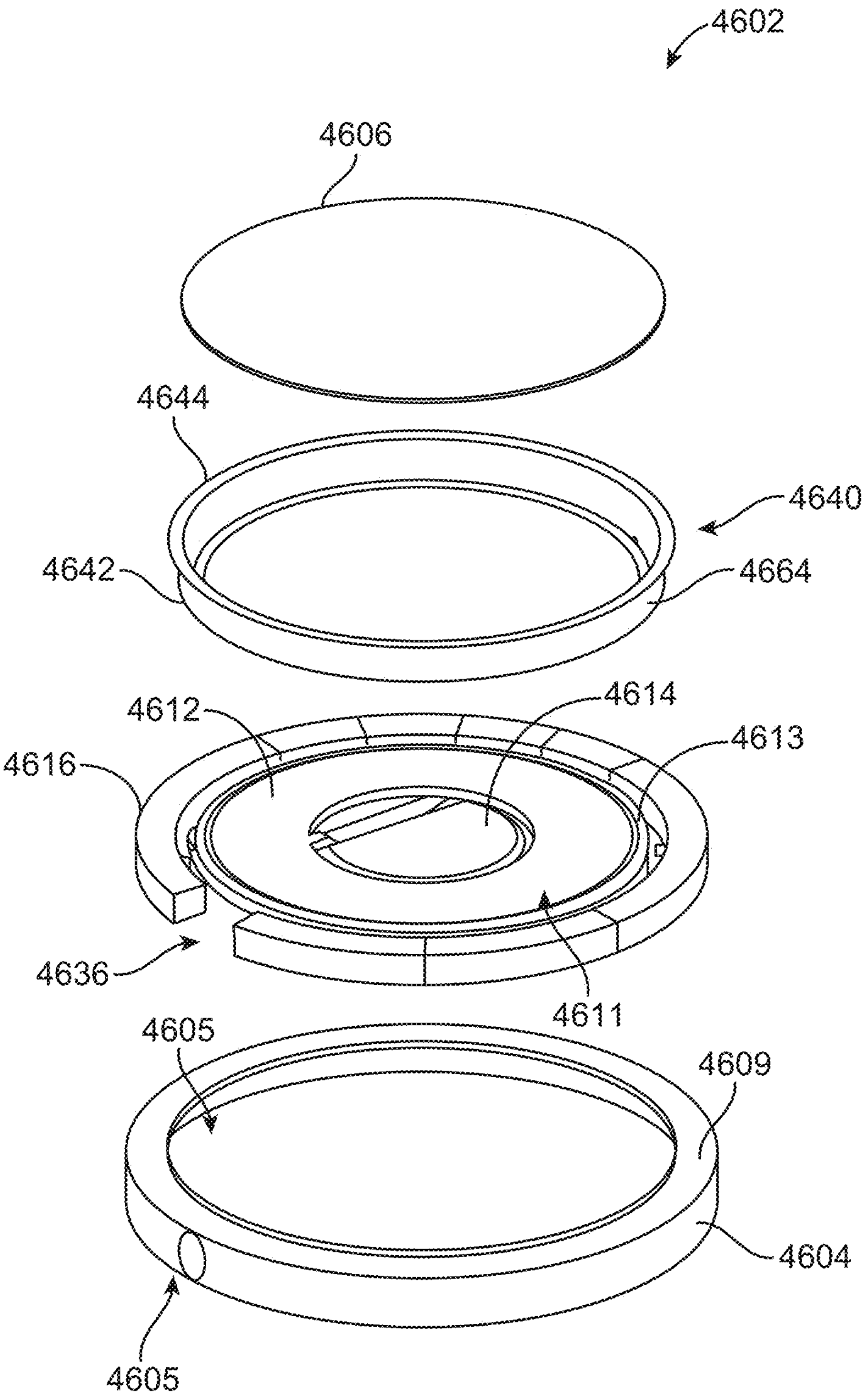
FIG. 46 shows an exploded view of a wireless charger device incorporating an NFC tag circuit according to some embodiments.
Figure 47:
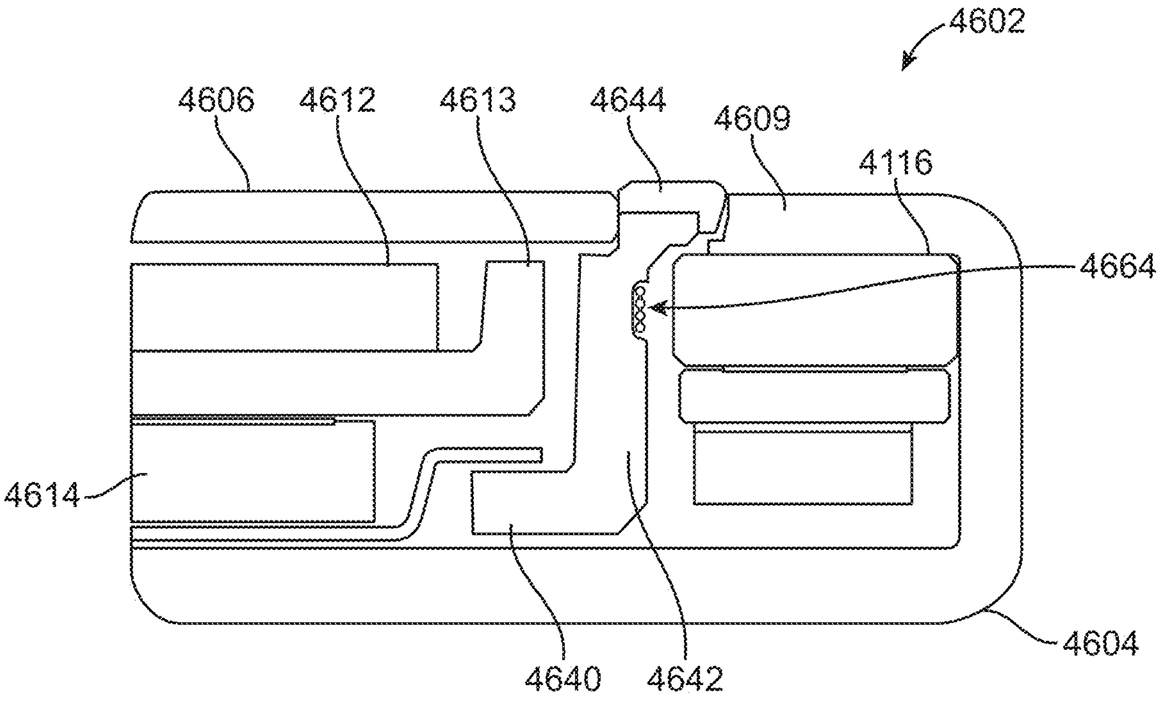
FIG. 47 shows a partial cross-section view of wireless charger device according to some embodiments.

FIG. 46 shows an exploded view of a wireless charger device 4602 incorporating an NFC tag according to some embodiments, and FIG. 47 shows a partial cross-section view of wireless charger device 4602 according to some embodiments. As shown in FIG. 46, wireless charger device 4602 can include an enclosure 4604, which can be made of plastic or metal (e.g., aluminum), and a charging surface 4606, which can be made of silicone, plastic, glass, or other material that is permeable to AC and DC magnetic fields. Charging surface 4606 can be shaped to fit within a circular opening 4603 at the top of enclosure 4604.

A wireless transmitter coil assembly 4611 can be disposed within enclosure 4604. Wireless transmitter coil assembly 4611 can include a wireless transmitter coil 4612 for inductive power transfer to another device as well as AC magnetic and/or electric shield(s) 4613 disposed around some or all surfaces of wireless transmitter coil 4612. Control circuitry 4614 (which can include, e.g., a logic board and/or power circuitry) to control wireless transmitter coil 4612 can be disposed in the center of coil 4612 and/or underneath coil 4612. In some embodiments, control circuitry 4614 can operate wireless transmitter coil 4612 in accordance with a wireless charging protocol such as the Qi protocol or other protocols.

A primary annular magnetic alignment component 4616 can surround wireless transmitter coil assembly 4611. Primary annular magnetic alignment component 4616 can include a number of arcuate magnet sections arranged in an annular configuration as shown. Each arcuate magnet section can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above.) In some embodiments, the diameter and thickness of primary annular magnetic alignment component 4616 is chosen such that arcuate magnet sections of primary annular magnetic alignment component 4616 fit under a lip 4609 at the top surface of enclosure 4604, as best seen in FIG. 47. For instance, each arcuate magnet section can be inserted into position under lip 4609, either before or after magnetizing the inner and outer regions. In some embodiments, primary annular magnetic alignment component 4616 can have a gap 4636 between two adjacent arcuate magnet sections. Gap 4636 can be aligned with an opening 4607 in a side surface of enclosure 4604 to allow external wires to be connected to wireless transmitter coil 4612 and/or control circuitry 4614.

A support ring subassembly 4640 can include an annular frame 4642 that extends in the axial direction and a friction pad 4644 at the top edge of frame 4642. Friction pad 4644 can be made of a material such as silicone or thermoplastic elastomers (TPE) such as thermoplastic urethane (TPU) and can provide support and protection for charging surface 4606. Frame 4642 can be made of a material such as polycarbonate (PC), glass-fiber reinforced polycarbonate (GFPC), or glass-fiber reinforced polyamide (GFPA). Frame 4642 can have an NFC coil 4664 disposed thereon. For example, NFC coil 4664 can be a four-turn or five-turn solenoidal coil made of copper wire or other conductive wire that is wound onto frame 4642. NFC coil 4664 can be electrically connected to NFC tag circuitry (not shown) that can be part of control circuitry 4614. The relevant design principles of NFC circuits are well understood in the art and a detailed description is omitted. Frame 4642 can be inserted into a gap region 4617 between primary annular magnetic alignment component 4616 and wireless transmitter coil assembly 4611. In some embodiments, gap region 4617 is shielded by AC shield 4613 from AC electromagnetic fields generated in wireless transmitter coil 4612 and is also shielded from DC magnetic fields of primary annular magnetic alignment component 4616 by the closed-loop configuration of the arcuate magnet sections.

As described above, an accessory device such as a case for a mobile phone may include an auxiliary magnetic alignment component, with or without a wireless charging coil. The auxiliary magnetic alignment component can act as a "repeater" to support the use of a primary magnetic alignment component and a secondary alignment component to align the wireless charging transmitter coil of a charger device with the wireless charging receiver coil of a portable electronic device while the portable electronic device is attached to (e.g., inserted into) the accessory device.

In some embodiments, an NFC tag circuit and coil may be incorporated into an accessory device having an auxiliary magnetic alignment component. The NFC tag can be read by the NFC reader of the portable electronic device (e.g., using NFC coil 5060 and associated NFC reader circuit of portable electronic device 5004 as described above), allowing the portable electronic device to identify the accessory device when the accessory device is in proximity and aligned with the portable electronic device.

Figure 48:
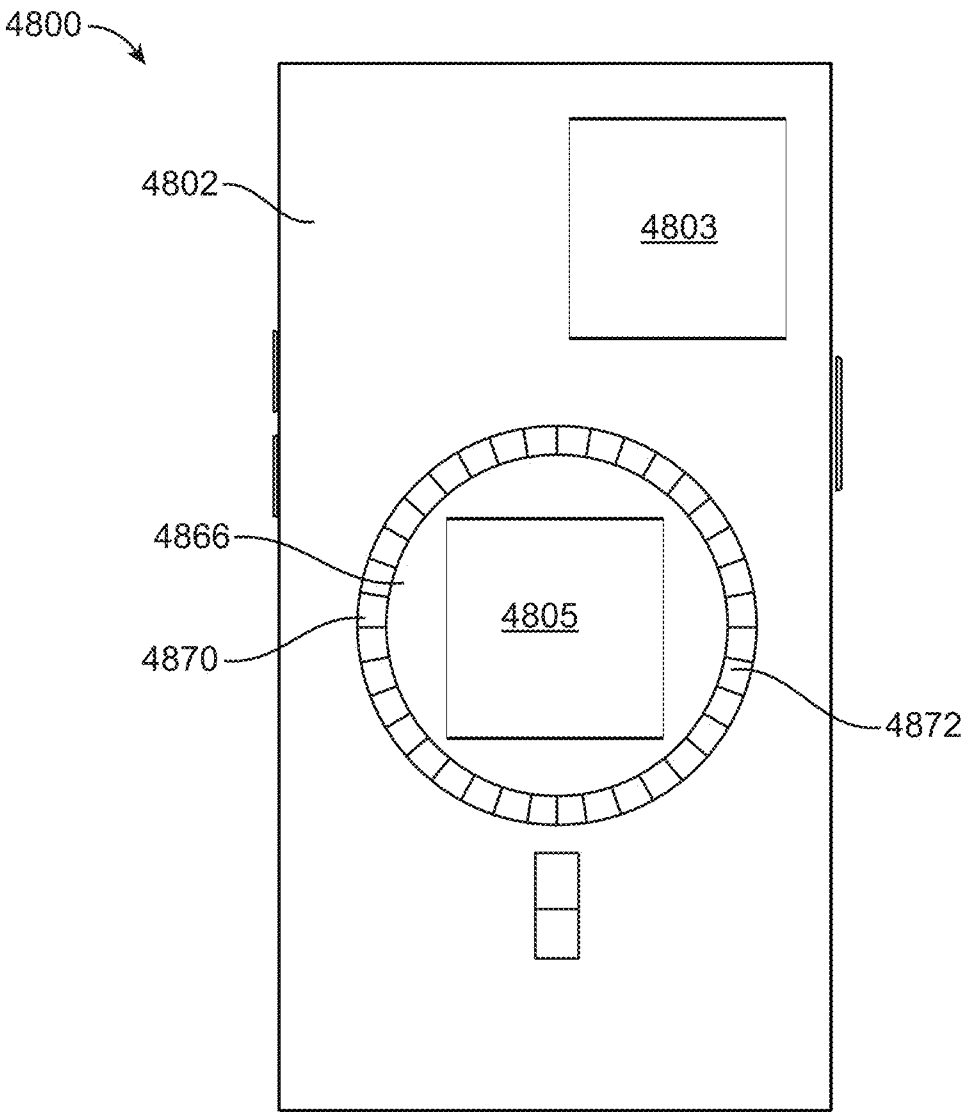
FIG. 48 shows an example of an accessory device incorporating an auxiliary alignment component with an NFC tag circuit and coil according to some embodiments.

FIG. 48 shows an example of an accessory device 4800 incorporating an auxiliary alignment component with an NFC tag circuit and coil according to some embodiments. Accessory device 4800 can be, for example, a case for portable electronic device 5004 (which can be, e.g., a smart phone). Accessory device 4800 can be shaped as a tray, sleeve, or other form factor as desired that covers and protects one or more surfaces of portable electronic device 5004. In particular, accessory device 4800 can have a rear (or back) panel 4802 that covers the rear surface of portable electronic device 5004. It should be understood that rear panel 4802 need not cover the entire rear surface of portable electronic device 5004; for example, a cutout area 4803 can be provided to expose a rear camera lens of portable electronic device 5004.

Rear panel 4802 can include an auxiliary annular magnetic alignment component 4870. Auxiliary annular magnetic alignment component 4870 can include a number of arcuate magnets 4872 arranged in an annular configuration as shown. Each arcuate magnet 4872 can include an inner arcuate region having a magnetic polarity oriented in a first axial direction, an outer arcuate region having a magnetic polarity oriented in a second axial direction opposite the first axial direction, and a central arcuate region that is not magnetically polarized. (Examples are described above.) Auxiliary annular magnetic alignment component 4870 can align with secondary annular magnetic alignment component 5018 of electronic device 5002.

An NFC tag circuit assembly 4866 can be disposed inboard of auxiliary annular magnetic alignment component 4616. In some embodiments, all or part of region 4805 of rear panel 4802, inboard of NFC tag circuit assembly 4866, can be a cutout area.

Figure 49:
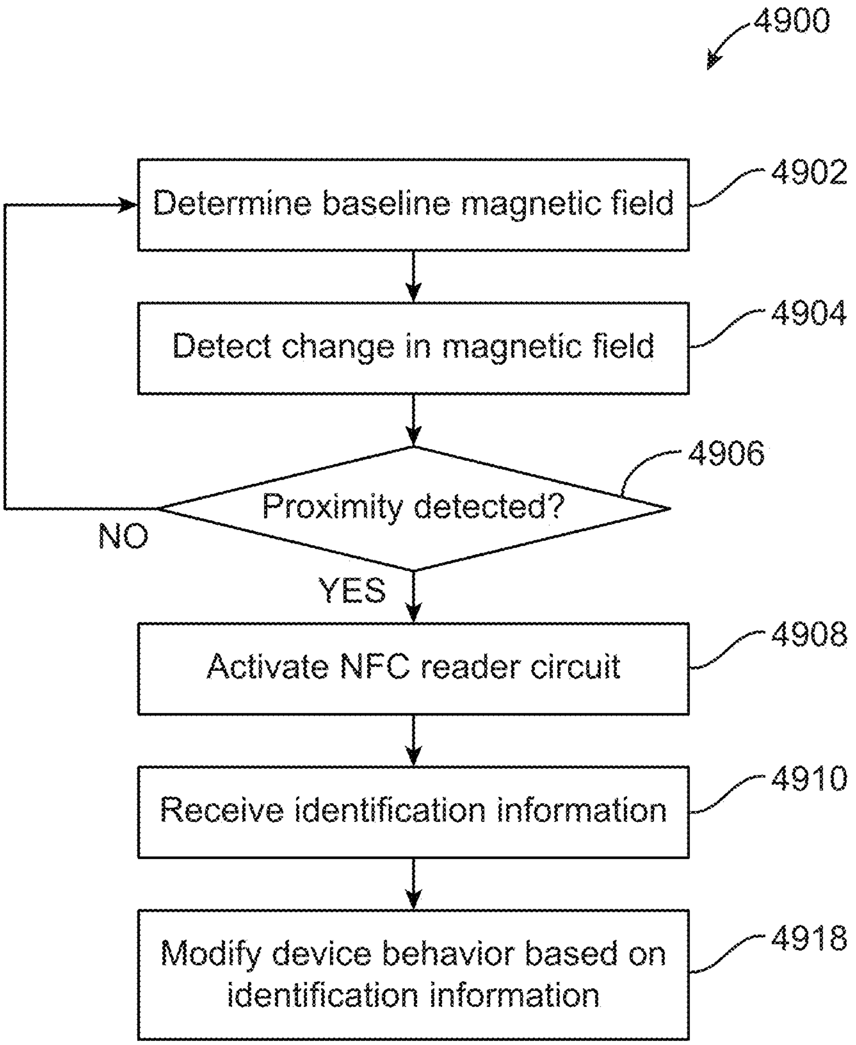
FIG. 49 shows a flow diagram of a process that can be implemented in a portable electronic device according to some embodiments.

FIG. 49 shows a flow diagram of a process 4900 that can be implemented in portable electronic device 5004 according to some embodiments. In some embodiments, process 4900 can be performed iteratively while portable electronic device 5004 is powered on. At block 4902, process 4900 can determine a baseline magnetic field, e.g., using magnetometer 5080. At block 4904, process 4900 can continue to monitor signals from magnetometer 5080 until a change in magnetic field is detected. At block 4906, process 4900 can determine whether the change in magnetic field matches a magnitude and direction of change associated with alignment of a complementary magnetic alignment component. If not, then the baseline magnetic field can be updated at block 4902. If, at block 4906, the change in magnetic field matches a magnitude and direction of change associated with alignment of a complementary alignment component, then at block 4908, process 4900 can activate the NFC reader circuitry associated with NFC coil 5060 to read an NFC tag of an aligned device. In some embodiments, NFC tags associated with different types of devices (e.g., a passive accessory versus an active accessory such as a wireless charger) are tuned to respond to different stimulating signals from the NFC reader circuitry, and information about the particular change in magnetic field can be used to determine a particular stimulating signal to be generated by the NFC reader circuitry. At block 4910, process 4900 can receive identification information read from the NFC tag. At block 4912, process 4900 can modify a behavior of portable electronic device 5004 based on the identification information, for example, generating a color wash effect as described above. After block 4912, process 4900 can optionally return to block 4902 to provide continuous monitoring of magnetometer 5080. It should be understood that process 4900 is illustrative and that other processes may be performed in addition to or instead of process 4900.

It will be appreciated that the NFC tag and NFC reader circuits described above are illustrative and that variations and modifications are possible. For example, coil designs can be modified by replacing wound wire coils with etched coils (or vice versa) and solenoidal coils with flat coils (or vice versa). "Wound wire" coils can be made using a variety of techniques, including by winding a wire, by stamping a coil from a copper sheet and molding plastic over the stamped part, or by using a needle dispenser to deposit wire on a plastic part; the wire can be heated so that it embeds into the softened plastic. Etched coils can be made by coating a surface with metal and etching away the unwanted metal. The number of turns in various NFC coils can be modified for a particular application. The choice of wound wire coils or etched coils for a particular device may depend on various design considerations. For instance, in devices that have an internal logic board, a wound wire NFC coil can terminate to the logic board; where a logic board is absent, an etched coil may simplify termination of the coil. Other design considerations may include the Q factor of the coil (a wound coil can provide higher Q in a smaller space) and/or ease of assembly.

Further, where a device that has an NFC tag circuit also has active circuitry (such as wireless charger devices that have active circuitry to control charging behavior), the NFC tag circuit is not limited to being a passive tag; an active NFC tag circuit can be provided to enable two-way communication with a compatible portable electronic device. For example, active NFC circuits in a portable electronic device and a wireless charger device can be used to support delivery of firmware updates to the wireless charger device.

Proximity-detection techniques can also be varied. For example, a different type of magnetometer (e.g., a single-axis magnetometer) can be used, or multiple magnetometers in different locations relative to the magnetic alignment components can be used. In some embodiments, a Hall effect sensor can be used instead of a magnetometer, although false positives may increase because a Hall effect sensor can generally only indicate a change or no-change rather than measuring a magnitude or direction of change.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A gaming accessory comprising:

a tray to support an electronic device, the tray comprising a magnet array to magnetically attract a corresponding magnet array in the electronic device, the magnet array comprising a plurality of magnets in an annular arrangement;

a game controller that is positionable over the electronic device, wherein the game controller has a cutout such that a section of a screen is unobstructed when the game controller is positioned over the electronic device;

a hinge to attach the tray to the game controller; and a plurality of user-interface controls, wherein each of the plurality of magnets in the magnet array comprises;

an inner annular region having a magnetic polarity oriented in a first axial direction;

an outer annular region having a magnetic polarity oriented in a second axial direction opposite the first axial direction; and a non-magnetized central annular region disposed between the inner annular region and the outer annular region.

2. The gaming accessory of claim 1 wherein the cutout is positioned in the game controller to align with a gaming image provided on the screen of the electronic device when the game controller is over the electronic device.

3. The gaming accessory of claim 1 wherein the cutout is one of a plurality of cutouts positioned in the game controller to align with images on the screen of the electronic device when the game controller is over the electronic device.

4. The gaming accessory of claim 1 wherein when the hinge is closed, the game controller is positioned over the electronic device and wherein the hinge is open, the game controller is to a side and next to the electronic device.

5. The gaming accessory of claim 1 wherein the tray further comprises a charging coil and the gaming accessory communicates with and receives power from the electronic device using the charging coil.

6. A gaming accessory comprising:

a tray to support an electronic device;

a game controller, wherein the game controller has a cutout; and a first hinge to attach the tray to the game controller, wherein when the first hinge is closed, the game controller is positioned such that the electronic device is between the game controller and the tray and wherein the first hinge is open, the game controller is to a side and next to the tray, wherein the game controller further comprises a plurality of user-interface controls, and wherein the game controller includes a second hinge, wherein when the first hinge is open and the second hinge is closed, the game controller is to a side and next to the tray and the game controller is folded such that the plurality of user-interface controls are accessible.

7. The gaming accessory of claim 6 wherein when an electronic device is positioned in the tray, the cutout in the game controller is positioned to align with a gaming image provided on a screen of the electronic device when the first hinge is closed.

8. The gaming accessory of claim 7 wherein when an electronic device is positioned in the tray, the cutout is one of a plurality of cutouts positioned in the game controller to align with images on the screen of the electronic device when the game controller is over the electronic device.

9. The gaming accessory of claim 6 wherein the tray comprises a magnet array to magnetically attract a corresponding magnet array in an electronic device and a charging coil wherein the gaming accessory communicates with and receives power from the electronic device using the charging coil.

10. A gaming accessory comprising:

a tray to support an electronic device;

a game controller including a plurality of user-interface controls and a plurality of cutouts; and a hinge joining the tray to the game controller, wherein when the hinge is closed, the game controller is positioned over the tray and wherein when the hinge is open, the plurality of user-interface controls are accessible, wherein when an electronic device is positioned in the tray, the plurality of cutouts are positioned in the game controller to align with images on a screen of the electronic device when the hinge is closed and the game controller is over the electronic device, and wherein the hinge comprises a portion that is extendable away from the tray to prop up the tray when the hinge is open and the game controller is on a level surface.

11. The gaming accessory of claim 10 wherein when an electronic device is positioned in the tray, the plurality of cutouts are positioned such that sections of a screen of the electronic device are unobstructed when the hinge is closed and the game controller is positioned over the electronic device.

12. The gaming accessory of claim 10 wherein the tray comprises a charging coil.

13. The gaming accessory of claim 10 wherein the tray comprises a charging coil, and wherein the gaming accessory communicates with and receives power from the electronic device using the charging coil.

14. The gaming accessory of claim 10 wherein the tray comprises a magnet array to magnetically attract a corresponding magnet array in the electronic device and a charging coil wherein the gaming accessory communicates with and receives power from the electronic device using the charging coil.

15. A gaming accessory comprising:

a tray to support an electronic device;

a game controller attached to a backside of the tray such that when an electronic device is positioned in the tray, a screen of the electronic device is unobstructed, the game controller including a plurality of user-interface controls; and a hinge in the game controller, wherein the hinge defines a rotational axis of rotational movement, the hinge dividing the game controller into a first portion and a second portion, wherein when the game controller is in a first position, the game controller is aligned with and under the tray, and the screen of the electronic device is unobstructed, and wherein when game controller moves to a second position, a top surface of the game controller slides along the backside of the tray such that the first portion of the game controller is exposed, the first portion supporting the plurality of user-interface controls, the second portion of the game controller remains under the tray, and the screen of the electronic device is unobstructed.

16. The gaming accessory of claim 15 wherein the hinge allows the tray to be angled relative to the plurality of user controls when the game controller is in the first position.

17. The gaming accessory of claim 16 wherein the tray comprises a charging coil.

18. The gaming accessory of claim 17 wherein the gaming accessory communicates with and receives power from the electronic device using the charging coil.

* * * * *